US012663539B2

(12) United States Patent
Wang et al.

(10) Patent No.: US 12,663,539 B2
(45) Date of Patent: Jun. 23, 2026

(54) METHOD FOR INTERACTION BETWEEN DEVICES, POSITION DETERMINING METHOD, ELECTRONIC DEVICE, AND CHIP SYSTEM

(71) Applicant: HUAWEI TECHNOLOGIES CO., LTD., Shenzhen (CN)

(72) Inventors: Qi Wang, Shenzhen (CN); Jianhui Li, Shenzhen (CN); Yuxing Wang, Hangzhou (CN); Zhenguo Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 18/262,801

(22) PCT Filed: Jan. 11, 2022

(86) PCT No.: PCT/CN2022/071403
§ 371 (c)(1),
(2) Date: Jul. 25, 2023

(87) PCT Pub. No.: WO2022/156566
PCT Pub. Date: Jul. 28, 2022

(65) Prior Publication Data
US 2024/0085555 A1     Mar. 14, 2024

(30) Foreign Application Priority Data

Jan. 25, 2021   (CN) .......................... 202110100462.0
Dec. 23, 2021   (CN) .......................... 202111595950.X

(51) Int. Cl.
*G01S 15/10*          (2006.01)
(52) U.S. Cl.
CPC .................................. *G01S 15/104* (2013.01)

(58) Field of Classification Search
CPC ..................................................... G01S 15/104
See application file for complete search history.

(56) References Cited

U.S. PATENT DOCUMENTS

2009/0316529 A1    12/2009 Huuskonen et al.
2013/0336094 A1*   12/2013 Gruteser ................. G01S 11/14
                                                          367/117
(Continued)

FOREIGN PATENT DOCUMENTS

CN          102113349 A        6/2011
CN          204009060 U       12/2014
(Continued)

OTHER PUBLICATIONS

Extended European Search Report in European Appln No. 22742045.2, dated Apr. 30, 2024, 12 pages.
(Continued)

*Primary Examiner* — Abdallah Abulaban
(74) *Attorney, Agent, or Firm* — Fish & Richardson P.C.

(57) ABSTRACT

Methods, electronic devices, and chip systems relating to interaction between devices are provided. A method includes: a first electronic device sends a first sound wave signal and a second sound wave signal to a second electronic device by using a first speaker and a second speaker. The first electronic device receives relative position information between the second electronic device and the first electronic device sent by the second electronic device. The relative position information is determined by a receiving result of receiving the first sound wave signal and the second sound wave signal by a first microphone of the second electronic device.

20 Claims, 25 Drawing Sheets

(56) References Cited

U.S. PATENT DOCUMENTS

| | | | | |
|---|---|---|---|---|
| 2014/0286133 A1* | 9/2014 | Li | | G01S 5/186 |
| | | | | 367/117 |
| 2016/0084937 A1* | 3/2016 | Lin | | G01S 5/28 |
| | | | | 367/125 |
| 2017/0131383 A1 | 5/2017 | Bartov et al. | | |
| 2017/0272886 A1* | 9/2017 | Family | | G06T 7/70 |
| 2020/0019367 A1* | 1/2020 | Sun | | G06F 3/04883 |

FOREIGN PATENT DOCUMENTS

| | | | | | |
|---|---|---|---|---|---|
| CN | 104981983 | A | 10/2015 | | |
| CN | 105554640 | A | 5/2016 | | |
| CN | 107656244 | A | 2/2018 | | |
| CN | 107873136 | A | 4/2018 | | |
| CN | 108427099 | A | 8/2018 | | |
| CN | 110677771 | A | 1/2020 | | |
| CN | 110869793 | A | 3/2020 | | |
| CN | 111343332 | A | 6/2020 | | |
| CN | 112083867 | A | 12/2020 | | |
| KR | 20160114849 | A | * 10/2016 | ....... | H04N 21/42204 |
| WO | 2015056996 | A1 | 4/2015 | | |

OTHER PUBLICATIONS

International Search Report and Written Opinion in International Appln. No. PCT/CN2022/071403, mailed on Mar. 29, 2022, 17 pages (with English translation).

\* cited by examiner

Electronic device 10
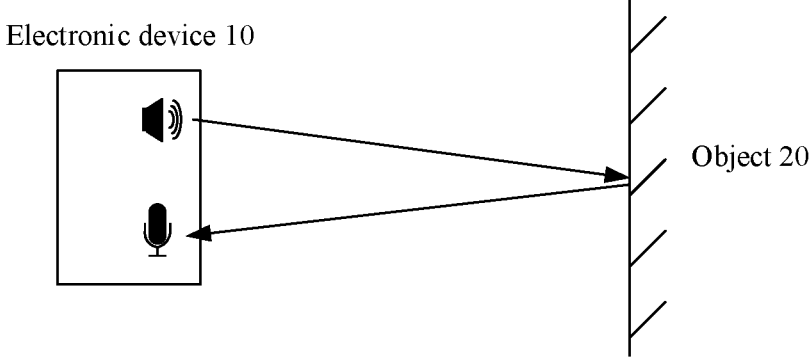
Object 20
FIG. 1
Electronic device 21                    Electronic device 22
FIG. 2
Electronic device 31
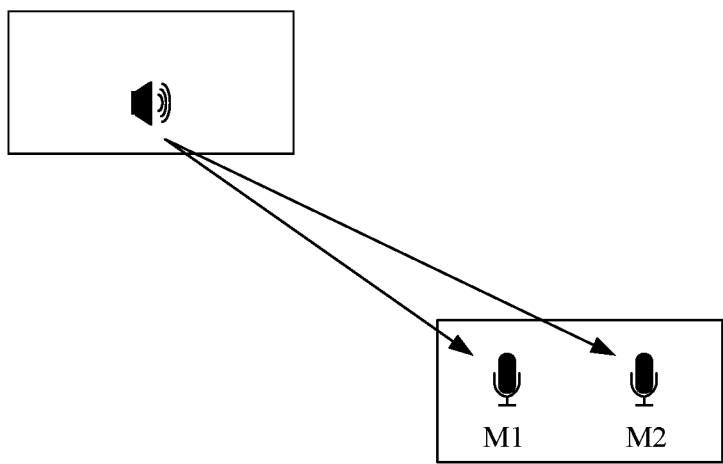
M1          M2
Electronic device 32
FIG. 3

Electronic device 31

Electronic device 32

Electronic device 32

Electronic device 31

Second electronic device 200

First electronic device 100

Y2

Y1

Y2

Y1

First electronic device 100

Second electronic device 200

First electronic device 100

Second electronic device 200

Second electronic device 200

First electronic device 100

Y1    Y2

First electronic device 100    Second electronic device 200

First electronic device 100

First speaker 110

Second speaker 120

First processor 130

First memory 140

Notebook computer

Mobile phone

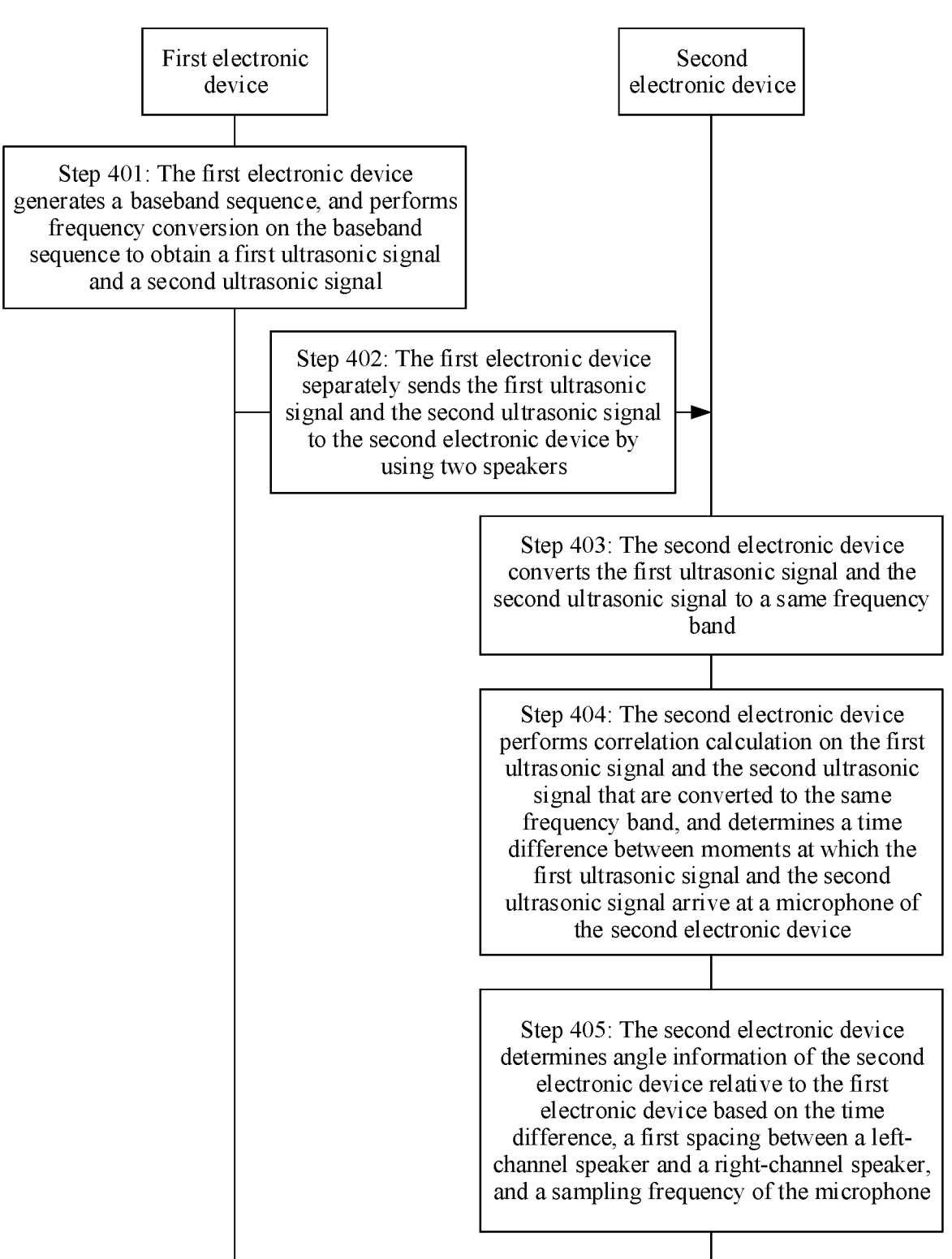

First electronic device

Second electronic device

Step 401: The first electronic device generates a baseband sequence, and performs frequency conversion on the baseband sequence to obtain a first ultrasonic signal and a second ultrasonic signal Step 402: The first electronic device separately sends the first ultrasonic signal and the second ultrasonic signal to the second electronic device by using two speakers Step 403: The second electronic device converts the first ultrasonic signal and the second ultrasonic signal to a same frequency band Step 404: The second electronic device performs correlation calculation on the first ultrasonic signal and the second ultrasonic signal that are converted to the same frequency band, and determines a time difference between moments at which the first ultrasonic signal and the second ultrasonic signal arrive at a microphone of the second electronic device Step 405: The second electronic device determines angle information of the second electronic device relative to the first electronic device based on the time difference, a first spacing between a left-channel speaker and a right-channel speaker, and a sampling frequency of the microphone

FIG. 21

First electronic device 100                    Second electronic device 200

METHOD FOR INTERACTION BETWEEN DEVICES, POSITION DETERMINING METHOD, ELECTRONIC DEVICE, AND CHIP SYSTEM

CROSS-REFERENCE TO RELATED APPLICATIONS

This application is a national stage of International Application No. PCT/CN2022/071403, filed on Jan. 11, 2022, which claims priority to Chinese Patent Application No. 202110100462.0, filed on Jan. 25, 2021, and Chinese Patent Application No. 202111595950.X, filed on Dec. 23, 2021. All of the aforementioned applications are incorporated herein by reference in their entireties.

TECHNICAL FIELD

This application relates to the field of terminal technologies, and in particular, to a method for interaction between devices, a position determining method, an electronic device, and a chip system.

BACKGROUND

With increasing types and an increasing quantity of electronic devices, requirements of interaction between a plurality of electronic devices are increasing. When interaction is established between the plurality of electronic devices, relative position information between the electronic devices usually needs to be determined, and then an interaction operation between the plurality of electronic devices is implemented based on the relative position information. For example, in a scenario in which a plurality of sound boxes achieve stereo sound effect, sound fields of some sound boxes may be adjusted based on relative position information between the sound boxes, to achieve stereo sound effect.

A process of determining the relative position information between the electronic devices is described by using a first electronic device and a second electronic device as an example. The first electronic device includes one audio sending unit (for example, one speaker), and the second electronic device includes a plurality of audio receiving units (for example, microphones). The audio sending unit sends a sound wave signal, and the plurality of audio receiving units receive the sound wave signal. The second electronic device determines relative position information between the first electronic device and the second electronic device based on a time difference between moments at which the plurality of audio receiving units receive the sound wave signal.

However, the foregoing process requires that the second electronic device has the plurality of audio receiving units, and a distance between the plurality of audio receiving units needs to be large enough. Otherwise, accuracy of a determined relative position is affected.

SUMMARY

This application provides a method for interaction between devices, a position determining method, an electronic device, and a chip system, to accurately determine relative position information between electronic devices.

The following technical solutions are applied to this application, to achieve the foregoing objective.

According to a first aspect, an embodiment of this application provides a method for interaction between devices, including: A first electronic device establishes a connection to a second electronic device. The first electronic device sends a first sound wave signal to the second electronic device by using a first speaker, and sends a second sound wave signal to the second electronic device by using a second speaker. The first speaker is different from the second speaker, and the first sound wave signal and the second sound wave signal are two sound wave signals with different features. The second electronic device receives the first sound wave signal and the second sound wave signal by using a first microphone. The second electronic device determines relative position information between the second electronic device and the first electronic device based on a time difference between moments at which the first microphone receives the two sound wave signals or strength of the two sound wave signals received by the first microphone. The relative position information includes that the second electronic device is located on the left side of the first electronic device, or the second electronic device is located on the right side of the first electronic device. The first electronic device and the second electronic device perform information exchange based on the relative position information.

In this embodiment of this application, there is only one manner of placing the two speakers of the first electronic device relative to the first electronic device. Regardless of any position that is of the first electronic device and at which the second electronic device is located, the manner of placing the two speakers does not affect the determined relative position information. Therefore, compared with that in the conventional technology, in this embodiment of this application, the relative position information between the second electronic device and the first electronic device can be more accurately determined. After the relative position information is determined, the first electronic device and the second electronic device may perform information exchange based on the relative position information. For example, information exchange that may be performed between the first electronic device and the second electronic device includes: The first electronic device sends first target content to a display interface of the second electronic device for display, and the first electronic device sends audio information to an audio playing device to implement stereo playing of the audio information.

According to a second aspect, an embodiment of this application provides a position determining method, including: A first electronic device sends a first sound wave signal to second electronic devices by using a first speaker, and sends a second sound wave signal to the second electronic devices by using a second speaker. The first speaker is different from the second speaker, and the first sound wave signal and the second sound wave signal are two sound wave signals with different features. The first electronic device receives relative position information between the second electronic device and the first electronic device sent by the second electronic device. The relative position information is determined by a receiving result of receiving the first sound wave signal and the second sound wave signal by a first microphone of the second electronic device. Alternatively, the first electronic device receives a receiving result sent by the second electronic device. The receiving result is a receiving result of receiving the first sound wave signal and the second sound wave signal by a first microphone of the second electronic device. The first electronic device determines relative position information based on the receiving result.

In this embodiment of this application, when the relative position information between the second electronic device and the first electronic device is determined, there is only one manner of placing the two speakers of the first electronic device relative to the first electronic device. Regardless of any position that is of the first electronic device and at which the second electronic device is located, the manner of placing the two speakers does not affect the determined relative position information. Therefore, compared with that in the conventional technology, in this embodiment of this application, the relative position information between the second electronic device and the first electronic device can be more accurately determined. In addition, this embodiment of this application can be implemented when the first electronic device has the first speaker and the second speaker and the second electronic device has one microphone, and therefore is easy to implement.

It should be noted that the relative position information between the second electronic device and the first electronic device may be position information of the second electronic device relative to the first electronic device or position information of the first electronic device relative to the second electronic device. This is not limited in embodiments of this application.

In this embodiment of this application, the first sound wave signal and the second sound wave signal may be sound wave signals with same time sequences or sound wave signals with different time sequences.

The sound wave signal may be an infrasound wave signal with a frequency of 0 to 20 kHz or an ultrasonic signal with a frequency of more than 20 kHz. For example, a frequency of the sound wave signal may be 1 kHz, 2 kHz, 3 kHz, 5 kHz, 10 kHz, 15 kHz, 20 kHz, or 30 kHz.

In some embodiments, the sound wave signal may be an ultrasonic signal.

In some embodiments, a distance between the first speaker and the second speaker is greater than a preset distance. For example, the preset distance may be any value greater than or equal to 10 centimeters. For example, the preset distance is 10 centimeters, 15 centimeters, 20 centimeters, 30 centimeters, 40 centimeters, 50 centimeters, 60 centimeters, 70 centimeters, or 80 centimeters.

A distance between two microphones of an electronic device is usually smaller. For example, a distance between two microphones of a mobile phone or a tablet computer is approximately 10 centimeters. However, a distance between two speakers of a notebook computer may be approximately 30 centimeters, a distance between two speakers of a television or a display may be approximately 40 centimeters to 50 centimeters, and a distance between two speakers of each of some televisions or displays may even reach 70 centimeters to 80 centimeters, and is far greater than 10 centimeters. Compared with that in the conventional technology, in this embodiment of this application, the relative position information between the second electronic device and the first electronic device can be more accurately determined.

In some embodiments, before the first electronic device sends the first sound wave signal to the second electronic device by using the first speaker, and sends the second sound wave signal to the second electronic device by using the second speaker, the position determining method may further include: establishing a pairing connection between the first electronic device and the second electronic device.

In a scenario, the pairing connection may be established between the first electronic device and the second electronic device in a wired manner. For example, the pairing connection may be established between the first electronic device and the second electronic device through an HDMI interface.

In a scenario, the pairing connection may be established between the first electronic device and the second electronic device in a wireless manner. For example, the pairing connection may be established between the first electronic device and the second electronic device in a wireless manner, for example, a connection to a same AP, a Wi-Fi direct connection, or Bluetooth.

With reference to the second aspect, in some embodiments, before the first electronic device sends the first sound wave signal to the second electronic device by using the first speaker, and sends the second sound wave signal to the second electronic device by using the second speaker, the position determining method further includes: In response to an extension display operation, the first electronic device generates the first sound wave signal and the second sound wave signal. The extension display operation is used to extend first target content to a display interface of the second electronic device for display.

With reference to the second aspect, in some embodiments, before the first electronic device sends the first sound wave signal to the second electronic device by using the first speaker, and sends the second sound wave signal to the second electronic device by using the second speaker, the position determining method further includes: The first electronic device generates a first baseband sequence. The first electronic device performs frequency conversion processing on the first baseband sequence to generate the first sound wave signal and the second sound wave signal.

In a scenario, the first electronic device generates a baseband sequence s with bandwidth of B. The first electronic device performs up-conversion on the baseband sequence s to obtain a first sound wave signal $x_1(t)$ and a second sound wave signal $x_2(t)$. The first sound wave signal $x_1(t)$ and the second sound wave signal $x_2(t)$ are sound wave signals with different time sequences. A frequency band of the first sound wave signal $x_1(t)$ is $[f_1,f_2]$, and a frequency band of the second sound wave signal $x_2$ is $[f_3,f_4]$.

Correspondingly, at a same moment, the first electronic device may send the first sound wave signal $x_1(t)$ to the second electronic device by using the first speaker, and send the second sound wave signal $x_2(t)$ to the second electronic device by using the second speaker. Alternatively, the first electronic device may send the first sound wave signal $x_1(t)$ to the second electronic device at a first moment by using the first speaker, and send the second sound wave signal $x_2(t)$ to the second electronic device at a second moment by using the second speaker. The first moment is different from the second moment.

A process in which the first electronic device performs up-conversion on the baseband sequence s may be as follows: The first electronic device modulates the baseband sequence s onto a low-frequency carrier, performs frequency mixing on the low-frequency carrier and a high-frequency signal, and then obtains two upper sideband signals obtained after frequency mixing, to obtain the first sound wave signal $x_1(t)$ and the second sound wave signal $x_2(t)$.

It should be noted that the first sound wave signal $x_1(t)$ and the second sound wave signal $x_2(t)$ are affected by channel information, a delay, or the like in a channel transmission process. As a result, after the second electronic device receives the two sound wave signals, the first sound wave signal $x_1(t)$ is converted into a first sound wave signal $y_1(t)$, and the second sound wave signal $x_2(t)$ is converted into a second sound wave signal $y_2(t)$.

In another scenario, the first electronic device generates a baseband sequence s with bandwidth of B. The first electronic device performs up-conversion on the baseband sequence s to obtain the first sound wave signal and the second sound wave signal. The first sound wave signal and the second sound wave signal are sound wave signals with same time sequences.

Correspondingly, the first electronic device may send the first sound wave signal to the second electronic device at a first moment by using the first speaker, and send the second sound wave signal to the second electronic device at a second moment by using the second speaker. The first moment is different from the second moment. For example, after completing sending the first sound wave signal to the second electronic device by using the first speaker, the first electronic device may send the second sound wave signal to the second electronic device by using the second speaker.

For example, when preset duration after completing sending the first sound wave signal by using the first speaker elapses, the first electronic device may send the second sound wave signal to the second electronic device by using the second speaker. The preset duration may be any duration greater than or equal to 0. For example, a length of the preset duration is $T_{10}$, and a moment at which the first electronic device completes sending the first sound wave signal to the second electronic device by using the first speaker is $T_{11}$. In this case, the first electronic device may send the second sound wave signal to the second electronic device at a moment $(T_{11}+T_{10})$ by using the second speaker.

With reference to the second aspect, in some embodiments, before the first electronic device sends the first sound wave signal to the second electronic device by using the first speaker, and sends the second sound wave signal to the second electronic device by using the second speaker, the position determining method further includes: The first electronic device generates two orthogonal baseband sequences. The first electronic device performs frequency conversion processing on the two orthogonal baseband sequences to generate the first sound wave signal and the second sound wave signal.

For example, the first electronic device generates a first baseband sequence and a second baseband sequence. The first electronic device up-converts the first baseband sequence and the second baseband sequence to a same frequency band, to obtain the first sound wave signal and the second sound wave signal. For another example, the first electronic device generates a first baseband sequence and a second baseband sequence. The first electronic device up-converts the first baseband sequence and the second baseband sequence to different frequency bands, to obtain the first sound wave signal and the second sound wave signal.

With reference to the second aspect, in some embodiments, the receiving result includes a time difference between moments at which the first microphone receives the first sound wave signal and the second sound wave signal, and/or signal strength of each of the first sound wave signal and the second sound wave signal that are received by the first microphone.

In some embodiments, the receiving result is the time difference. That the first electronic device determines relative position information based on the receiving result includes: calculating the time difference obtained by subtracting a fourth moment from a third moment, where the third moment is the moment at which the first microphone receives the first sound wave signal, the fourth moment is the moment at which the first microphone receives the second sound wave signal, the first speaker is located on a first side of the second speaker, the second speaker is located on a second side of the first speaker, and the first side is a left side or a right side; and if the time difference is greater than or equal to a first time difference threshold, determining that the second electronic device is located on a second side of the first electronic device, where the first time difference threshold is a positive number; if the time difference is less than or equal to a second time difference threshold, determining that the second electronic device is located on a first side of the first electronic device, where the second time difference threshold is a negative number; or if the time difference is less than a first time difference threshold and greater than a second time difference threshold, determining that the second electronic device is located on the front side or the rear side of the first electronic device.

For example, the time difference may be represented as a difference $\tau^*$ between quantities of sampling points at which the first microphone samples the first sound wave signal and the second sound wave signal. After the first sound wave signal and the second sound wave signal arrive at the first microphone, the first microphone samples the first sound wave signal and the second sound wave signal at a fixed sampling frequency $f_s$. For example, the sampling frequency $f_s$ is 48 kHz. Therefore, a quantity of sampling points that is collected by the first microphone is $t \times f_s$ within duration t. For example, the first sound wave signal first arrives at the first microphone, and then the second sound wave signal arrives at the first microphone. In this case, the quantity of sampling points at which the first microphone samples the first sound wave signal is greater than the quantity of sampling points at which the first microphone collects the first sound wave signal. The difference $\tau^*$ between the two quantities of sampling points is a product $\Delta t \cdot f_s$ of the sampling frequency and the time difference, where $\Delta t$ is the time difference.

For example, a time difference threshold may be represented as a preset sampling point value. The preset sampling point value is positively correlated with a first spacing and a sampling frequency of the first microphone, and the first spacing is the distance between the first speaker and the second speaker. For example, a preset sampling point value Th may be positively correlated with a first spacing D and the sampling frequency $f_s$. A larger first spacing D and sampling frequency $f_s$ indicate a larger preset sampling point value Th.

For example, a relationship between the preset sampling point value Th, the first spacing D, and the sampling frequency $f_s$ may be $Th = aD \cdot f_s / v$. A coefficient a is any value falling within $(-1, 1)$. a may be a value, for example, $\pm 0.2$, $\pm 0.3$, $\pm 0.4$, $\pm 0.5$, $\pm 0.6$, or $\pm 0.7$.

If $\tau^* > Th$, it indicates that the second sound wave signal first arrives at the first microphone of the second electronic device. In this case, the second electronic device is located on the second side of the first electronic device. If $\tau^* < -Th$, it indicates that the first sound wave signal first arrives at the first microphone of the second electronic device. In this case, the second electronic device is located on the first side of the first electronic device. If $|\tau^*| \leq Th$, it indicates that the first sound wave signal and the second sound wave signal arrive at the first microphone of the second electronic device almost at the same time. In this case, the second electronic device is located at the front side or the rear side of the first electronic device.

In some embodiments, the receiving result is the signal strength. That the first electronic device determines relative position information based on the receiving result includes: comparing a first power with a second power, where the first power is the signal strength of the first sound wave signal, the second power is the signal strength of the second sound wave signal, the first speaker is located on a first side of the second speaker, the second speaker is located on a second side of the first speaker, and the first side is a left side or a right side; and if the first power and the second power satisfy a first preset relationship, determining that the second electronic device is located on a first side of the first electronic device, where the first preset relationship is that a result of subtracting the second power from the first power is greater than or equal to a first power threshold, and the first power threshold is a positive number, or the first preset relationship is that a result of dividing the first power by the second power is greater than or equal to a first ratio, and the first ratio is greater than 1; if the first power and the second power satisfy a second preset relationship, determining that the second electronic device is located on a second side of the first electronic device, where the second preset relationship is that a result of subtracting the second power from the first power is less than or equal to a second power threshold, and the second power threshold is a negative number, or the second preset relationship is that a result of dividing the first power by the second power is less than or equal to a second ratio, and the first ratio is less than 1; or if the first power and the second power satisfy a third preset relationship, determining that the second electronic device is located on the front side or the rear side of the first electronic device, where the third preset relationship is that a result of subtracting the second power from the first power is less than a first power threshold and greater than a second power threshold, or the third preset relationship is that a result of dividing the first power by the second power is less than a first ratio and greater than a second ratio.

For example, the first power may be a first average power of the first sound wave signal $y_1(t)$ within a preset time period. The second power may be a second average power of the second sound wave signal $y_2(t)$ within the preset time period. A time length of the first sound wave signal $y_1(t)$ is a first time length, and a time length of the second sound wave signal $y_2(t)$ is a second time length. In this case, the preset time period may be any value less than or equal to a smallest value between the first time length and the second time length. The time length of the first sound wave signal $y_1(t)$ may be a time length corresponding to a start time point at which the first electronic device starts to send the first sound wave signal $y_1(t)$ and an end time point at which the first electronic device ends sending the first sound wave signal $y_1(t)$. The time length of the second sound wave signal $y_2(t)$ may be a time length corresponding to a start time point at which the first electronic device starts to send the first sound wave signal $y_2(t)$ and an end time point at which the first electronic device ends sending the first sound wave signal $y_2(t)$.

In some embodiments, the first ratio and the second ratio may be reciprocals of each other.

With reference to the second aspect, in some embodiments, the relative position information between the second electronic device and the first electronic device includes at least one of the following: the second electronic device is located on the left side of the first electronic device, the second electronic device is located on the right side of the first electronic device, and the second electronic device is located on the front side or the rear side of the first electronic device.

With reference to the second aspect, in some embodiments, the position determining method may further include: detecting a first operation for the first target content displayed by the first electronic device; determining whether the first operation corresponds to the relative position information; and if the first operation corresponds to the relative position information, sending, by the first electronic device, the first target content to the display interface of the second electronic device for display.

The sending the first target content to the display interface of the second electronic device for display may include: if the relative position information is that the second electronic device is located on the left side of the first electronic device, sending the first target content to the display interface of the second electronic device for display in response to the first operation; or if the relative position information is that the second electronic device is located on the right side of the first electronic device, sending the first target content to the display interface of the second electronic device for display in response to the first operation; or if the relative position information is that the second electronic device is located on the front side or the rear side of the first electronic device, skipping responding to the first operation, and skipping sending the first target content to the display interface of the second electronic device for display.

With reference to the second aspect, in some embodiments, the second electronic devices include a second electronic device located on the left side of the first electronic device and a second electronic device located on the right side of the first electronic device. The position determining method further includes: detecting a second operation for the first target content displayed by the first electronic device; and if the second operation is an operation of extending the first target content leftward, sending, by the first electronic device for display, the first target content to a display interface of the second electronic device that is located on the left side of the first electronic device; or if the second operation is an operation of extending the first target content rightward, sending, by the first electronic device for display, the first target content to a display interface of the second electronic device that is located on the right side of the first electronic device.

In a scenario, the position determining method may further include: The first electronic device generates first guide information. The first guide information guides a user to drag the first target content leftward or to rightward. The first electronic device obtains a drag operation performed on the target content. The first electronic device sends the first target content to the display interface of the second electronic device for display in response to the drag operation.

For example, if the second electronic device includes the second electronic device located on the left side of the first electronic device, the first guide information guides the user to drag the first target content leftward. If the second electronic device includes the second electronic device located on the right side of the first electronic device, the first guide information guides the user to drag the first target content rightward. If the second electronic devices include the second electronic device located on the left side of the first electronic device and the second electronic device located on the right side of the first electronic device, the first guide information guides the user to drag the first target content leftward or rightward.

For example, the first guide information may be displayed on a display interface of the first electronic device as text. Alternatively, the first guide information may be displayed on a display interface of the first electronic device as animation. Alternatively, the first guide information may be displayed on a display interface of the first electronic device as a combination of animation and text.

In a scenario, the first electronic device moves, in response to a user operation, the first target content in a direction corresponding to the user operation. If the first target content is moved to a first preset position on the display interface of the first electronic device and remained for first preset duration, it indicates that a first part of content of the first target content is moved out of the display interface of the first electronic device. The second electronic device displays the first part of content of the first target content, and the first electronic device displays a second part of content of the first target content. The first part of content and the second part of content of the first target content constitute the first target content. In this case, the first electronic device and the second electronic device jointly display the first target content.

In a scenario, the first electronic device moves, in response to a user operation, the first target content in a direction corresponding to the user operation. If the first target content is moved to a second preset position on the display interface of the first electronic device and remained for second preset duration, it indicates that the first target content is fully moved out of the display interface of the first electronic device. In this case, the second electronic device displays the first target content, and the first electronic device no longer displays the first target content.

With reference to the second aspect, in some embodiments, that the first electronic device determines relative position information based on the receiving result includes: determining an angle of the second electronic device relative to the first electronic device based on a time difference, a first spacing, and a sampling frequency. The first spacing is a distance between the first speaker and the second speaker, and the sampling frequency is a sampling frequency of the microphone of the second electronic device.

For example, the time difference may be represented as a difference $\tau^*$ between quantities of sampling points at which the first microphone of the second electronic device samples the first sound wave signal and the second sound wave signal. The determining an angle of the second electronic device relative to the first electronic device includes: determining, by using a preset formula, the angle of the second electronic device relative to the first electronic device based on a reference angle, the first spacing, and the difference $\tau^*$ between the quantities of sampling points.

In a scenario, the reference angle may be 90°, 0°, or −90°. That the angle of the second electronic device relative to the first electronic device is 90° is as follows: The second electronic device is located in a right-side region of the first electronic device, the second electronic device is located on a connection line between the first speaker and the second speaker, and $D_4−D_5=D$. That the angle of the second electronic device relative to the first electronic device is 0° is as follows: The second electronic device is located in a front and rear-side region of the first electronic device, the second electronic device is located on a perpendicular bisector of a connection line between the first speaker and the second speaker, and $D_4−D_5=0$. That the angle of the second electronic device relative to the first electronic device is −90° is as follows: The second electronic device is located in a left-side region of the first electronic device, the second electronic device is located on a connection line between the first speaker and the second speaker, and $D_4−D_5=−D$. $D_4$ is a distance between the first speaker and the first microphone. $D_5$ is a distance between the second speaker and the first microphone. D is the first spacing. The first speaker is located on the left side of the second speaker.

The difference between the quantities of sampling points is $$\tau^* = \frac{D_4 - D_5}{v} f_s.$$

An angle θ of the second electronic device relative to the first electronic device may be approximately $$\theta \approx \frac{D_4 - D_5}{2D} \cdot 180°.$$

It can be learned from a formula $$\tau^* = \frac{D_4 - D_5}{v} f_s$$

that $$D_4 - D_5 = \frac{\tau^* v}{f_s}.$$

Therefore, the angle θ may be approximately $$\theta \approx \frac{\tau^* v}{D f_s} \cdot 90°.$$

θ is the angle of the second electronic device relative to the first electronic device. $\tau^*$ is the difference between the quantities of sampling points. v is a propagation velocity of a sound wave signal. $f_s$ is a sampling frequency of the first microphone.

In a scenario, the reference angle is 0°, 90°, or 180°. That the angle of the second electronic device relative to the first electronic device is 0° is as follows: The second electronic device is located in a right-side region of the first electronic device, the second electronic device is located on a connection line between the first speaker and the second speaker, and $D_4−D_5=D$. That the angle of the second electronic device relative to the first electronic device is 90° is as follows: The second electronic device is located in a front and rear-side region of the first electronic device, the second electronic device is located on a perpendicular bisector of a connection line between the first speaker and the second speaker, and $D_4−D_5=0$. That the angle of the second electronic device relative to the first electronic device is 1800 is as follows: The second electronic device is located in a left-side region of the first electronic device, the second electronic device is located on a connection line between the first speaker and the second speaker, and $D_4−D_5=−D$. $D_4$ is a distance between the first speaker and the first microphone. $D_5$ is a distance between the second speaker and the first microphone. D is the first spacing. The first speaker is located on the left side of the second speaker.

The difference between the quantities of sampling points is $$\tau^* = \frac{D_4 - D_5}{v} f_s.$$

An angle $\theta$ of the second electronic device relative to the first electronic device may be approximately $$\theta \approx \frac{D - (D_4 - D_5)}{2D} \cdot 180°.$$

It can be learned from a formula $$\tau^* = \frac{D_4 - D_5}{v} f_s$$

that $$D_4 - D_5 = \frac{\tau^* v}{f_s}.$$

Therefore, the angle $\theta$ may be approximately $$\theta \approx \left(1 - \frac{\tau^* v}{D f_s}\right) \cdot 90°.$$

$\theta$ is the angle of the second electronic device relative to the first electronic device. $\tau^*$ is the difference between the quantities of sampling points. $v$ is a propagation velocity of a sound wave signal. $f_s$ is a sampling frequency of the first microphone.

After the angle of the second electronic device relative to the first electronic device is obtained, an orientation corresponding to the angle may be determined based on a region boundary. The region boundary may be set in a preset manner, or the region boundary is obtained through calculation by using time points at which the first microphone collects the first sound wave signal and the second sound wave signal.

In some embodiments, a boundary between the left-side region, the right-side region, and the front and rear-side region of the first electronic device may be preset. For example, an angle corresponding to the boundary between the left-side region, the right-side region, and the front and rear-side region is preset to $\pm 20°$. To be specific, if an angle of a sound box relative to a television falls into a range of [−20°,20°], the sound box is located in a front and rear-side region of the television. If an angle of a sound box relative to a television falls into a range of (20°,90°], the sound box is located in a right-side region of the television. If an angle of a sound box relative to a television falls into a range of [−90°,−20°), the sound box is located in a left-side region of the television.

In some embodiments, the boundary between the left-side region, the right-side region, and the front and rear-side region may be determined based on a time point $T_7$ at which the first microphone of the second electronic device collects the first sound wave signal, a time point $T_8$ at which the first microphone of the second electronic device collects the second sound wave signal, and a threshold $t_2$. For example, a curve meeting a condition that $T_7$ is earlier than $T_8$ and $|T_7-T_8|=t_2$ may be used as a boundary between the right-side region and the front and rear-side region. A curve meeting a condition that $T_7$ is later than $T_8$ and $|T_7-T_8|=t_2$ may be used as a boundary between the left-side region and the front and rear-side region.

With reference to the second aspect, in some embodiments, if the relative position information between the second electronic device and the first electronic device changes, and changed relative position information is that the second electronic device is located on the front side or the rear side of the first electronic device, an extension direction is not changed between the first electronic device and the second electronic device. The extension direction includes rightward extension and leftward extension.

The rightward extension may be as follows: The user drags the first target content rightward on the display interface of the first electronic device, to extend, for display, the first target content to the second electronic device located in the right-side region of the first electronic device. The leftward extension may be as follows: The user drags the first target content leftward on the display interface of the first electronic device, to extend, for display, the first target content to the second electronic device located in the left-side region of the first electronic device.

For example, the second electronic device is located in the right-side region of the first electronic device. In this case, the first electronic device sends the first target content to the display interface of the second electronic device for display. Then, if the first electronic device moves and/or the second electronic device moves, and consequently the second electronic device is located in the front and rear-side region of the first electronic device, the extension direction remains as right extension without changing. In this case, the user may still send the target content to the display interface of the second electronic device for display by dragging the target content rightward. That the first electronic device moves and/or the second electronic device moves includes: The second electronic device moves, the first electronic device moves, or the first electronic device and the second electronic device move.

With reference to the second aspect, in some embodiments, when extension display starts to be performed between the first electronic device and the second electronic device, if the second electronic device is located on the front side or the rear side of the first electronic device, the first electronic device does not send the first target content to the second electronic device. In addition, the first electronic device may generate first prompt information. The first prompt information prompts the user that the second electronic device is located in the front and rear-side region of the first electronic device, and the first electronic device cannot send the first target content to the display interface of the second electronic device for display.

In a scenario, if the first electronic device detects a third operation, and the relative position information at this time indicates that the second electronic device is located in the front and rear-side region of the first electronic device, the first electronic device sends the first target content to the display interface of the second electronic device for display in a default extension direction or an extension direction customary by the user. The default extension direction may be leftward extension or rightward extension.

With reference to the second aspect, in some embodiments, the method may include: after a position of the first electronic device changes and/or a position of the second electronic device changes, re-determining the relative position information between the second electronic device and the first electronic device.

For example, both the first electronic device and the second electronic device may detect, by using built-in accelerometer sensors, gyro sensors, or magnetometer sensors, whether the respective positions change. If the position of the first electronic device changes and/or the position of the second electronic device changes, the relative position information between the second electronic device and the first electronic device may change. For example, the second electronic device is located in the left-side region of the first electronic device. After the position of the first electronic device changes and/or the position of the second electronic device changes, the second electronic device may be located in the front and rear-side region of the first electronic device. As a result, after the position of the first electronic device changes and/or the position of the second electronic device changes, the relative position information between the second electronic device and the first electronic device needs to be re-determined.

In a scenario, the first electronic device detects, by using the built-in accelerometer sensor, gyro sensor, or magnetometer sensor, that the position of the first electronic device changes, and performs a step of sending the first sound wave signal to the second electronic device by using the first speaker and sending the second sound wave signal to the second electronic device by using the second speaker and a subsequent step, to re-determine the relative position information between the second electronic device and the first electronic device.

In another scenario, the second electronic device detects, by using the built-in accelerometer sensor, gyro sensor, or magnetometer sensor, that the position of the second electronic device changes. In this case, the second electronic device sends a relative position information determining request to the first electronic device. The first electronic device performs, in response to the relative position information determining request, a step of sending the first sound wave signal to the second electronic device by using the first speaker and sending the second sound wave signal to the second electronic device by using the second speaker and a subsequent step, to re-determine the relative position information between the second electronic device and the first electronic device.

In some embodiments, when any one of the following cases is detected, the first electronic device performs the step of sending the first sound wave signal to the second electronic device by using the first speaker and sending the second sound wave signal to the second electronic device by using the second speaker: The first electronic device establishes the pairing connection to the second electronic device, and an extension display application in the first electronic device is started; or the first electronic device establishes the pairing connection to the second electronic device, and the first electronic device detects a second preset operation; or the first electronic device detects a second preset operation; or an extension display application in the first electronic device is started. If the any one of the foregoing cases is satisfied, the first electronic device performs the step of sending the first sound wave signal to the second electronic device by using the first speaker and sending the second sound wave signal to the second electronic device by using the second speaker.

With reference to the second aspect, in some embodiments, the position determining method may further include: detecting a third operation for the first target content displayed by the first electronic device, where the third operation is an operation of projecting second target content; determining whether the relative position information meets a preset position requirement; and if the relative position information meets the preset position requirement, sending, by the first electronic device, the second target content to the display interface of the second electronic device for display.

The preset position requirement may be that the second electronic device is located on a front side or a rear side of the first electronic device. Alternatively, the preset projection condition may be that the second electronic device is located on the left side of the first electronic device. Alternatively, the preset projection condition may be that the second electronic device is located on the right side of the first electronic device.

With reference to the second aspect, in some embodiments, the position determining method may include: The first electronic device generates second prompt information. The second prompt information prompts the user to place the second electronic device in a target region of the first electronic device. The second target is one or more of the front and rear-side region, the left-side region, and the right-side region. The user can help, based on the second prompt information, the user place the second electronic device in a correct region, to quickly implement projection.

The second target content may or may not have a privacy requirement. For the second target content that has the privacy requirement, a case of privacy leakage should be prevented, or a risk of privacy leakage should be reduced.

In a scenario, for the second target content that has the privacy requirement, if the relative position information meets the preset position requirement, and a distance between the first electronic device and the second electronic device is less than a threshold, the first electronic device sends the second target content to the display interface of the second electronic device for display. When the relative position information meets the preset position requirement, and the distance between the first electronic device and the second electronic device is less than the threshold, the second target content that has the privacy requirement is sent to the second electronic device for projection display. This can prevent the case of privacy leakage of the second target content or reduce the risk of privacy leakage of the second target content.

However, when projection display is established between the first electronic device and the second electronic device, if the relative position information between the second electronic device and the first electronic device changes, and changed relative position information does not meet the preset position requirement, and/or the distance between the first electronic device and the second electronic device is greater than the threshold, the first electronic device sends, to the second electronic device, request information requesting the second electronic device to stop displaying the second target content.

In another scenario, for the second target content that does not have the privacy requirement, if the relative position information meets the preset position requirement, the first electronic device sends the second target content to the display interface of the second electronic device for display.

In addition, for the second target content that does not have the privacy requirement, when projection display is established between the first electronic device and the second electronic device, if the relative position information between the second electronic device and the first electronic device changes, and changed relative position information does not meet the preset position requirement, and/or the distance between the first electronic device and the second electronic device is greater than the threshold, the second electronic device continues to display the second target content.

According to a third aspect, an embodiment of this application provides a position determining method, including: A second electronic device receives, by using a first microphone, a first sound wave signal and a second sound wave signal that are sent by a first electronic device. The first sound wave signal and the second sound wave signal are two sound wave signals with different features. The second electronic device obtains a receiving result of receiving the first sound wave signal and the second sound wave signal by the first microphone. The second electronic device determines relative position information between the first electronic device and the second electronic device based on the receiving result of the first microphone. Alternatively, the second electronic device sends the receiving result to the first electronic device, so that the first electronic device determines relative position information based on the receiving result.

In this embodiment of this application, when the relative position information between the second electronic device and the first electronic device is determined, there is only one manner of placing the two speakers of the first electronic device relative to the first electronic device. Regardless of any position that is of the first electronic device and at which the second electronic device is located, the manner of placing the two speakers does not affect the determined relative position information. Therefore, compared with that in the conventional technology, in this embodiment of this application, the relative position information between the second electronic device and the first electronic device can be more accurately determined. In addition, this embodiment of this application can be implemented when the first electronic device has the first speaker and the second speaker and the second electronic device has one microphone, and therefore is easy to implement.

It should be noted that the relative position information between the second electronic device and the first electronic device may be position information of the second electronic device relative to the first electronic device or position information of the first electronic device relative to the second electronic device. This is not limited in embodiments of this application.

In this embodiment of this application, the first sound wave signal and the second sound wave signal may be sound wave signals with same time sequences or sound wave signals with different time sequences.

The sound wave signal may be an infrasound wave signal with a frequency of 0 to 20 kHz or an ultrasonic signal with a frequency of more than 20 kHz. For example, a frequency of the sound wave signal may be 1 kHz, 2 kHz, 3 kHz, 5 kHz, 10 kHz, 15 kHz, 20 kHz, or 30 kHz.

In some embodiments, the sound wave signal may be an ultrasonic signal.

In some embodiments, before the second electronic device receives, by using the first microphone, the first sound wave signal and the second sound wave signal that are sent by the first electronic device, the position determining method may further include: establishing a pairing connection between the first electronic device and the second electronic device.

With reference to the third aspect, in some embodiments, the receiving result includes a time difference between moments at which the first microphone receives the first sound wave signal and the second sound wave signal, and/or signal strength of each of the first sound wave signal and the second sound wave signal that are received by the first microphone.

With reference to the third aspect, in some embodiments, the receiving result is the time difference. That the second electronic device obtains a receiving result of receiving the first sound wave signal and the second sound wave signal by the first microphone includes: converting the first sound wave signal and the second sound wave signal to a same frequency band; and performing correlation calculation on the first sound wave signal and the second sound wave signal that are converted to the same frequency band, and determining the time difference between the moments at which the first microphone receives the first sound wave signal and the second sound wave signal.

For example, after the first microphone of the second electronic device receives the first sound wave signal and the second sound wave signal that are sent by the first electronic device, the sound wave signals may be filtered by using a filter, to obtain the first sound wave signal and the second sound wave signal. It should be noted that a first sound wave signal $x_1(t)$ and a second sound wave signal $x_2(t)$ are affected by channel information, a delay, or the like in a channel transmission process. As a result, after the second electronic device receives the two sound wave signals, the first sound wave signal $x_1(t)$ is converted into a first sound wave signal $y_1(t)$, and the second sound wave signal $x_2(t)$ is converted into a second sound wave signal $y_2(t)$.

For example, the second electronic device may perform frequency conversion processing on the first sound wave signal $y_1(t)$, to convert the first sound wave signal $y_1(t)$ and the second sound wave signal $y_2(t)$ to a same frequency band. Alternatively, the second electronic device may perform frequency conversion processing on the second sound wave signal $y_2(t)$, to convert the first sound wave signal $y_1(t)$ and the second sound wave signal $y_2(t)$ to a same frequency band. Alternatively, the second electronic device may perform frequency conversion processing on both the first sound wave signal $y_1(t)$ and the second sound wave signal $y_2(t)$, to convert the first sound wave signal $y_1(t)$ and the second sound wave signal $y_2(t)$ to a same frequency band.

For example, the time difference may be represented as a difference $\tau^*$ between quantities of sampling points at which the first microphone samples the first sound wave signal and the second sound wave signal. A time difference threshold may be represented as a preset sampling point value. The preset sampling point value is positively correlated with a first spacing and a sampling frequency of the first microphone, and the first spacing is a distance between the first speaker and the second speaker.

In a scenario in which time sequences of the first sound wave signal and the second sound wave signal are different, if the first sound wave signal first arrives at the first microphone, and then the second sound wave signal arrives at the first microphone, a correlation calculation formula may be $$z(\tau) = \sum_t y_1(t) y_2'(t - \tau).$$

$y_1(t)$ represents a value of the first sound wave signal $y_1(t)$ at a sampling moment t. $y_2'(t-\tau)$ represents a value of the second sound wave signal $y_2'(t)$ at a sampling moment $t-\tau$. When a peak value of $y_1(t)$ overlaps a peak value of $y_2'(t-\tau)$, a peak value of $z(\tau)$ and a quantity of sampling points $\tau^*$ that corresponds to a time difference between moments at which the first sound wave signal and the second sound wave signal arrive at the first microphone may be obtained.

In the scenario in which the time sequences of the first sound wave signal and the second sound wave signal are different, if the second sound wave signal first arrives at the first microphone, and then the first sound wave signal arrives at the first microphone, a correlation calculation formula may be $$z(\tau) = \sum_t y_1(t - \tau) y_2'(t).$$

$y_1(t-\tau)$ represents a value of the first sound wave signal $y_1(t)$ at a sampling moment $t-\tau$. $y_2'(t)$ represents a value of the second sound wave signal $y_2'(t)$ at a sampling moment t. When a peak value of $y_1(t-\tau)$ overlaps a peak value of $y_2'(t)$, a peak value of $z(\tau)$ and a quantity of sampling points $\tau^*$ that corresponds to a time difference between moments at which the first sound wave signal and the second sound wave signal arrive at the first microphone may be obtained.

In a scenario in which time sequences of the first sound wave signal and the second sound wave signal are the same, the first electronic device sends the first sound wave signal at a first moment by using the first speaker, and sends the second sound wave signal at a second moment by using the second speaker. The first moment is different from the second moment. The second electronic device performs correlation calculation on the received sound wave signal and the first sound wave signal or the second sound wave signal, and determines the time difference between the moments at which the first microphone receives the first sound wave signal and the second sound wave signal.

For example, correlation calculation is performed on the received sound wave signal and the first sound wave signal or the second sound wave signal, and time values corresponding to two peak values in a correlation calculation result are determined. Then, the time difference between the moments at which the first microphone receives the first sound wave signal and the second sound wave signal is determined based on the time values corresponding to the two peak values and a time length of the first sound wave signal or a time length of the second sound wave signal.

For example, the time difference may be determined by using $\tau^* = \tau_1 - (\tau_2 - T_9 - T_{10})$. $\tau_1$ is the time value that corresponds to the peak value of the sound wave signal received by the second electronic device and that is in correlation calculation. $\tau_2$ is the time value corresponding to the peak value of the first sound wave signal in correlation calculation. $T_9$ is the time length of the first sound wave signal or the second sound wave signal. $T_{10}$ is duration from a moment at which the first speaker ends sending the first sound wave signal to a moment at which the second speaker starts to send the second sound wave signal.

The first electronic device may notify the second electronic device of time sequence information of the first sound wave signal or the second sound wave signal in a manner, for example, Wi-Fi or Bluetooth. Alternatively, the second electronic device may pre-store time sequence information of the first sound wave signal or the second sound wave signal, and the first electronic device does not need to notify the second electronic device of the time sequence information of the first sound wave signal or the second sound wave signal.

With reference to the third aspect, in some embodiments, the relative position information includes at least one of the following: the second electronic device is located on the left side of the first electronic device, the second electronic device is located on the right side of the first electronic device, and the second electronic device is located on the front side or the rear side of the first electronic device.

With reference to the third aspect, in some embodiments, the receiving result is the time difference. That the second electronic device determines relative position information between the first electronic device and the second electronic device based on the receiving result of the first microphone includes: calculating the time difference obtained by subtracting a fourth moment from a third moment, where the third moment is the moment at which the first microphone receives the first sound wave signal, the fourth moment is the moment at which the first microphone receives the second sound wave signal, the first speaker is located on a first side of the second speaker, the second speaker is located on a second side of the first speaker, and the first side is a left side or a right side; and if the time difference is greater than or equal to a first time difference threshold, determining that the second electronic device is located on a second side of the first electronic device, where the first time difference threshold is a positive number; if the time difference is less than or equal to a second time difference threshold, determining that the second electronic device is located on a first side of the first electronic device, where the second time difference threshold is a negative number; or if the time difference is less than a first time difference threshold and greater than a second time difference threshold, determining that the second electronic device is located on the front side or the rear side of the first electronic device.

With reference to the third aspect, in some embodiments, the receiving result is the signal strength. That the second electronic device determines relative position information between the first electronic device and the second electronic device based on the receiving result of the first microphone includes: comparing a first power with a second power, where the first power is the signal strength of the first sound wave signal, the second power is the signal strength of the second sound wave signal, the first speaker is located on a first side of the second speaker, the second speaker is located on a second side of the first speaker, and the first side is a left side or a right side; and if the first power and the second power satisfy a first preset relationship, determining that the second electronic device is located on a first side of the first electronic device, where the first preset relationship is that a result of subtracting the second power from the first power is greater than or equal to a first power threshold, and the first power threshold is a positive number, or the first preset relationship is that a result of dividing the first power by the second power is greater than or equal to a first ratio, and the first ratio is greater than 1; if the first power and the second power satisfy a second preset relationship, determining that the second electronic device is located on a second side of the first electronic device, where the second preset relationship is that a result of subtracting the second power from the first power is less than or equal to a second power threshold, and the second power threshold is a negative number, or the second preset relationship is that a result of dividing the first power by the second power is less than or equal to a second ratio, and the first ratio is less than 1; or if the first power and the second power satisfy a third preset relationship, determining that the second electronic device is located on the front side or the rear side of the first electronic device, where the third preset relationship is that a result of subtracting the second power from the first power is less than a first power threshold and greater than a second power threshold, or the third preset relationship is that a result of dividing the first power by the second power is less than a first ratio and greater than a second ratio.

In some embodiments, the first ratio and the second ratio are reciprocals of each other.

With reference to the third aspect, in some embodiments, that the second electronic device determines relative position information between the first electronic device and the second electronic device based on the receiving result of the first microphone includes: determining an angle of the second electronic device relative to the first electronic device based on a time difference, a first spacing, and a sampling frequency. The first spacing is a distance between the first speaker and the second speaker, and the sampling frequency is a sampling frequency of a microphone of the second electronic device.

For example, the time difference may be represented as a difference $\tau^*$ between quantities of sampling points at which the first microphone of the second electronic device samples the first sound wave signal and the second sound wave signal. The determining an angle of the second electronic device relative to the first electronic device includes: determining, by using a preset formula, the angle of the second electronic device relative to the first electronic device based on a reference angle, the first spacing, and the difference $\tau^*$ between the quantities of sampling points. For specific content, refer to related descriptions in the second aspect. Details are not described herein again.

With reference to the third aspect, in some embodiments, after a position of the second electronic device changes, a relative position information re-determining request is sent to the first electronic device. The first electronic device performs, in response to the relative position information determining request, a step of sending the first sound wave signal to the second electronic device by using the first speaker and sending the second sound wave signal to the second electronic device by using the second speaker and a subsequent step. The second electronic device performs a step of receiving the first sound wave signal and the second sound wave signal by using the first microphone and a subsequent step.

It should be noted that there may be one first microphone or a plurality of first microphones. When there are the plurality of first microphones, there may be a plurality of manners of collecting a sound wave signal.

In a scenario, that the second electronic device determines the time difference between the moments at which the first sound wave signal and the second sound wave signal are received includes: The second electronic device controls one first microphone to collect the two sound wave signals. The second electronic device determines the time difference based on the first sound wave signal and the second sound wave signal that are collected by the first microphone.

In a scenario, that the second electronic device determines the time difference between the moments at which the first sound wave signal and the second sound wave signal are received includes: The second electronic device controls each of the plurality of first microphones to collect the first sound wave signal and the second sound wave signal. The second electronic device obtains the first sound wave signal and the second sound wave signal that are collected by any of the first microphones, to determine the time difference.

In a scenario, that the second electronic device determines the time difference between the moments at which the first sound wave signal and the second sound wave signal are received includes: The second electronic device controls each of the plurality of first microphones to collect the first sound wave signal and the second sound wave signal. The second electronic device calculates the first sound wave signal and the second sound wave signal that are collected by each first microphone, to obtain a plurality of initial time differences. Each first microphone corresponds to one initial time difference. The second electronic device determines the time difference based on the plurality of initial time differences.

According to a fourth aspect, an embodiment of this application provides an audio playing method, including: A first electronic device separately sends a first sound wave signal to a first audio playing device and a second audio playing device by using a first speaker, and separately sends a second sound wave signal to the second audio playing device and the second audio playing device by using a second speaker. The first speaker is different from the second speaker, and the first sound wave signal and the second sound wave signal are two sound wave signals with different features. The first electronic device receives first relative position information between the first audio playing device and the first electronic device sent by the first audio playing device and second relative position information between the second audio playing device and the first electronic device sent by the second audio playing device. The first relative position information is determined based on a receiving result of receiving the first sound wave signal and the second sound wave signal by a first microphone of the first audio playing device. The second relative position information is determined based on a receiving result of receiving the first sound wave signal and the second sound wave signal by a second microphone of the second audio playing device. Alternatively, the first electronic device receives a first receiving result sent by the first audio playing device and a second receiving result sent by the second audio playing device. The first receiving result is a receiving result of receiving the first sound wave signal and the second sound wave signal by a first microphone of the first audio playing device. The second receiving result is a receiving result of receiving the first sound wave signal and the second sound wave signal by a second microphone of the second audio playing device. The first electronic device determines first relative position information based on the first receiving result, and determines second relative position information based on the second receiving result. The first electronic device determines third relative position information between the first audio playing device and the second audio playing device based on the first relative position information and the second relative position information. The third relative position information includes that the first audio playing device is located on a third side of the second audio playing device, and the second audio playing device is located on a fourth side of the first audio playing device. The third side is a left side or a right side. The first electronic device sends left-channel audio information to an audio playing device that is located on the left side and that is in the first audio playing device and the second audio playing device, and sends right-channel audio information to an audio playing device that is located on the right side and that is in the first audio playing device and the second audio playing device.

In this embodiment of this application, the first electronic device can automatically determine the third relative position information between the first audio playing device and the second audio playing device, and then send the left-channel audio information to the audio playing device located on the left side, and send the right-channel audio information to the audio playing device located on the right side, without requiring to manually set a position relationship between the first audio playing device and the second audio playing device.

It should be noted that the first relative position information may be position information of the first audio playing device relative to the first electronic device or position information of the first electronic device relative to the first audio playing device. This is not limited in embodiments of this application. Similarly, the second relative position information may be position information of the second audio playing device relative to the first electronic device or position information of the first electronic device relative to the second audio playing device. This is not limited in embodiments of this application.

With reference to the fourth aspect, in some embodiments, the first receiving result includes a time difference between moments at which the first microphone receives the first sound wave signal and the second sound wave signal, and/or signal strength of each of the first sound wave signal and the second sound wave signal that are received by the first microphone.

With reference to the fourth aspect, in some embodiments, the second receiving result includes a time difference between moments at which the second microphone receives the first sound wave signal and the second sound wave signal, and/or signal strength of each of the first sound wave signal and the second sound wave signal that are received by the second microphone.

With reference to the fourth aspect, in some embodiments, determining the third relative position information between the first audio playing device and the second audio playing device may include: If the first audio playing device and the second audio playing device are located in two regions of the first electronic device, the first electronic device determines the third relative position information based on a position relationship between the two regions. If the first audio playing device and the second audio playing device are located in a same region of the first electronic device, the first electronic device determines the third relative position information between the first audio playing device and the second audio playing device based on a first angle and a second angle. The first angle is an angle of the first audio playing device relative to the first electronic device, and the second angle is an angle of the second audio playing device relative to the first electronic device.

In a scenario, if the first audio playing device is located in a left-side region of the first electronic device, and the second audio playing device is located in a front and rear-side region or a right-side region of the first electronic device, it indicates that the first audio playing device is located on the left side of the second audio playing device. In this case, the first electronic device sends the left-channel audio information to the first audio playing device, and sends the right-channel audio information to the second audio playing device.

In a scenario, if the first audio playing device is located in a right-side region of the first electronic device, and the second audio playing device is located in a front and rear-side region or a left-side region of the first electronic device, it indicates that the first audio playing device is located on the right side of the second audio playing device. In this case, the first electronic device sends the left-channel audio information to the second audio playing device, and sends the right-channel audio information to the first audio playing device.

In a scenario, if the first audio playing device and the second audio playing device are located in a same-side region of the first electronic device, the first electronic device may determine the third relative position information based on the first angle and the second angle.

For example, if both the first audio playing device and second audio playing device are located in a left-side region of the first electronic device, the angle of the first audio playing device relative to the first electronic device is $\alpha 1$, the angle of the second audio playing device relative to the first electronic device is $\alpha 2$, and $\alpha 1$ is greater than $\alpha 2$, the first electronic device determines, based on $\alpha 1$ and $\alpha 2$, that the first audio playing device is located on the right side of the second audio playing device. Then, the first electronic device sends the right-channel audio information to the first audio playing device, and sends the left-channel audio information to the second audio playing device.

If both the first audio playing device and the second audio playing device are located in a left-side region of the first electronic device, the angle of the first audio playing device relative to the first electronic device is $\alpha 1$, the angle of the second audio playing device relative to the first electronic device is $\alpha 2$, and $\alpha 1$ is less than $\alpha 2$, the first electronic device determines, based on $\alpha 1$ and $\alpha 2$, that the first audio playing device is located on the left side of the second audio playing device. Then, the first electronic device sends the right-channel audio information to the second audio playing device, and sends the left-channel audio information to the first audio playing device.

According to a fifth aspect, an embodiment of this application provides an electronic device, including one or more processors, a memory, and a display. The memory and the display are coupled to the one or more processors. The memory is configured to store computer program code, and the computer program code includes computer instructions. When the one or more processors execute the computer instructions, the electronic device is enabled to perform the method according to any one of the first aspect, the method according to any one of the second aspect, the method according to any one of the third aspect, or the method according to any one of the fourth aspect.

According to a sixth aspect, an embodiment of this application provides a chip system. The chip system includes a processor, and the processor is coupled to a memory. The processor executes a computer program stored in the memory, to implement the method according to any one of the first aspect, the method according to any one of the second aspect, the method according to any one of the third aspect, or the method according to any one of the fourth aspect. The chip system may be a single chip or a chip module including a plurality of chips.

According to a seventh aspect, an embodiment of this application provides a chip system. The chip system includes a memory and a processor. The processor executes a computer program stored in the memory, to implement the method according to any one of the first aspect, the method according to any one of the second aspect, the method according to any one of the third aspect, or the method according to any one of the fourth aspect. The chip system may be a single chip or a chip module including a plurality of chips.

According to an eighth aspect, an embodiment of this application provides a computer program product. When the computer program product runs on a terminal device, the electronic device is enabled to perform the method according to any one of the first aspect, the method according to any one of the second aspect, the method according to any one of the third aspect, or the method according to any one of the fourth aspect.

According to a ninth aspect, an embodiment of this application provides a computer-readable storage medium. The computer-readable storage medium stores a computer program. When the computer program is executed by a processor, the method according to any one of the first aspect, the method according to any one of the second aspect, the method according to any one of the third aspect, or the method according to any one of the fourth aspect is implemented.

It may be understood that the electronic device according to the fifth aspect, the chip systems according to the sixth aspect and the seventh aspect, the computer program product according to the eighth aspect, and the computer-readable storage medium according to the ninth aspect are all configured to perform the method according to the first aspect, the method according to the second aspect, the method according to the third aspect, or the method according to the third aspect. Therefore, for beneficial effect that can be achieved by the electronic device, the chip systems, the computer program product, and the computer-readable storage medium, refer to beneficial effect in corresponding methods. Details are not described herein again.

BRIEF DESCRIPTION OF DRAWINGS

FIG. 1 is a schematic diagram of a scenario of a ranging algorithm according to a related technology 1;

FIG. 2 is a schematic diagram of a scenario of another ranging algorithm according to a related technology 2;

FIG. 3 is a schematic diagram of a scenario of an algorithm for determining a relative position between electronic devices according to a related technology 3;

FIG. 21 is a schematic flowchart of determining relative position information according to an embodiment of this application;

DESCRIPTION OF EMBODIMENTS

Figure 4:
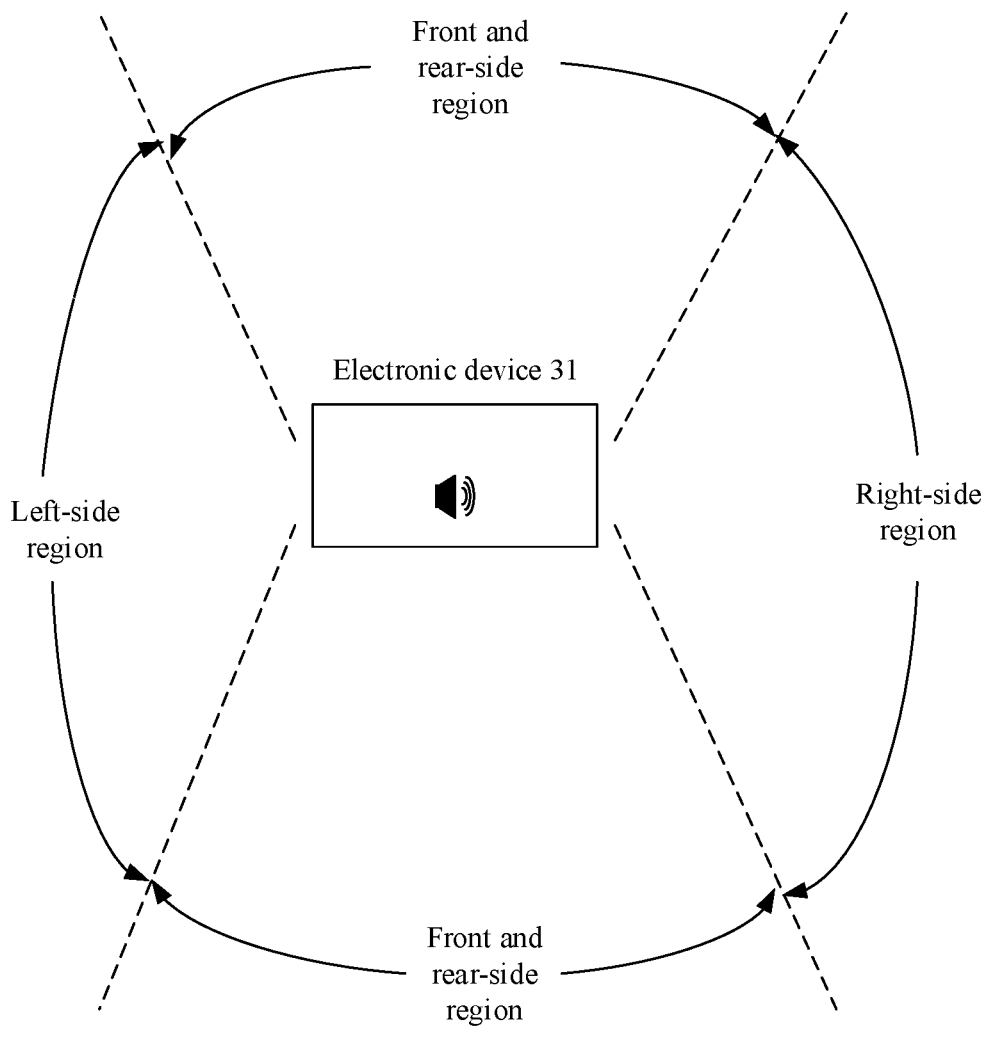
FIG. 4 is a schematic diagram of region division of an electronic device.

In the following descriptions, for illustration instead of limitation, specific details such as a particular system structure and a technology are provided to make a thorough understanding of embodiments of this application. However, a person skilled in the art should know that this application may be implemented in other embodiments without these specific details. In other cases, detailed descriptions of well-known systems, apparatuses, circuits, and methods are omitted, so that this application is described without being obscured by unnecessary details.

It should be understood that, when being used in the specification and the appended claims of this application, the term "include" indicates presence of described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and the appended claims of this application, the terms "first", "second", "third", and the like are merely intended for a purpose of distinction and description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, in this specification, statements "in an embodiment", "in some embodiments", "in some other embodiments", "in other embodiments", and the like that appear at different places do not necessarily mean referring to a same embodiment, instead, the statements mean referring to "one or more but not all of the embodiments", unless otherwise specifically emphasized in other ways. The terms "include", "comprise", "have", and variants of the terms all mean "include but are not limited to", unless otherwise specifically emphasized in other ways.

In addition, "a plurality of" mentioned in embodiments of this application should be interpreted as two or more.

Steps in a method for interaction between devices and a position determining method that are provided in embodiments of this application are merely examples. Not all steps are mandatory, or not all content in each piece of information or each message is mandatory. The steps or the content may be added or reduced as required in a use process.

A same step or steps or messages having a same function in embodiments of this application may be mutually referenced in different embodiments.

A service scenario described in embodiments of this application is intended to describe the technical solutions in embodiments of this application more clearly, and constitutes no limitation on the technical solutions provided in embodiments of this application. A person of ordinary skill in the art may learn that with evolution of a network architecture and emergence of a new service scenario, the technical solutions provided in embodiments of this application are also applicable to similar technical problems.

FIG. 1 is a schematic diagram of a scenario of a ranging algorithm according to a related technology 1. In the scenario, an electronic device 10 and an object 20 are included. The electronic device 10 is located at a target position. A distance between the target position and the object 20 is determined by measuring a distance between the electronic device 10 and the object 20.

Refer to FIG. 1. The ranging algorithm for determining the distance between the target position and the object 20 may be as follows: The electronic device 10 transmits a sound wave signal to the object 20, and receives the sound wave signal reflected by the object 20. The electronic device 10 determines the distance between the target position and the object 20 based on propagation duration and a propagation velocity of the sound wave signal.

For example, the electronic device 10 transmits the sound wave signal at a moment $T_1$ by using a speaker. The sound wave signal is blocked by the object 20 and then reflected back to the electronic device 10. The electronic device 10 receives the reflected sound wave signal at a moment $T_2$ by using a microphone. It can be learned from FIG. 1 that a distance at which the sound wave signal is transmitted from the electronic device 10 to the object 20 is the same as a distance at which the sound wave signal is reflected from the object 20 back to the electronic device 10. Therefore, a distance at which the sound wave signal is transmitted from the electronic device 10 to the object 20 and then reflected from the object 20 back to the electronic device 10 is equivalent to twice the distance between the electronic device 10 and the object 20. Therefore, that $$D_1 = \frac{T_2 - T_1}{2} \cdot c$$

can be obtained. $D_1$ is the distance between the electronic device 100 and the object 200, and c is the propagation velocity of the sound wave signal, and is a sound velocity. The distance between the electronic device 10 and the object 20 is the distance between the target position and the object 20.

In this embodiment, the distance between the target position and the object 20 can be measured by using one electronic device 10. However, the electronic device 10 can receive the reflected sound wave signal only after the sound wave signal needs to be reflected by using the object 20. Therefore, the ranging algorithm can be used only for ranging an object with a larger area, for example, a wall or a human body. However, for an object with a smaller area, the object cannot provide a reflective surface that reflects the sound wave signal back to the electronic device 10. Therefore, a distance between the target position and the object with the smaller area cannot be measured according to the ranging algorithm.

FIG. 2 is a schematic diagram of a scenario of another ranging algorithm according to a related technology 2. In the scenario, an electronic device 21 and an electronic device 22 are included. The electronic device 21 is located at a first position, and the electronic device 22 is located at a second position. The electronic device 21 has at least one speaker, and the electronic device 22 has at least one microphone. One speaker of the electronic device 21 can transmit a sound wave signal, and one microphone of the electronic device 22 can receive the sound wave signal.

Refer to FIG. 2. The ranging algorithm for determining a distance between the first position and the second position may be as follows: The electronic device 21 transmits the sound wave signal to the electronic device 22, and the electronic device 22 determines the distance between the first position and the second position based on propagation duration and a propagation velocity of the sound wave signal. Alternatively, the electronic device 22 at the second position transmits a sound wave signal to the electronic device 21 at the first position, and the electronic device 21 determines the distance between the first position and the second position based on propagation duration and a propagation velocity of the sound wave signal.

For example, the electronic device 21 transmits the sound wave signal at a moment $T_3$ by using the speaker. The sound wave signal carries information about the moment $T_3$. The electronic device 22 receives the sound wave signal at a moment $T_4$ by using the microphone, parses out the moment $T_3$ at which the electronic device 21 transmits the sound wave signal, and then may obtain, based on the moment $T_4$ at which the sound wave signal is received, that $D_2=(T_4-T_3)\cdot c$. $D_2$ is a distance between the electronic device 21 and the electronic device 22, and c is the propagation velocity of the sound wave signal, and is a sound velocity. The distance between the electronic device 21 and the electronic device 22 is the distance between the first position and the second position.

In this embodiment, the distance between the first position and the second position is measured by using two electronic devices. It can be learned, from that $D_2=(T_4-T_3)\cdot c$, that c is a constant, and $T_3$ and $T_4$ are variables. Therefore, accuracy of $(T_4-T_3)$ has large impact on accuracy of a ranging result. Because the electronic device 21 and the electronic device 22 are different electronic devices, if time synchronization precision of the two electronic devices is poor, accuracy of $(T_4-T_3)$ is consequently poor. As a result, an error of the ranging result of the distance between the first position and the second position is large.

It should be noted that, in the embodiment shown in FIG. 2, the electronic device 22 may send, to the electronic device 21, the moment $T_4$ at which the sound wave signal is received, and the electronic device 21 calculates a distance between the electronic device 21 and the electronic device 22 according to $D_2=(T_4-T_3)\cdot c$. Alternatively, the electronic device 22 may send, to another electronic device, the moment $T_4$ at which the sound wave signal is received and the moment $T_3$ at which the electronic device 21 transmits the sound wave signal. The another electronic device calculates a distance between the electronic device 21 and the electronic device 22 according to $D_2=(T_4-T_3)\cdot c$.

FIG. 3 is a schematic diagram of a scenario of an algorithm for determining a relative position between electronic devices according to a related technology 3. In the scenario, an electronic device 31 and an electronic device 32 are included. The electronic device 31 is located at a first position, and the electronic device 32 is located at a second position. The electronic device 31 has at least one speaker, and the electronic device 32 has at least two microphones (two microphones are shown in FIG. 3, but this constitutes no limitation). One speaker of the electronic device 31 can transmit a sound wave signal, and each microphone of the electronic device 32 can receive the sound wave signal.

Refer to FIG. 3. The algorithm for determining a relative position between electronic devices may be as follows: The speaker of the electronic device 31 transmits the sound wave signal to the electronic device 32. The two microphones of the electronic device 32 receive the sound wave signal. The electronic device 32 determines a relative position between the electronic device 32 and the electronic device 31 based on time points at which the two microphones receive the sound wave signal.

The following uses a specific example to specifically describe the algorithm for determining a relative position between electronic devices.

The electronic device 31 has one speaker, and the electronic device 32 has a microphone M1 and a microphone M2. The microphone M2 is located on the right side of the microphone M1. For example, the electronic device 31 transmits the sound wave signal by using the speaker, the microphone M1 of the electronic device 32 receives the sound wave signal at a moment $T_5$, and the microphone M2 receives the sound wave signal at a moment $T_6$. In this case, the electronic device 32 may determine the relative position between the electronic device 31 and the electronic device 32 based on $T_5$ and $T_6$.

For example, if $T_5$ is earlier than $T_6$, it indicates that the sound wave signal first arrives at the microphone M1 and then arrives at the microphone M2. In this case, the electronic device 32 may determine that the electronic device 32 is located in a right-side region of the electronic device 31, as shown in FIG. 4. If $T_5$ is later than $T_6$, it indicates that the sound wave signal first arrives at the microphone M2 and then arrives at the microphone M1. In this case, the electronic device 32 may determine that the electronic device 32 is located in a left-side region of the electronic device 31, as shown in FIG. 4. If $T_5$ is almost the same as $T_6$, it indicates that the sound wave signal arrives at the microphone M1 and the microphone M2 almost at the same time. In this case, the electronic device 32 may determine that the electronic device 32 is located in a front and rear-side region of the electronic device 31, as shown in FIG. 4.

In this embodiment, the relative position between the electronic device 31 and the electronic device 32 can be determined by using the speaker of the electronic device 31 and the two microphones of the electronic device 32. However, in existing electronic device products, there are a few electronic devices each having at least two microphones.

However, a small distance between the two microphones of the electronic device 32 has large impact on precision of the algorithm in the related technology 3. For example, if a distance between the two microphones of the electronic device 32 is $D_3$, a maximum value of a time difference $|T_5-T_6|$ between $T_5$ and $T_6$ is $D_3/c$. The distance $D_3$ between the two microphones of the electronic device 32 is in direct proportion to the maximum value $D_3/c$ of $|T_5-T_6|$. However, a distance $D_3$ between two microphones of an existing electronic device is usually small, and corresponding $D_3/c$ is also small. In most cases, $|T_5-T_6|$ is less than $D_3/c$, that is, $|T_5-T_6|$ is a small value. Therefore, $T_5$ is close to $T_6$. When $D_3$ is small, a large error may occur when the electronic device 32 determines position information between the electronic device 31 and the electronic device 32 based on $T_5$ and $T_6$.

Before impact of $D_3$ on the precision of the algorithm in the related technology 3 is described, how to divide each region in FIG. 4 is described first.

In some embodiments, the relative position between the electronic device 31 and the electronic device 32 may be determined based on a relationship between $|T_5-T_6|$ and a threshold $$t_1\left(0 < t_1 < \frac{D_3}{c}\right).$$

For example, if $T_5$ is earlier than $T_6$, and $|T_5-T_6|>t_1$, the electronic device 32 is located in the right-side region of the electronic device 31. If $T_5$ is later than $T_6$, and $|T_5-T_6|>t_1$, the electronic device 32 is located in the left-side region of the electronic device 31. If $|T_5-T_6|\leq t_1$, that is, the sound wave signal arrives at the microphone M1 and the microphone M2 almost at the same time, the electronic device 32 is located in the front and rear-side region of the electronic device 31.

In this embodiment, the threshold $t_1$ is in direct proportion to $D_3$. For example, $$t_1 = \frac{1}{3}\cdot\frac{D_3}{c}.$$

If $T_5$ is earlier than $T_6$, and $$|T_5 - T_6| > \frac{D_3}{3c},$$

the electronic device 32 is located in the right-side region of the electronic device 31. If $T_5$ is later than $T_6$, and $$|T_5 - T_6| > \frac{D_3}{3c},$$

the electronic device 32 is located in the left-side region of the electronic device 31. If $$|T_5 - T_6| \le \frac{D_3}{3c},$$

the electronic device 32 is located in the front and rear-side region of the electronic device 31.

The following describes the impact of $D_3$ on the precision of the algorithm in the related technology 3 by using an example in which $$t_1 = \frac{1}{3} \cdot \frac{D_3}{c}.$$

If $T_5$ is earlier than $T_6$, and $$\frac{D_3}{3c} < |T_5 - T_6| \le \frac{D_3}{c},$$

the electronic device 32 is located in the right-side region of the electronic device 31. If $T_5$ is later than $T_6$, and $$\frac{D_3}{3c} < |T_5 - T_6| \le \frac{D_3}{c},$$

the electronic device 32 is located in the left-side region of the electronic device 31. If $$0 \le |T_5 - T_6| \le \frac{D_3}{3c},$$

the electronic device 32 is located in the front and rear-side region of the electronic device 31.

The electronic device 32 determines $T_5$ based on a time point at which the microphone M1 collects the sound wave signal, and determines $T_6$ based on a time point at which the microphone M2 collects the sound wave signal. This imposes a high requirement on time synchronization between the microphone M1 and the microphone M2. Otherwise, the algorithm in the related technology 3 is affected to some extent. However, in an actual case, time synchronization between the microphone M1 and the microphone M2 may not meet a requirement, and has some deviations to some extent. In addition, a propagation process of the sound wave signal and another aspect of the electronic device 32 may also affect time synchronization between the microphone M1 and the microphone M2, resulting in some deviations in time synchronization.

However, $$\frac{D_3}{3c}$$

corresponding to smaller $D_3$ is less than $$\frac{D_3}{3c}$$

corresponding to larger $D_3$. Therefore, ranges of an interval $$\left( \frac{D_3}{3c}, \frac{D_3}{c} \right)$$

and an interval $$\left[ 0, \frac{D_3}{3c} \right]$$

that correspond to smaller $D_3$ are respectively less than ranges of an interval $$\left( \frac{D_3}{3c}, \frac{D_3}{c} \right)$$

and an interval $$\left[ 0, \frac{D_3}{3c} \right]$$

that correspond to larger $D_3$. Therefore, when $D_3$ is smaller, the ranges of the interval $$\left( \frac{D_3}{3c}, \frac{D_3}{c} \right)$$

and the interval $$\left[ 0, \frac{D_3}{3c} \right]$$

are smaller. A deviation caused by time synchronization between the microphone M1 and the microphone M2 has greater impact on determining, by the electronic device 32, position information of the electronic device 32 relative to the electronic device 31. However, when $D_3$ is larger, the ranges of the interval $$\left( \frac{D_3}{3c}, \frac{D_3}{c} \right)$$

and the interval $$\left[0, \frac{D_3}{3c}\right]$$

are larger. A deviation caused by time synchronization between the microphone M1 and the microphone M2 has less impact on determining, by the electronic device 32, position information of the electronic device 32 relative to the electronic device 31.

For example, when the electronic device 32 is located in the left-side region or the right-side region of the electronic device 31, and the electronic device 32 is located near a region boundary of the electronic device 31, if the distance $D_3$ between the two microphones of the electronic device 32 is smaller, the position information determined by the electronic device 32 may be that the electronic device 32 is located in the front and rear-side region of the electronic device 31. The position information is not a real position of the electronic device 32 relative to the electronic device 31. If the distance $D_3$ between the two microphones of the electronic device 32 is larger, the position information determined by the electronic device 32 may be that the electronic device 32 is located in the left-side region or the right-side region of the electronic device 31. The position information is a real position of the electronic device 32 relative to the electronic device 31.

It can be learned that the smaller distance $D_3$ between the microphone M1 and the microphone M2 has greater impact on the precision of the algorithm in the related technology 3. The larger distance $D_3$ between the microphone M1 and the microphone M2 has less impact on the precision of the algorithm in the related technology 3.

Further, the electronic device 32 may be located in any orientation of the electronic device 31, and there are a plurality manners of placing the two microphones of the electronic device 32 relative to the electronic device 31. For example, as shown in FIG. 3, the two microphones of the electronic device 32 are horizontally placed relative to the electronic device 31. For another example, as shown in FIG. 5(a), FIG. 5(b), FIG. 6(a), and FIG. 6(b), the two microphones of the electronic device 32 are vertically placed relative to the electronic device 31. In addition, the two microphones of the electronic device 32 may be placed at any angle in an inclined manner relative to the electronic device 31.

Figure 5A:
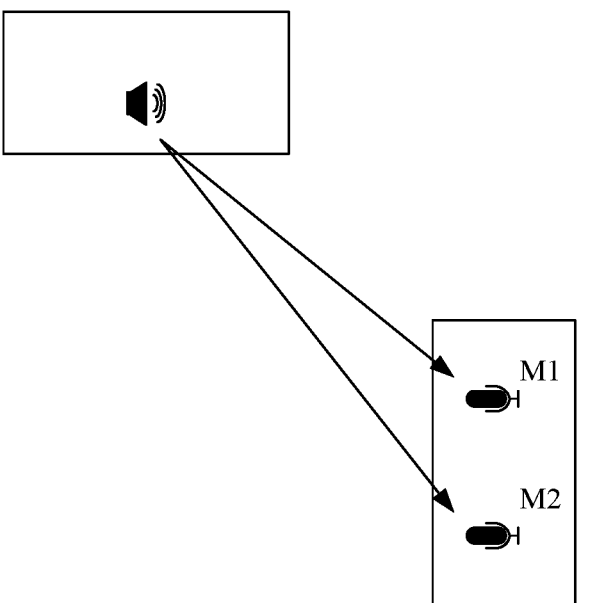
FIG. 5(*a*) and FIG. 5(*b*) are schematic diagrams of placement directions of two microphones of an electronic device.
Figure 5B:
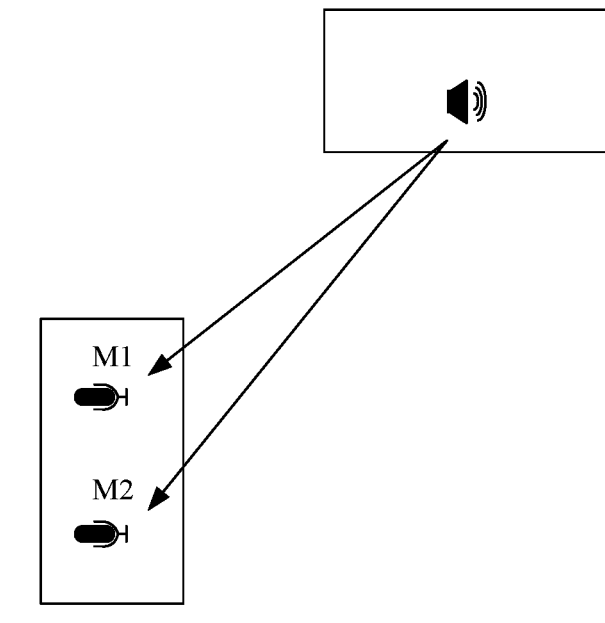

In a scenario, as shown in FIG. 5(a), when the electronic device 32 is located in the right-side region of the electronic device 31, the sound wave signal of the electronic device 31 first arrives at the microphone M1 and then arrives at the microphone M2. As shown in FIG. 5(b), when the electronic device 32 is located in the left-side region of the electronic device 31, the sound wave signal of the electronic device 31 first arrives at the microphone M1 and then arrives at the microphone M2. It can be learned that, regardless of the left-side region or the right-side region that is of the electronic device 31 and in which the electronic device 32 is located, the sound wave signal of the electronic device 31 may first arrive at the microphone M1 and then arrive at the microphone M2.

Figure 6A:
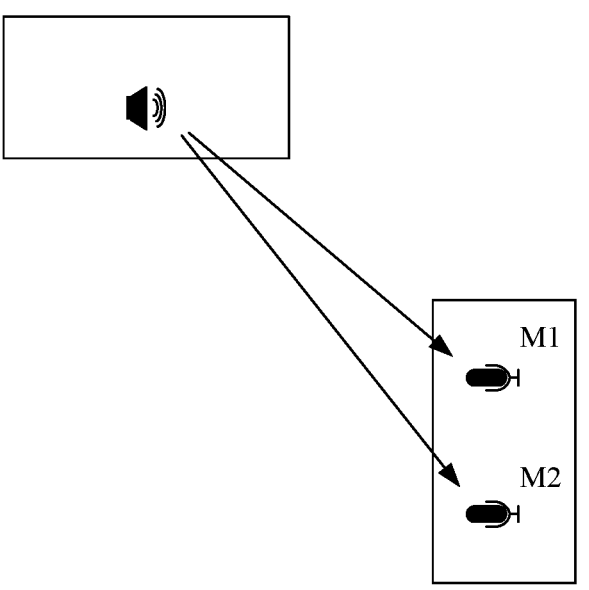
FIG. 6(*a*) and FIG. 6(*b*) are schematic diagrams of placement directions of two microphones of an electronic device.
Figure 6B:
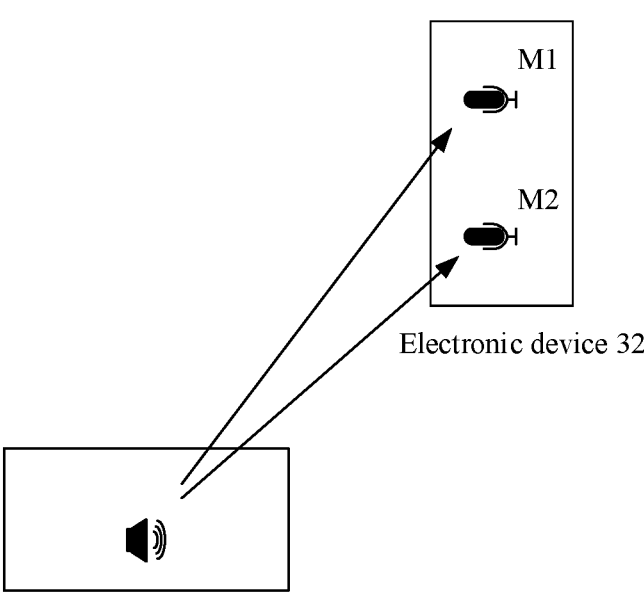

In another scenario, as shown in FIG. 6(a), when the electronic device 32 is located in a lower part of the right-side region of the electronic device 31, the sound wave signal of the electronic device 31 first arrives at the microphone M1 and then arrives at the microphone M2. As shown in FIG. 6(b), when the electronic device 32 is located in an upper part of the right-side region of the electronic device 31, the sound wave signal of the electronic device 31 first arrives at the microphone M2 and then arrives at the microphone M1. It can be learned that, when the electronic device 32 is located in the right-side region of the electronic device 31, the sound wave signal may first arrive at the microphone M1 and then arrive at the microphone M2, or the sound wave signal may first arrive at the microphone M2 and then arrive at the microphone M1.

It can be learned from content in FIG. 5(a), FIG. 5(b), FIG. 6(a), and FIG. 6(b) that, in a scenario in which the two microphones of the electronic device 32 are vertically placed relative to the electronic device 31, when the electronic device 32 is located in the left-side region or the right-side region of the electronic device 31, the electronic device 32 cannot accurately determine whether the electronic device 32 is located in the left-side region of the electronic device 31 or the right-side region of the electronic device 31.

Based on the foregoing problem, in embodiments of this application, a first electronic device has two speakers, and a second electronic device has at least one microphone. The first electronic device separately sends a first sound wave and a second sound wave with different features by using the two speakers. The second electronic device receives the first sound wave and the second sound wave by using one microphone. After receiving the first sound wave signal and the second sound wave signal, the second electronic device determines relative position information between the second electronic device and the first electronic device based on a time difference between moments at which the microphone receives the first sound wave and the second sound wave or signal strength between the first sound wave and the second sound wave.

Compared with that the electronic device 32 needs to have at least two microphones in the related technology 3, in embodiments of this application, the second electronic device only needs to have one microphone. However, in the existing electronic device products, there are a few electronic devices each having at least two microphones. Therefore, compared with the related technology 3, embodiments of this application are easier to implement.

In addition, in the related technology 3, when the position information of the electronic device 32 relative to the electronic device 31 is determined, the electronic device 31 is used as a reference, and a region that is of the electronic device 31 and in which the electronic device 32 is located needs to be determined. In this case, there may be the plurality of manners of placing the two microphones of the electronic device 32 relative to the electronic device 31 (reference). However, in embodiments of this application, when the relative position information between the second electronic device and the first electronic device is determined, a position of the first electronic device is used as a reference, and a region that is the first electronic device and in which the second electronic device is located needs to be determined. There is only one manner of placing the two speakers of the first electronic device relative to the first electronic device (reference).

Refer to FIG. 7(a), FIG. 7(b), FIG. 8(a), and FIG. 8(b). A speaker Y1 on the left side of a first electronic device 100 sends a first sound wave signal, and a speaker Y2 on the right side sends a second sound wave signal. One microphone of a second electronic device 200 receives the first sound wave signal and the second sound wave signal.

Figure 7A:
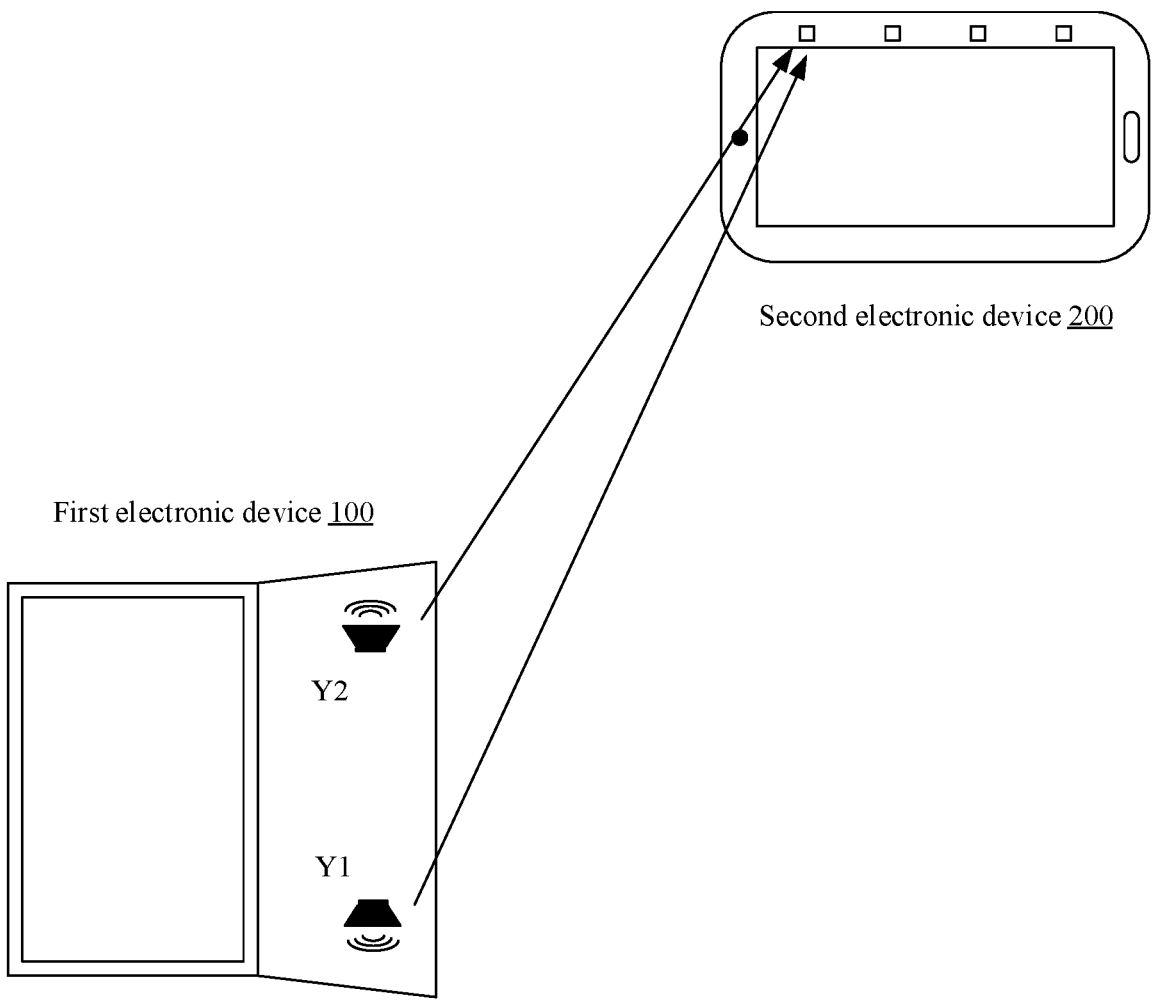
FIG. 7(*a*) and FIG. 7(*b*) are schematic diagrams of placement directions of two speakers of a first electronic device.
Figure 7B:
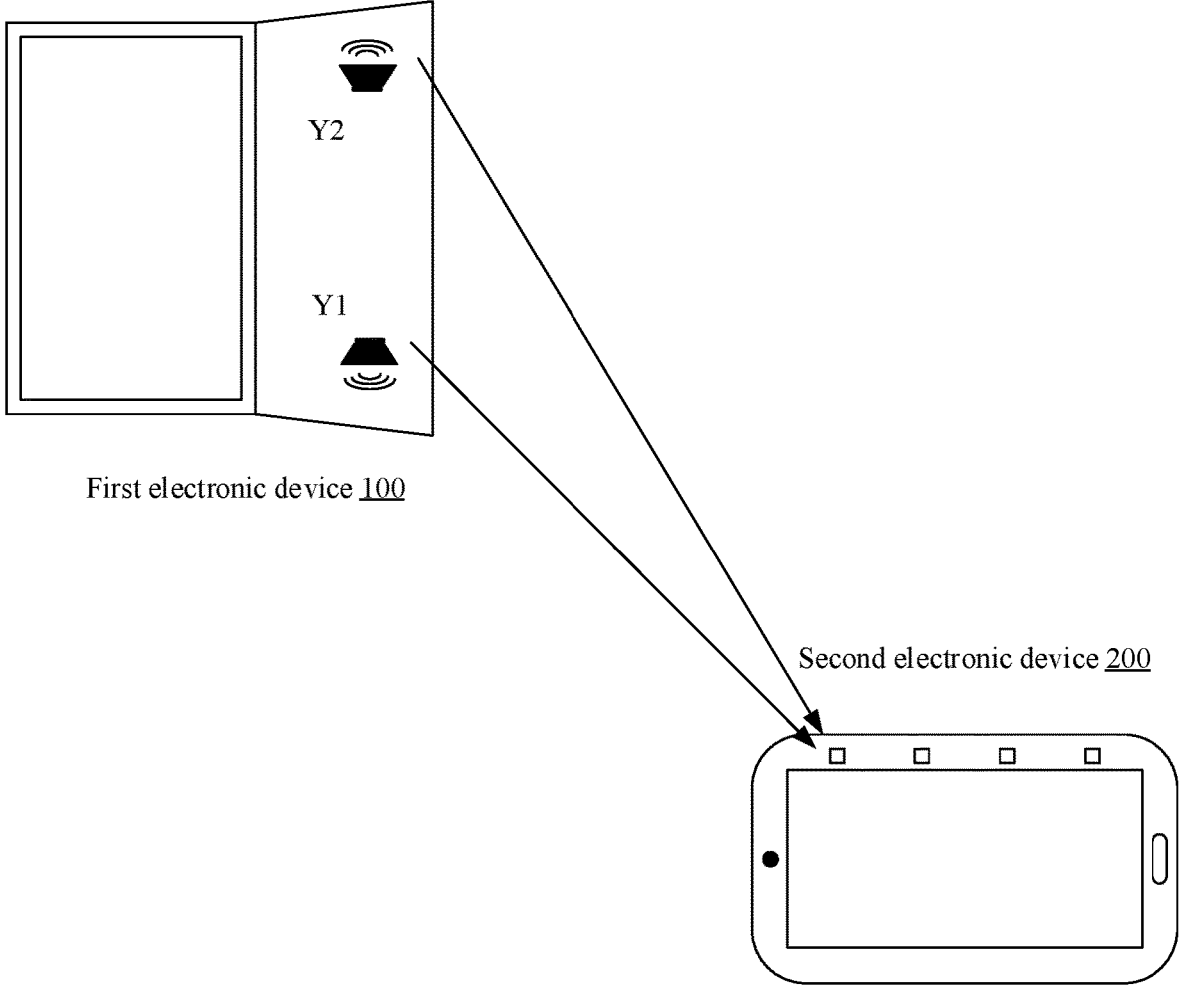

In FIG. 7(a), when the second electronic device 200 is located in a right-side region of the first electronic device 100, the second sound wave signal of the speaker Y2 first arrives at the microphone, and then the first sound wave signal of the speaker Y1 arrives at the microphone. In FIG. 7(b), when the second electronic device 200 is located in a left-side region of the first electronic device 100, the first sound wave signal of the speaker Y1 first arrives at the microphone, and then the second sound wave signal of the speaker Y2 arrives at the microphone. It can be learned that, compared with that in FIG. 5(a) and FIG. 5(b), in embodiments of this application, it can be accurately determined that the second electronic device 200 is located in the left-side region or the right-side region of the first electronic device 100.

Figure 8A:
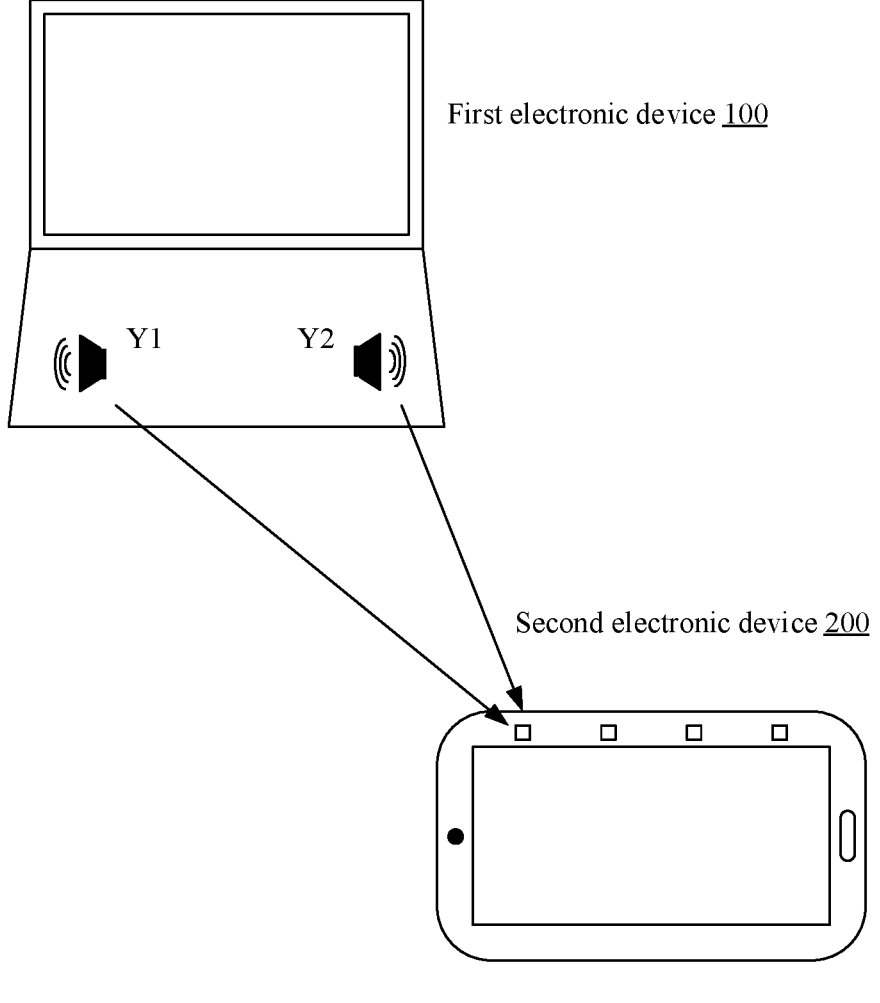
FIG. 8(*a*) and FIG. 8(*b*) are schematic diagrams of placement directions of two speakers of a first electronic device.
Figure 8B:
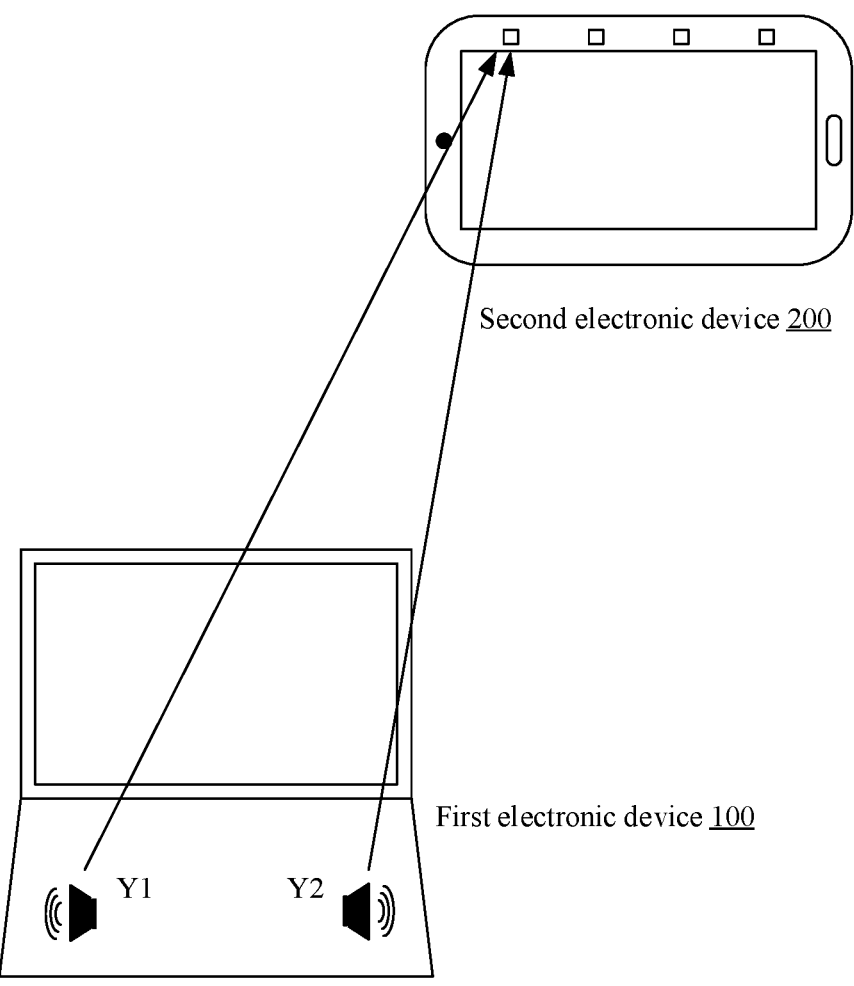

In FIG. 8(a), when the second electronic device 200 is located in a lower part of the right-side region of the first electronic device 100, the second sound wave signal of the speaker Y2 first arrives at the microphone, and then the first sound wave signal of the speaker Y1 arrives at the microphone. In FIG. 8(b), when the second electronic device 200 is located in an upper part of the right-side region of the first electronic device 100, the second sound wave signal of the speaker Y2 first arrives at the microphone, and then the first sound wave signal of the speaker Y1 arrives at the microphone. It can be learned that, compared with that in FIG. 6(a) and FIG. 6(b), in embodiments of this application, it can be accurately determined that the second electronic device 200 is located in the right-side region of the first electronic device 100.

In conclusion, it can be learned that, compared with that in the related technology 3, in embodiments of this application, in the manner of placing the two speakers of the first electronic device, the problem in FIG. 5(a), FIG. 5(b), FIG. 6(a), and FIG. 6(b) does not occur. Therefore, the relative position information between the second electronic device and the first electronic device can be accurately determined.

For example, the first electronic device may be any electronic device having two speakers, for example, a notebook computer, a television, or a display. The second electronic device may be an electronic device, for example, a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). In embodiments of this application, specific types of the first electronic device and the second electronic device are not limited.

The distance between the two microphones of the electronic device 32 in the related technology is usually smaller. For example, a distance between two microphones of a mobile phone or a tablet computer is approximately 10 centimeters. However, in embodiments of this application, a distance between the two speakers of the first electronic device is larger. For example, a distance between two speakers of each of some notebook computers is approximately 30 centimeters, a distance between two speakers of a television or a display is approximately 40 centimeters to 50 centimeters, and a distance between two speakers of each of some televisions or displays may even reach 70 centimeters to 80 centimeters, and is far greater than 10 centimeters. It can be learned that, in embodiments of this application, the distance between the two speakers may be greater than a preset distance. The preset distance may be any value greater than 10 centimeters, for example, 15 centimeters, 20 centimeters, 30 centimeters, 40 centimeters, 50 centimeters, 60 centimeters, 70 centimeters, or 80 centimeters. Therefore, compared with that in the related technology 3, in embodiments of this application, the relative position information between the second electronic device and the first electronic device can be more accurately determined.

Figure 9:
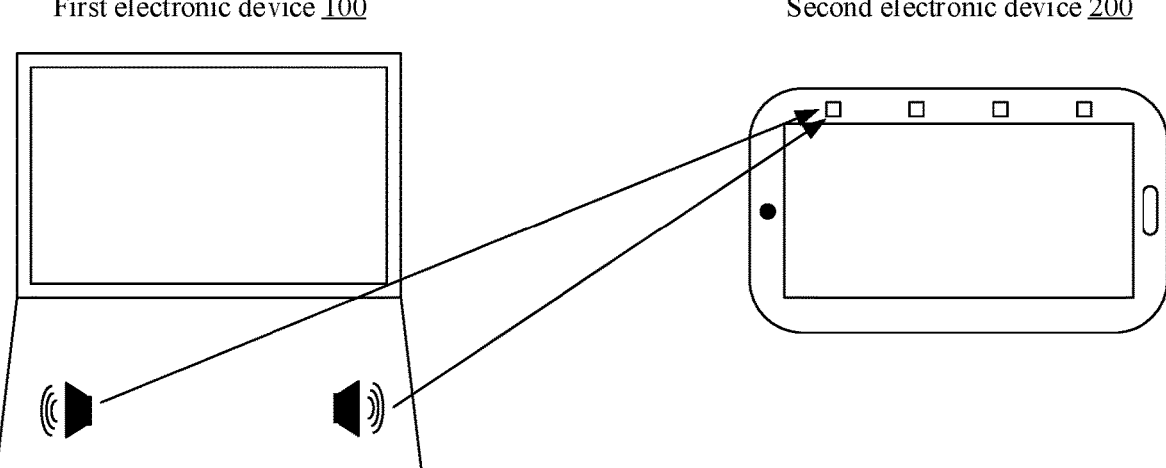
FIG. 9 is a schematic diagram of a system architecture to which a position determining method is applicable according to an embodiment of this application.

FIG. 9 is a schematic diagram of a system architecture to which a method for determining relative position information between electronic devices is applicable according to an embodiment of this application. As shown in FIG. 9, the system architecture includes the first electronic device 100 and the second electronic device 200.

The first electronic device 100 includes at least two audio sending units, and the second electronic device 200 includes at least one audio receiving unit. The audio sending unit is a unit that can send a sound wave signal, for example, a speaker. A distance between two audio sending units needs to be greater than a threshold. The audio receiving unit is a unit that can receive the sound wave signal, for example, a microphone. The sound wave signal may be an infrasound wave signal with a frequency of 0 to 20 kHz or an ultrasonic signal with a frequency of more than 20 kHz. This is not limited in embodiments of this application. For example, a frequency of the sound wave signal may be 1 kHz, 2 kHz, 3 kHz, 5 kHz, 10 kHz, 15 kHz, 20 kHz, or 30 kHz.

Specifically, the first electronic device 100 can separately send sound wave signals with different features by using the at least two audio sending units. For example, the sound wave signals with the different features may be sound wave signals on different frequency bands or sound wave signals of different orthogonal sequences. The second electronic device 200 can receive the sound wave signals with the different features by using a first audio receiving unit. The first audio receiving unit is any one of the at least one audio receiving unit. The second electronic device 200 calculates a time difference between moments at which the first audio receiving unit receives the sound wave signals with the different features or strength of the sound wave signals with the different features, and then determines relative position information between the second electronic device 200 and the first electronic device 100. The relative position information may be information, for example, an orientation or an angle.

Figure 10:
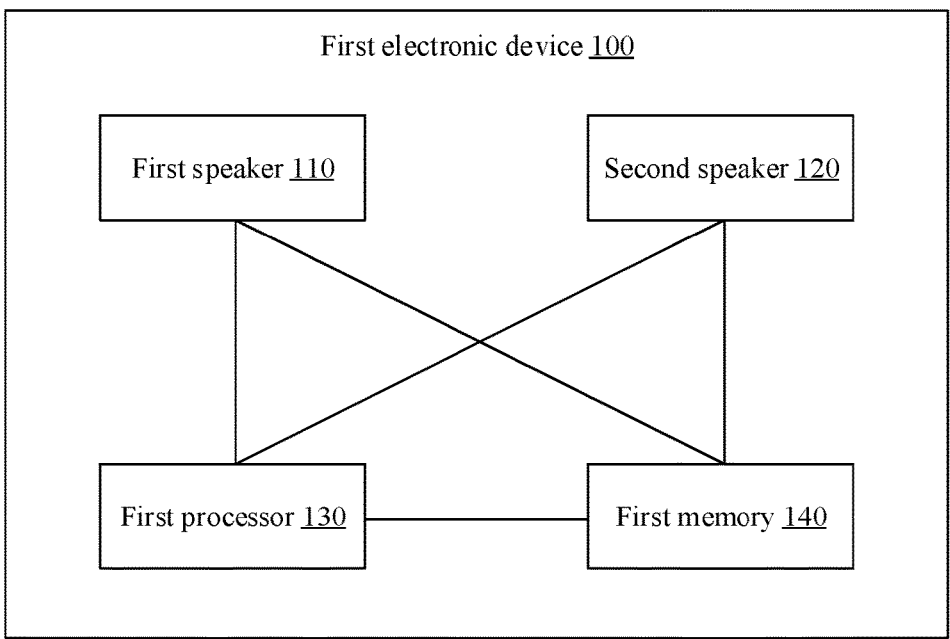
FIG. 10 is a schematic diagram of a structure of a first electronic device according to an embodiment of this application.

In some embodiments, the audio sending unit of the first electronic device 100 may be a speaker. Refer to FIG. 10. The first electronic device 100 may include a first speaker 110, a second speaker 120, a first memory 140, a first processor 130, and a computer program that may be run on the first processor 130 and that is stored in the first memory 140.

For example, the computer program may be divided into one or more modules/units. The one or more modules/units are stored in the first memory 140, and are executed by the first processor 130, to complete this application. The one or more modules/units may be a series of computer program segments that can implement a specific function, and the program segment is used to describe an execution process of the computer program in the first electronic device 100.

For example, the first memory 140 is configured to store a first instruction and an audio file. The first speaker 110, the second speaker 120, and the first memory 140 may be connected to the first processor 130 through a bus, to implement data exchange. The first processor 130 is configured to: invoke the first instruction and the audio file that are in the first memory 140, and control, according to the first instruction and based on the audio file, the first speaker 110 and the second speaker 120 to separately send the sound wave signals with the different features.

Figure 11:
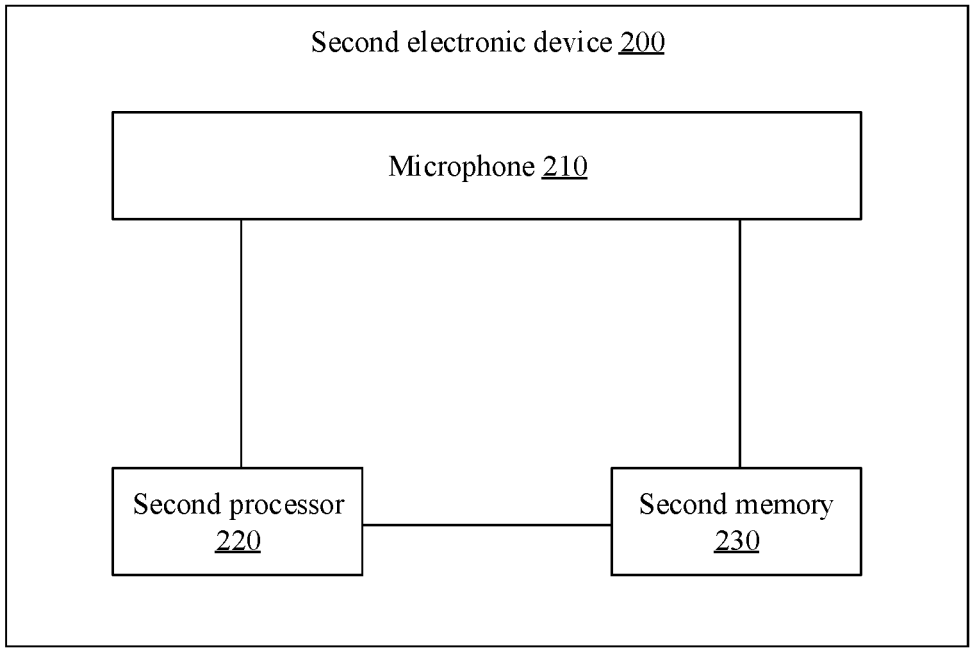
FIG. 11 is a schematic diagram of a structure of a second electronic device according to an embodiment of this application.

In some embodiments, the audio receiving unit of the second electronic device 100 may be a microphone. Refer to FIG. 11. The second electronic device 200 may include a microphone 210, a second memory 230, a second processor 220, and a computer program that may be run on the second processor 220 and that is stored in the second memory 230.

For example, the computer program may be divided into one or more modules/units. The one or more modules/units are stored in the second memory 230, and are executed by the second processor 220, to complete this application. The one or more modules/units may be a series of computer program segments that can implement a specific function, and the program segment is used to describe an execution process of the computer program in the second electronic device 200.

For example, the second memory 230 is configured to store a second instruction. The microphone 210 and the second memory 230 may be connected to the second processor 220 through a bus, to implement data exchange. The second processor 220 is configured to: invoke the second instruction in the second memory 230, calculate, according to the second instruction, the strength of or an arrival time difference between the sound wave signals with the different features, and then determine the relative position information between the first electronic device and the second electronic device. The relative position information may be the information, for example, the orientation or the angle.

It should be noted that there are two speakers shown in FIG. 10, and there is one microphone shown in FIG. 11. This is merely an example for description, and embodiments of this application are not limited thereto. For example, there may be three or more speakers in FIG. 10, and there may be two or more microphones in FIG. 11.

For example, the first processor 130 or the second processor 220 may include one or more processing units. For example, the first processor 130 or the second processor 220 may include one or more of a central processing unit (CPU), a modem processing unit, a graphics processing unit (GPU), an image signal processor (ISP), a video codec unit, a digital signal processor (DSP), a baseband processing unit, and/or a neural-network processing unit (NPU). Different processing units may be independent components, or may be integrated into one or more processors.

The first processor 130 or the second processor 220 may be a central processor, or may be another general-purpose processor, a digital signal processor, an application-specific integrated circuit (ASIC), a field-programmable gate array (FPGA), another programmable logic device, a discrete gate, a transistor logic device, a discrete hardware component, or the like. The general-purpose processor may be a microprocessor, any conventional processor, or the like.

For example, the first processor 130 or the second processor 220 may include one or more interfaces. For example, the interface may include an inter-integrated circuit (I2C) interface, an inter-integrated circuit sound (I2S) interface, a secure digital input and output (SDIO) interface, a serial peripheral (SPI) interface, a mobile industry processor interface (MIPI), a subscriber identity module (SIM) interface, and/or a universal serial bus (USB) interface. The first processor 130 or the second processor 220 may be coupled to a power management unit through the SDIO interface, and coupled to a display through the MIPI interface and the I2C interface.

For example, the first memory 140 and/or the second memory 230 may be an internal storage unit of the electronic device, or may be an external storage device of the electronic device, for example, a plug-connected hard disk, a smart media card (SMC), a secure digital (SD) card, or a flash card. Both the first memory 140 and the second memory 230 are configured to store the computer programs and other programs and data that are required by the electronic devices. The first memory 140 and the second memory 230 may be further configured to temporarily store data that is output or is to be output.

The bus may be an industry standard architecture (ISA) bus, a peripheral component interconnect (PeripheraPCI) bus, an extended industry standard architecture (EISA) bus, a universal serial bus (USB), or the like. The bus may be classified into an address bus, a data bus, a control bus, and the like.

It may be understood that the structures shown in this embodiment of this application constitute no specific limitation on the first electronic device 100 and the second electronic device 200. In some other embodiments of this application, the first electronic device 100 and/or the second electronic device 200 may include more or fewer components than those shown in the figure, or some components may be combined, or some components may be split, or there may be a different component layout. The components shown in the figure may be implemented by hardware, software, or a combination of software and hardware. For example, the first electronic device 100 and/or the second electronic device 200 may further include a universal serial bus (USB) interface, a battery, a mobile communication unit, an audio unit, a speaker, a receiver, a microphone, a button, a camera, a subscriber identity module (SIM) card interface, a pressure sensor, a barometric pressure sensor, a magnetic sensor, a distance sensor, an optical proximity sensor, a fingerprint sensor, a temperature sensor, a touch sensor, an ambient light sensor, a bone conduction sensor, and the like.

The following separately describes three application scenarios of the method for interaction between devices and a display method that are provided in embodiments of this application: a screen extension application scenario, a secure projection application scenario, and a stereo application scenario.

1. Screen Extension Application Scenario

Figure 12:
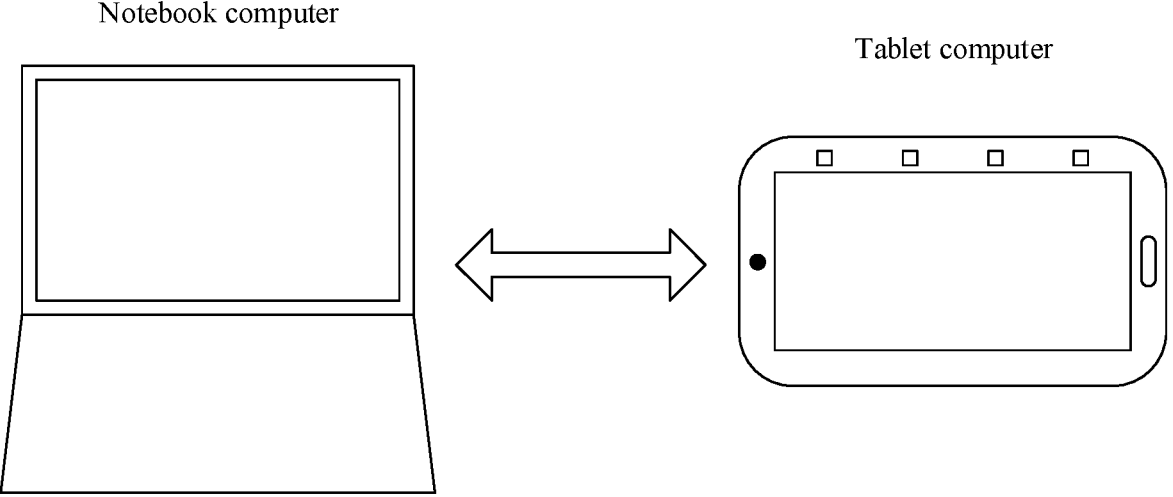
FIG. 12 is a schematic diagram of a screen extension application scenario to which a position determining method is applicable according to an embodiment of this application.

FIG. 12 is a schematic diagram of the screen extension application scenario according to an embodiment of this application. The following describes the screen extension application scenario by using an example in which the first electronic device is a notebook computer and the second electronic device is a tablet computer. In the screen extension application scenario, content displayed on a display interface of the notebook computer may be extended to a display interface of the tablet computer for display.

First, a pairing connection is established between the notebook computer and the tablet computer.

In some embodiments, before the pairing connection is established between the notebook computer and the tablet computer, starting an extension display application may be further included. For example, a user may perform a first preset operation on the notebook computer, and the notebook computer runs the extension display application in response to the preset operation. The preset operation may be a touch operation, or an operation input by the user by using a mouse or a keyboard.

For example, the user may perform a second preset operation on the extension display application of the notebook computer, and the notebook computer sends first request information to the tablet computer in response to the second preset operation. The first request information requests the notebook computer to establish the pairing connection to the tablet computer. The tablet computer displays the first request information, and obtains a third preset operation input by the user. In response to the third preset operation, the tablet computer establishes the pairing connection to the notebook computer.

Alternatively, an extension display application on the notebook computer may not be started. After detecting a second preset operation, the notebook computer may determine that extension display needs to be performed, and therefore send first request information to the tablet computer.

Alternatively, before an extension display application on the notebook computer is started, a pairing connection is established between the notebook computer and the tablet computer. In this case, after running the extension display application, the notebook computer may not need to send first request information to the tablet computer.

For example, the pairing connection may be established between the notebook computer and the tablet computer in a wired manner. For example, the pairing connection may be established between the first electronic device and the second electronic device through a high-definition multimedia interface (HDMI).

For example, the pairing connection may be established between the notebook computer and the tablet computer in a wireless manner. For example, the pairing connection may be established between the notebook computer and the tablet computer by sharing one wireless access point (AP). Alternatively, the notebook computer and the tablet computer may establish the pairing connection in a wireless manner, for example, a wireless fidelity (Wi-Fi) direct connection or Bluetooth. In embodiments of this application, a specific connection manner in which the notebook computer and the tablet computer establish the pairing connection is not limited.

In a scenario, a process in which the notebook computer and the tablet computer establish the pairing connection by sharing the AP may include: The notebook computer and the tablet computer establish Wi-Fi connections to the same AP. The notebook computer obtains address information of each electronic device that establishes a connection to the AP. The notebook computer obtains operation information input by the user. The operation information may be that the user selects an electronic device to establish a pairing connection to the notebook computer. The notebook computer initiates, to the tablet computer in response to the operation information, a pairing connection establishment request based on address information of the tablet computer. The pairing connection establishment request includes address information of the notebook computer. In response to the pairing connection establishment request, the tablet computer establishes the pairing connection to the notebook computer based on the address information of the notebook computer.

In a scenario, a process in which the notebook computer and the tablet computer establish the pairing connection by using the Wi-Fi direct connection may include: The notebook computer establishes a Wi-Fi link layer connection to the tablet computer through channel search. After establishing the Wi-Fi link layer connection, the notebook computer establishes a transmission control protocol (TCP) data connection to the tablet computer. The notebook computer initiates a pairing connection establishment request to the tablet computer by using the TCP data connection. The pairing connection establishment request includes address information of the notebook computer. In response to the pairing connection establishment request, the tablet computer establishes the pairing connection to the notebook computer based on the address information of the notebook computer.

In a scenario, a process in which the notebook computer and the tablet computer establish the pairing connection by using Bluetooth may include: The notebook computer performs broadcasting by using Bluetooth. The tablet computer generates a Bluetooth device list based on a received broadcast packet. The tablet computer calculates signal strength of each Bluetooth device in the Bluetooth device list, and sends a Bluetooth pairing connection request to a Bluetooth device with highest signal strength. The notebook computer automatically pops up a pairing connection request dialog box, and receives operation information input by the user. The operation information may be that the user agrees that the notebook computer establishes the pairing connection to the tablet computer. The notebook computer establishes a Bluetooth pairing connection to the tablet computer in response to the operation information.

Then, relative position information between the tablet computer and the notebook computer is determined by using the position determining method in embodiments of this application.

For example, when the notebook computer needs to perform extension display toward the tablet computer, the notebook computer separately sends the first sound wave signal and the second sound wave signal with the different features by using two speakers. The tablet computer receives the first sound wave signal and the second sound wave signal by using a microphone. The tablet computer determines the relative position information between the tablet computer and the notebook computer based on a time difference between moments at which the microphone receives the first sound wave and the second sound wave or signal strength between the first sound wave and the second sound wave. The tablet computer sends the relative position information to the notebook computer. How to determine the relative position information between the tablet computer and the notebook computer is described in detail in the following embodiment. Details are not described herein again.

Figure 13:
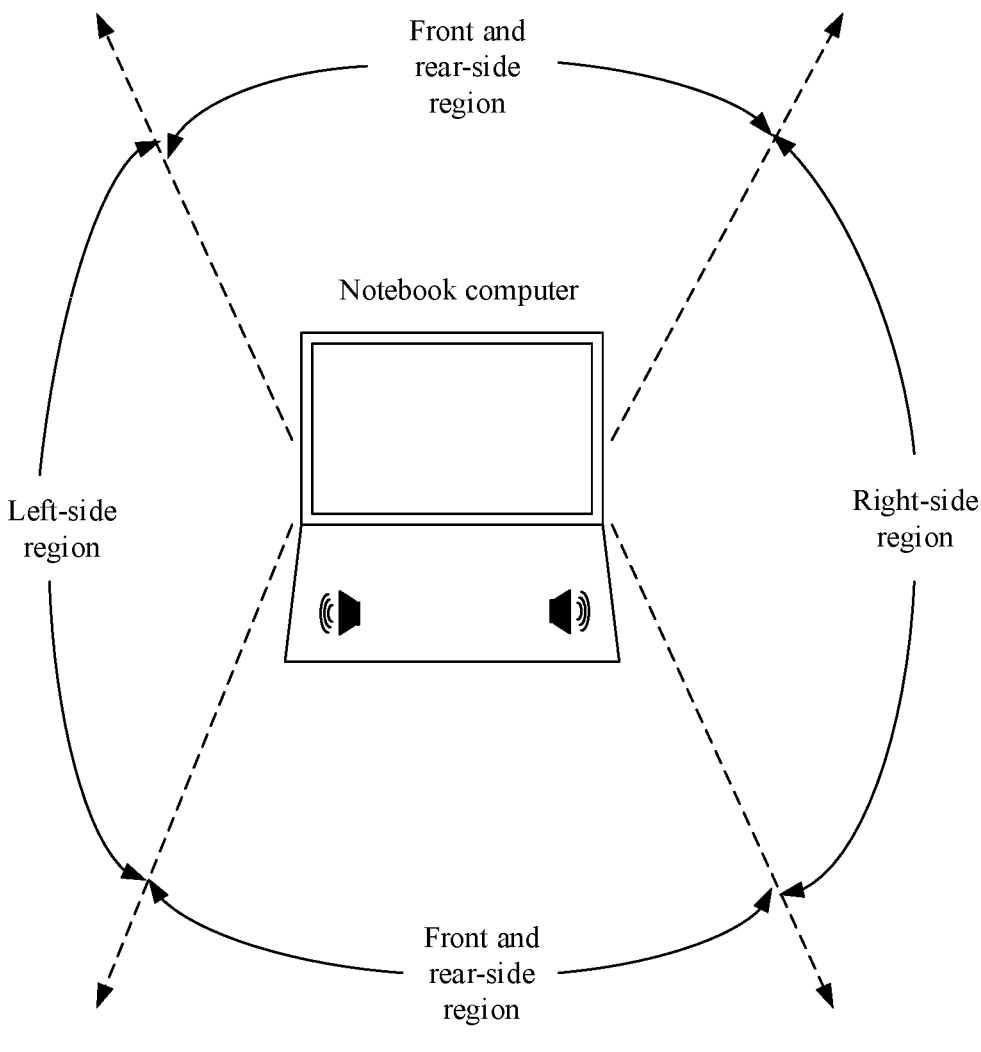
FIG. 13 is a schematic diagram of division of each region of a notebook computer according to an embodiment of this application.

In the screen extension application scenario, the relative position information between the tablet computer and the notebook computer may include: The tablet computer is located in a left-side region of the notebook computer, the tablet computer is located in a right-side region of the notebook computer, and the tablet computer is located in a front and rear-side region of the notebook computer, as shown in FIG. 13.

It should be noted that the relative position information orientation between the tablet computer and the notebook computer may be determined by using solutions in Embodiment 1, Embodiment 2, Embodiment 5, Embodiment 6, and Embodiment 7. Alternatively, an angle of the tablet computer relative to the notebook computer may be determined by using solutions in Embodiment 3, Embodiment 4, and Embodiment 8, and then the relative position information between the tablet computer and the notebook computer is determined based on a relationship between the angle and a region.

The left-side region, the right-side region, and the front and rear-side region of the notebook computer may be determined by referring to the method for dividing each region in FIG. 4 in the related technology 3. The following describes division of each region shown in FIG. 13.

For example, the notebook computer transmits the first sound wave signal by using a left speaker, and transmits the second sound wave signal by using a right speaker. The microphone of the tablet computer receives the first sound wave signal at a moment $T_7$, and receives the second sound wave signal at a moment $T_8$.

In some embodiments, the relative position between the tablet computer and the notebook computer may be determined based on a relationship between $|T_7-T_8|$ and a threshold $$t_2\left(0 < t_2 < \frac{D}{c}\right).$$

D is a distance between the left speaker and the right speaker. For example, if $T_7$ is earlier than $T_8$, and $|T_7-T_8|>t_2$, the tablet computer is located in the left-side region of the notebook computer. If $T_7$ is later than $T_8$, and $|T_7-T_8|>t_2$, the tablet computer is located in the right-side region of the notebook computer. If $|T_7-T_8|\le t_2$, that is, the first sound wave signal and the second sound wave signal arrive at the microphone of the tablet computer almost at the same time, the tablet computer is located in the front and rear-side region of the notebook computer.

In this embodiment, the threshold $t_2$ is in direct proportion to D. For example, $$t_2 = \frac{1}{3}\cdot\frac{D}{c}.$$

If $T_7$ is earlier than $T_8$, and $$|T_7 - T_8| > \frac{D}{3c},$$

the tablet computer is located in the left-side region of the notebook computer. If $T_7$ is later than $T_8$, and $$|T_7 - T_8| > \frac{D}{3c},$$

the tablet computer is located in the right-side region of the notebook computer. If $$|T_7 - T_8| \le \frac{D}{3c},$$

the tablet computer is located in the front and rear-side region of the notebook computer.

In some embodiments, each region shown in FIG. 13 may be determined according to a method in step 205 in Embodiment 1. For a specific method, refer to Embodiment 1. Details are not described herein again.

It should be noted that, in the screen extension application scenario, a region around the notebook computer is divided into three regions shown in FIG. 13, but this is not limited thereto. In another application scenario, a region around the first electronic device may be divided into four or more regions based on an actual requirement. For example, a plurality of thresholds may be set, and the region around the first electronic device is divided into the four or more regions based on a relationship between $|T_7-T_8|$ and each threshold.

In addition, the tablet computer may alternatively send, to the notebook computer, a time difference between moments at which the microphone receives the first sound wave and the second sound wave or signal strength between the first sound wave and the second sound wave, and the notebook computer determines the relative position information between the tablet computer and the notebook computer. The tablet computer may alternatively send, to another electronic device, a time difference between moments at which the microphone receives the first sound wave and the second sound wave or signal strength between the first sound wave and the second sound wave, and the another electronic device determines the relative position information between the tablet computer and the notebook computer.

After the notebook computer and the tablet computer establish the pairing connection, the relative position information between the tablet computer and the notebook computer needs to be determined. However, after a position of the tablet computer changes and/or a position of the notebook computer changes, the relative position information between the tablet computer and the notebook computer also needs to be determined. For example, an accelerometer sensor, a gyro sensor, or a magnetometer sensor of the tablet computer detects that the position of the tablet computer changes, and the tablet computer sends a relative position information re-determining request to the notebook computer. The relative position information re-determining request requests the notebook computer to re-send the first sound wave signal and the second sound wave signal with the different features by using the two speakers. After determining new relative position information between the tablet computer and the notebook computer, the tablet computer sends the new relative position information to the notebook computer.

Finally, the notebook computer sends, based on the relative position information, the content displayed on the display interface of the notebook computer to the display interface of the tablet computer for display.

The user only needs to perform an operation on the notebook computer, so that the content displayed on the display interface of the notebook computer can be sent to the display interface of the tablet computer for display.

The following uses an example in which the tablet computer is located in the right-side region of the notebook computer to describe how the notebook computer extends a window to the tablet computer for display.

The user drags the window on the display interface of the notebook computer to move rightward, and the notebook computer moves first target content rightward in response to the user operation. As the user drags the window, the window is moved rightward on the display interface of the notebook computer. If the window is moved to a first preset position on the display interface of the notebook computer and remained for first preset duration, it indicates that a first part of content in the window is moved out of the display interface of the notebook computer. The tablet computer displays the first part of content in the window, and the notebook computer displays a second part of content of the first target content. The first part of content and the second part of content in the window constitute the entire window. In this case, the notebook computer and the tablet computer jointly display the window. If the window is moved to a second preset position on the display interface of the notebook computer and remained for second preset duration, it indicates that the window is fully removed out of the display interface of the notebook computer. In this case, the tablet computer displays all the content in the window, and the notebook computer no longer displays the window.

In a scenario, the notebook computer may further generate first guide information. The first guide information guides the user to drag content leftward or rightward, for example, a document, a web page, or a window. The notebook computer obtains a drag operation performed on the content, for example, the document, the web page, or the window. In response to the drag operation, the notebook computer sends the content, for example, the document, the web page, or the window, to the display interface of the tablet computer for display.

For example, the relative position information indicates that the tablet computer is located in the left-side region of the notebook computer. In this case, the notebook computer generates the first guide information. The first guide information guides the user to drag the content leftward, for example, the document, the web page, or the window displayed on the display interface of the notebook computer. For example, the first guide information may be displayed on the display interface of the notebook computer as text. For example, the first guide information may be "Drag XX leftward" displayed on the display interface. For example, the first guide information may be displayed on the display interface of the notebook computer as animation. For example, the notebook computer may simulate, in a window, to display an animation in which a hand drags the window leftward. For example, the first guide information may be displayed on the display interface of the notebook computer as a combination of animation and text. For example, the notebook computer may simulate, in a window, to display an animation in which a hand drags the window leftward and a related text description.

After the first guide information is displayed on the display interface of the notebook computer, the user may drag the content, for example, the document, the web page, or the window displayed on the display interface of the notebook computer, rightward in a manner of a mouse or screen touch. In response to the operation of leftward drag, the notebook computer sends the content, for example, the document, the web page, or the window, to the tablet computer. The tablet computer receives the content, for example, the document, the web page, or the window, and displays the content, for example, the document, the web page, or the window, on the display interface. In this way, the content, for example, the document, the web page, or the window on the notebook computer, is extended, for display, to the display interface of the tablet computer located in the left-side region of the notebook computer.

In another scenario, if the notebook computer is moved and/or the tablet computer is moved, and consequently, the relative position information between the tablet computer and the notebook computer changes, and changed relative position information indicates that the tablet computer is located in the front and rear-side region of the notebook computer, an extension direction may not be changed between the notebook computer and the tablet computer.

The extension direction may include rightward extension and leftward extension. The rightward extension may be as follows: The user drags the content, for example, the document, the web page, or the window, rightward on the display interface of the notebook computer, and extends, for display, the content, for example, the document, the web page, or the window, to the tablet computer located in the right-side region of the notebook computer. The leftward extension may be as follows: The user drags the content, for example, the document, the web page, or the window, leftward on the display interface of the notebook computer, and extends, for display, the content, for example, the document, the web page, or the window, to the tablet computer located in the left-side region of the notebook computer.

For example, the tablet computer is located in the right-side region of the notebook computer. In this case, the notebook computer extends the content, for example, the document, the web page, or the window, rightward to the tablet computer for display. If the tablet computer is moved and/or the notebook computer is moved and consequently the tablet computer is located in the front and rear-side region of the notebook computer, the extension direction remains as rightward extension without changing. In this case, the user may drag the content, for example, the document, the web page, or the window, rightward on the display interface of the notebook computer, and extend the content, for example, the document, the web page, or the window, to the tablet computer for display.

That the tablet computer is moved and/or the notebook computer is moved includes: The tablet computer is moved, the notebook computer is moved, or both the tablet computer and the notebook computer are moved.

In still another scenario, if the notebook computer is moved and/or the tablet computer is moved, and consequently, the relative position information between the tablet computer and the notebook computer changes, and changed relative position information indicates that the tablet computer is located in the left-side region of the notebook computer, an extension direction may not be changed between the notebook computer and the tablet computer.

In yet still another scenario, if the notebook computer is moved and/or the tablet computer is moved, and consequently, the relative position information between the tablet computer and the notebook computer changes, and changed relative position information indicates that the tablet computer is located in the right-side region of the notebook computer, an extension direction may not be changed between the notebook computer and the tablet computer.

In a scenario, if the notebook computer detects a fourth preset operation, and the relative position information at this time indicates that the tablet computer is located in the front and rear-side region of the notebook computer, the notebook computer may send, to the tablet computer when the fourth preset operation is a projection operation, the content displayed on the display interface. The tablet computer displays the content, and the notebook computer continues to display the content. Alternatively, when the fourth preset operation is a screen extension operation, the notebook computer may extend, to the display interface of the tablet computer based on a default extension direction or an extension direction customary by the user, the content displayed on the display interface. The default extension direction may be leftward extension or rightward extension, and the extension direction customary by the user is leftward extension or rightward extension.

For example, the tablet computer is located in the right-side region of the notebook computer. In this case, the extension direction of the notebook computer is rightward extension. If the tablet computer is moved and/or the notebook computer is moved, and consequently the tablet computer is located in the front and rear-side region of the notebook computer, the notebook computer may send, to the tablet computer, the content displayed on the display interface, and request the tablet computer to display the content. The tablet computer displays, in response to the request, the content sent by the notebook computer, and the notebook computer continues to display the content. In this way, the display interface of the tablet computer is the same as the display interface of the notebook computer.

In another scenario, when extension display is started between the notebook computer and the tablet computer, if the tablet computer is located in the front and rear-side region of the notebook computer, the notebook computer does not send the content, for example, the document, the web page, or the window, to the tablet computer.

Specifically, if the user performs an operation of dragging the content, for example, the document, the web page, or the window, in any direction on the display interface of the notebook computer, the notebook computer does not respond to the operation, does not send the content, for example, the document, the web page, or the window, to the tablet computer, and does not extend the content, for example, the document, the web page, or the window, to the tablet computer for display.

In addition, the notebook computer may further generate first prompt information. The first prompt information prompts the user that the tablet computer is located in the front and rear-side region of the notebook computer, and the content displayed on the display interface of the notebook computer cannot be extended to the display interface of the tablet computer for display.

In a scenario, there may be a plurality of tablet computers that are distributed on the left side and the right side of the notebook computer. If the user drags the content, for example, the document, the web page, or the window, leftward on the notebook computer, the notebook computer sends, for display in response to the drag operation, the content, for example, the document, the web page, or the window, to a tablet computer located on the left side of the notebook computer. If the user drags the content, for example, the document, the web page, or the window, rightward on the notebook computer, the notebook computer sends, for display in response to the drag operation, the content, for example, the document, the web page, or the window, to a tablet computer located on the right side of the notebook computer.

2. Secure Projection Application Scenario

Figure 14:
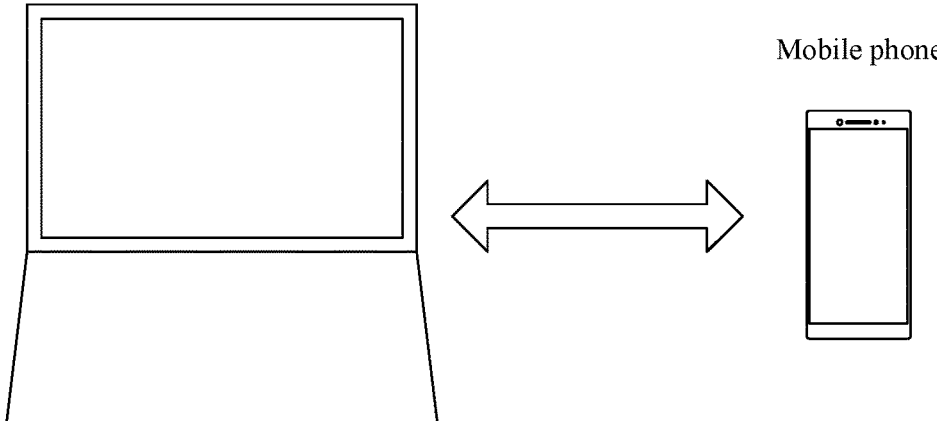
FIG. 14 is a schematic diagram of a secure projection application scenario to which a position determining method is applicable according to an embodiment of this application.

FIG. 14 is a schematic diagram of the secure projection application scenario according to an embodiment of this application. The following describes the secure projection application scenario by using an example in which the first electronic device is a notebook computer and the second electronic device is a mobile phone. In the secure projection application scenario, content displayed on a display interface of the mobile phone may be projected to a display interface of the notebook computer for display, and on the notebook computer, an operation is performed on the mobile phone.

First, a pairing connection is established between the notebook computer and the mobile phone. Refer to the related descriptions in the screen extension application scenario. Details are not described herein again.

Next, relative position information between the mobile phone and the notebook computer is determined by using the position determining method in embodiments of this application.

For example, when the mobile phone needs to perform projection display toward the notebook computer, the notebook computer separately sends the first sound wave signal and the second sound wave signal with the different features by using two speakers. The mobile phone receives the first sound wave signal and the second sound wave signal by using a microphone. The mobile phone determines the relative position information between the mobile phone and the notebook computer based on a time difference between moments at which the microphone receives the first sound wave and the second sound wave or signal strength between the first sound wave and the second sound wave.

In addition, the mobile phone may alternatively send, to the notebook computer, a time difference between moments at which the microphone receives the first sound wave and the second sound wave or signal strength between the first sound wave and the second sound wave, and the notebook computer determines the relative position information between the mobile phone and the notebook computer. The mobile phone may alternatively send, to another electronic device, a time difference between moments at which the microphone receives the first sound wave and the second sound wave or signal strength between the first sound wave and the second sound wave, and the another electronic device determines the relative position information between the mobile phone and the notebook computer.

In the secure projection application scenario, the relative position information between the mobile phone and the notebook computer may include: The mobile phone is located in a left-side region of the notebook computer, the mobile phone is located in a right-side region of the notebook computer, and the mobile phone is located in a front and rear-side region of the notebook computer.

It should be noted that the relative position information between the mobile phone and the notebook computer may be determined by using solutions in Embodiment 1, Embodiment 2, Embodiment 5, Embodiment 6, and Embodiment 7. Alternatively, an angle of the mobile phone relative to the notebook computer may be determined by using solutions in Embodiment 3, Embodiment 4, and Embodiment 8, and then the relative position information between the mobile phone and the notebook computer is determined based on a relationship between the angle and a region.

Finally, when the relative position information meets a preset position requirement, the mobile phone projects content, for example, a file, a picture, or the display interface, to the display interface of the notebook computer for display, or the notebook computer projects content such as a file, a picture, or the display interface to the display interface of the mobile phone for display.

In some embodiments, the preset position requirement may be that the mobile phone is located in one of the front and rear-side region, the left-side region, and the right-side region of the notebook computer. For example, if the mobile phone is located in the front and rear-side region of the notebook computer, and a distance between the mobile phone and the notebook computer is less than a threshold, the mobile phone sends the content, for example, the file, the picture, or the display interface, to the notebook computer. The notebook computer displays the content, for example, the file, the picture, or the display interface, to project the content, for example, the file, the picture, or the display interface on the mobile phone, to the display interface of the notebook computer for display. Alternatively, the notebook computer sends the content, for example, the file, the picture, or the display interface, to the mobile phone. The mobile phone displays the content, for example, the file, the picture, or the display interface, to project the content, for example, the file, the picture, or the display interface on the notebook computer, to the display interface of the mobile phone for display.

In some embodiments, when the mobile phone performs projection toward the notebook computer, the notebook computer may generate second prompt information. The second prompt information prompts the user to place the mobile phone in a specific orientation of the notebook computer and with the distance between the mobile phone and the notebook computer. The user can conveniently project, based on the second prompt information, the content, for example, the file, the picture, or the display interface on the mobile phone, to the display interface of the notebook computer for display.

In some embodiments, when the notebook computer performs projection toward the mobile phone, the mobile phone may generate second prompt information. The user can conveniently project, based on the second prompt information, the content, for example, the file, the picture, or the display interface on the notebook computer, to the display interface of the mobile phone for display.

The following describes a process of projecting the content, for example, the file, the picture, or the display interface on the computer, to the display interface of the notebook computer for display.

For example, the process of projecting the file or the picture on the mobile phone to the display interface of the notebook computer for display may be as follows: If the mobile phone is located in the front and rear-side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

Alternatively, the process of projecting the file or the picture on the mobile phone to the display interface of the notebook computer for display may be as follows: If the mobile phone is located in the left-side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

Alternatively, the process of projecting the file or the picture on the mobile phone to the display interface of the notebook computer for display may be as follows: If the mobile phone is located in the right-side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

For example, the process of projecting the display interface on the mobile phone to the display interface of the notebook computer for display may be as follows: If the mobile phone is located in the front and rear-side region of the notebook computer, and the distance between the mobile phone and the notebook computer is less than the threshold, the mobile phone sends content on the display interface of the mobile phone and an aspect ratio of the display interface of the mobile phone to the notebook computer. The notebook computer displays, on the display interface based on the aspect ratio of the display interface of the mobile phone, the content on the display interface of the mobile phone.

The aspect ratio of the display interface of the mobile phone is usually different from an aspect ratio of the display interface of the notebook computer. As a result, the notebook computer needs to determine a display region based on the aspect ratio of the display interface of the mobile phone, to display the display interface of the mobile phone on the display interface of the notebook computer. An aspect ratio of the display region is equal to the aspect ratio of the display interface of the mobile phone, and the display region should be as large as possible. For example, a length of the display region is the same as a width of the display interface of the notebook computer. After determining the display region, the notebook computer displays the content on the display interface of the mobile phone in the display region.

After the content on the display interface of the mobile phone changes, the mobile phone sends new content displayed on the interface of the mobile phone to the notebook computer. The notebook computer displays, in the display region, the new content displayed on the interface of the mobile phone.

In some embodiments, the content, for example, the file, the picture, or the display interface, may or may not have a privacy requirement. For the content, for example, the file, the picture, or the display interface, that has the privacy requirement, a case of privacy leakage should be prevented or reduced.

For example, for the content, for example, the file, the picture, or the display interface, that has the privacy requirement, if the relative position information meets the preset position requirement, and the distance between the mobile phone and the notebook computer is less than the threshold, the mobile phone may project the content, for example, the file, the picture, or the display interface, that has the privacy requirement to the display interface of the notebook computer for display, or the notebook computer projects the content, for example, the file, the picture, or the display interface, that has the privacy requirement to the display interface of the mobile phone for display. If the distance between the mobile phone and the notebook computer is greater than or equal to the threshold, the mobile phone stops sending the content, for example, the file, the picture, or the display interface, that has the privacy requirement to the notebook computer, or the notebook computer stops sending the content, for example, the file, the picture, or the display interface, that has the privacy requirement to the mobile phone.

For another example, for the content, for example, the file, the picture, or the display interface, that does not have the privacy requirement, the distance between the mobile phone and the notebook computer may not be required to be less than the threshold. For example, if the relative position information meets the preset position requirement, regardless of whether the distance between the mobile phone and the notebook computer is less than the threshold, the mobile phone may project the content, for example, the file, the picture, or the display interface, that does not have the privacy requirement to the display interface of the notebook computer for display, or the notebook computer may project the content, for example, the file, the picture, or the display interface, that does not have the privacy requirement to the display interface of the mobile phone for display.

In some embodiments, when projection is established between the mobile phone and the notebook computer, if the relative position information between the mobile phone and the notebook computer changes, and consequently, changed relative position information does not meet the preset position requirement, and/or the distance between the mobile phone and the notebook computer is greater than the threshold, the notebook computer stops displaying the content, for example, the file, the picture, or the display interface, that has the privacy requirement and that is sent by the mobile phone, and ends projection established between the mobile phone and the notebook computer.

For example, the notebook computer may generate a projection end control, and the user performs a touch operation on the control. In response to the touch operation, the notebook computer stops displaying the content, for example, the file, the picture, or the display interface, that has the privacy requirement and that is sent by the mobile phone, and ends projection established between the mobile phone and the notebook computer.

For example, the mobile phone may generate a projection end control, and the user performs a touch operation on the control. In response to the touch operation, the mobile phone sends a projection end request to the notebook computer. In response to the projection end request, the notebook computer stops displaying the content, for example, the file, the picture, or the display interface, that has the privacy requirement and that is sent by the mobile phone, and ends projection established between the mobile phone and the notebook computer.

In a scenario, after projection established between the mobile phone and the notebook computer is ended, the mobile phone may generate a projection continuation control. After the user performs a touch operation on the control, the mobile phone sends a projection continuation instruction to the notebook computer in response to the touch operation. In response to the projection continuation instruction, the notebook computer continues to display the content, for example, the file, the picture, or the display interface, that has the privacy requirement and that is sent by the mobile phone.

In some embodiments, when projection is established between the mobile phone and the notebook computer, if the relative position information between the mobile phone and the notebook computer changes, and consequently, changed relative position information does not meet the preset position requirement, and/or the distance between the mobile phone and the notebook computer is greater than the threshold, the notebook computer continue to display the content, for example, the file, the picture, or the display interface, that does not have the privacy requirement and that is sent by the mobile phone, and may not end projection established between the mobile phone and the notebook computer.

Whether the distance between the mobile phone and the notebook computer is less than the threshold may be determined according to the algorithm in the related technology 1 or the related technology 2. Details are not described herein again.

3. Stereo Application Scenario

Figure 15:
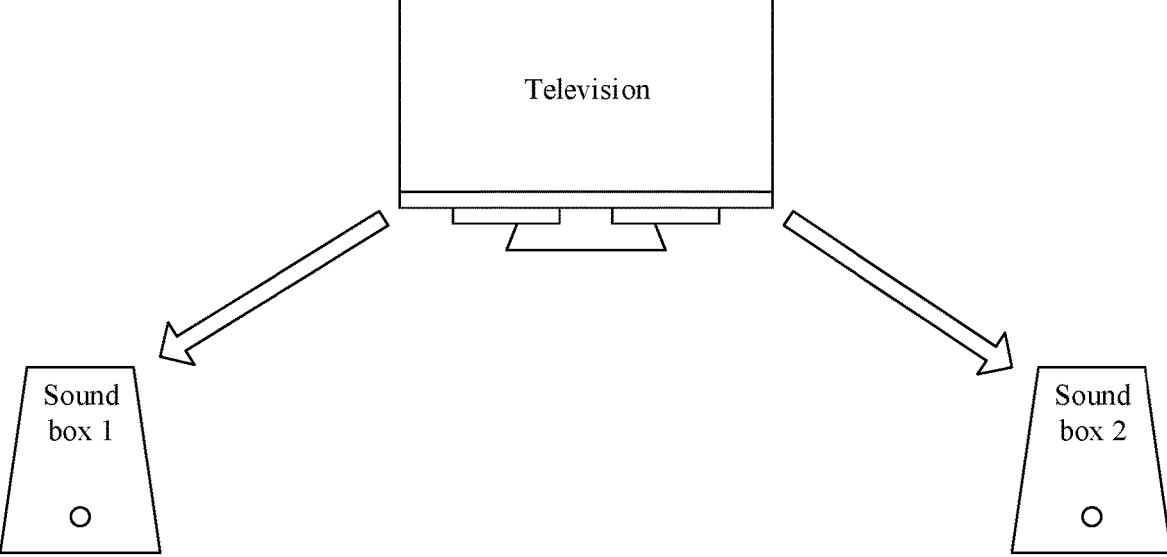
FIG. 15 is a schematic diagram of a stereo application scenario to which a position determining method is applicable according to an embodiment of this application.

FIG. 15 is a schematic diagram of the stereo application scenario according to an embodiment of this application. The following describes the stereo application scenario by using an example in which the first electronic device is a television and the second electronic device is two sound boxes (a sound box 1 and a sound box 2). In the stereo application scenario, the television determines a correspondence between the sound box 1, the sound box 2, left-channel audio information, and right-channel audio information based on relative position information of the sound box 1 and the sound box 2, and then transmits audio information to the sound box 1 and the sound box 2 to implement stereo playing, without requiring a manual operation to select sound channels of the two sound boxes.

First, a pairing connection is established between the television, the sound box 1, and the sound box 2.

Then, relative position information between the television, the sound box 1, and the sound box 2 is determined by using the position determining method in embodiments of this application.

The television has two speakers, and the sound box 1 and the sound box 2 each have at least one microphone. For example, when the television needs to determine that the two sound boxes play the left sound channel audio information and the right sound channel audio information, the television separately sends the first sound wave signal and the second sound wave signal with the different features by using the two speakers. The sound box 1 receives the first sound wave signal and the second sound wave signal by using the microphone. The sound box 1 determines first relative position information between the sound box 1 and the television based on a time difference between moments at which the microphone receives the first sound wave and the second sound wave or signal strength between the first sound wave and the second sound wave. The sound box 1 sends the first relative position information to the television. The sound box 2 receives the first sound wave signal and the second sound wave signal by using the microphone. The sound box 2 determines second relative position information between the sound box 2 and the television based on a time difference between moments at which the microphone receives the first sound wave and the second sound wave or signal strength between the first sound wave and the second sound wave. The sound box 2 sends the second relative position information to the television.

After the television and the two sound boxes establish the pairing connection, relative position information between the television and each of the two sound boxes needs to be determined. After a position of the sound box changes, the relative position information between the television and each of the two sound boxes also needs to be determined again.

For example, an accelerometer sensor, a gyro sensor, or a magnetometer sensor of a first sound box (for example, either the sound box 1 or the sound box 2) detects that a position of the first sound box changes, and the first sound box sends third request information to the television. The third request information requests the television to resend the first sound wave signal and the second sound wave signal with the different features by using the two speakers. After determining new relative position information between the first sound box and the television, the first sound box sends the new relative position information to the television. It should be noted that, if the first sound box is the sound box 1 or the sound box 2, it is only necessary to re-determine new relative position information between the sound box 1 or the sound box 2 whose position changes and the television, or re-determine new relative position information between the two sound boxes and the television.

In addition, the first sound box may alternatively send, to the television, a time difference between moments at which the microphone receives the first sound wave and the second sound wave or signal strength between the first sound wave and the second sound wave, and the television determines relative position information between the television and each of the sound box 1 and the sound box 2. The first sound box may alternatively send, to another electronic device, a time difference between moments at which the microphone receives the first sound wave and the second sound wave or signal strength between the first sound wave and the second sound wave, and the another electronic device determines relative position information between the television and each of the two sound boxes.

Finally, the television sends the audio information to the sound box 1 and the sound box 2 based on the relative position information, to implement stereo playing by using the sound box 1 and the sound box 2.

The television may determine third relative position information between the sound box 1 and the sound box 2 based on the first relative position information between the sound box 1 and the television and the second relative position information between the sound box 2 and the television. Then, based on the third relative position information, the television sends the left-channel audio information to a sound box located on the left side and sends the right-channel audio information to a sound box located on the right side.

If the sound box 1 and the sound box 2 are located in two regions of the television, the television determines the third relative position information based on a position relationship between the two regions. If the sound box 1 and the sound box 2 are located in a same region of the television, the television determines the third relative position information between the sound box 1 and the sound box 2 based on a first angle and a second angle. The first angle is an angle of the sound box 1 relative to the first electronic device, and the second angle is an angle of the sound box 2 relative to the first electronic device.

In a scenario, if the sound box 1 is located in a left-side region of the television, and the sound box 2 is located in a right-side region or a front and rear-side region of the television, it indicates that the sound box 1 is located on the left side of the sound box 2. In this case, the television sends the left-channel audio information to the sound box 1, and sends the right-channel audio information to the sound box 2. If the sound box 1 is located in a right-side region of the television, and the sound box 2 is located in a front and rear-side region or a left-side region of the television, it indicates that the sound box 1 is located on the right side of the sound box 2. In this case, the television sends the right-channel audio information to the sound box 1, and sends the left-channel audio information to the sound box 2.

In a scenario, if the sound box 1 and the sound box 2 are located in the same-side region of the television, the television may determine the third relative position information based on the first angle and the second angle. Then, the television sends the right-channel audio information to the sound box located on the right side, and sends the left-channel audio information to the sound box located on the left side. How to determine angle information between the television and the sound box is described in detail in the following embodiment. Details are not described herein again.

To describe how the television determines an orientation between the two sound boxes based on angle information of the two sound boxes, the following first describes a position that is of the sound box and that corresponds to an angle of the sound box relative to the television.

Figures 16, 17:
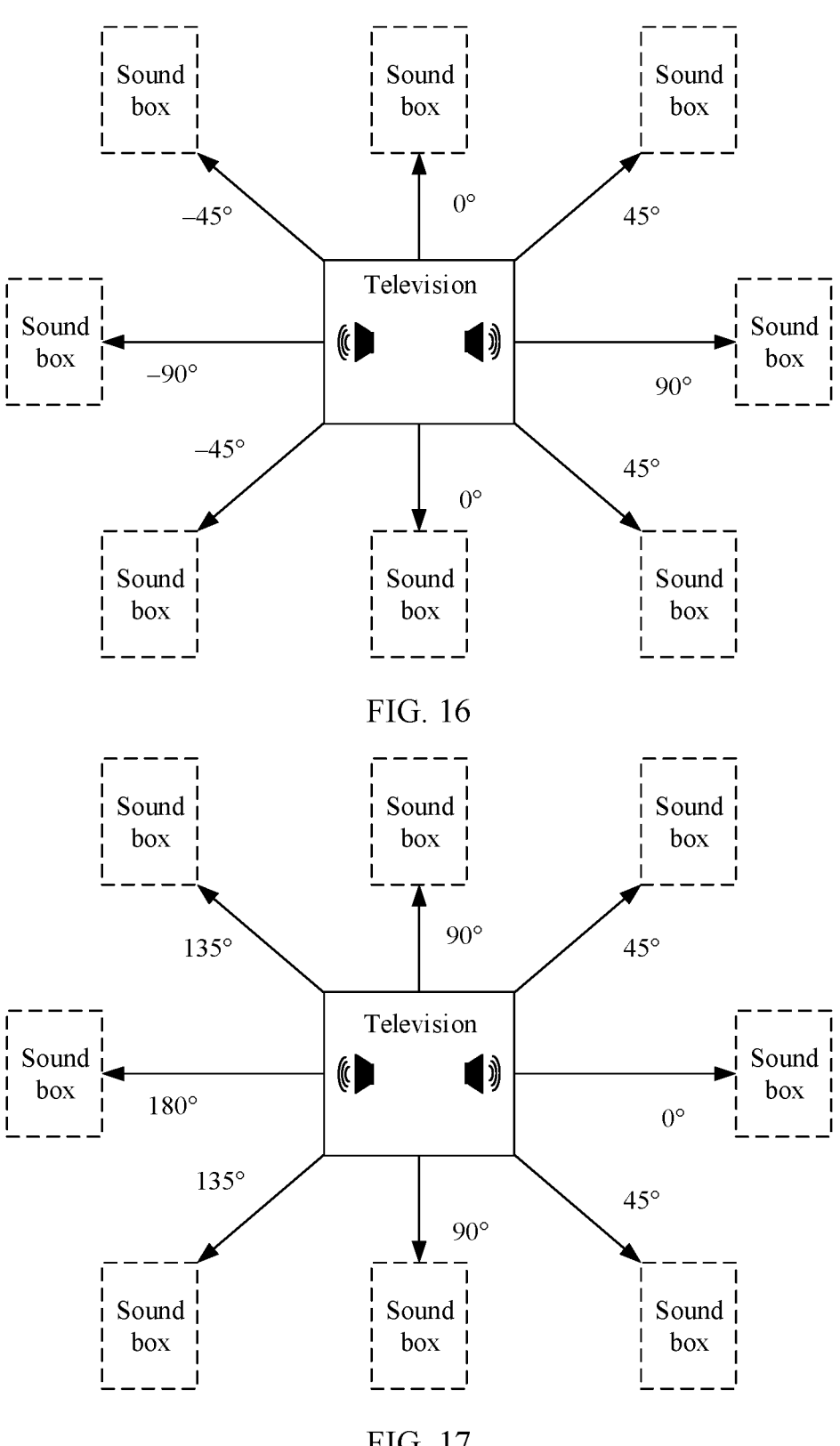
FIG. 16 is a schematic diagram of an angle between a television and a sound box according to an embodiment of this application.
FIG. 17 is a schematic diagram of an angle between a television and a sound box according to an embodiment of this application.

In some embodiments, the position that is of the sound box and that corresponds to the angle of the sound box relative to the television is shown in FIG. 16.

First, a position that is of the sound box and that corresponds to a reference angle may be set.

For example, the reference angle may be 90°, −90°, or 0°. Refer to FIG. 16. The angle of the sound box relative to the television is 90°. In this case, the position of the sound box is as follows: The sound box is located in the right-side region of the television, and the sound box is located on a connection line between the two speakers of the television. The angle of the sound box relative to the television is −90°.

In this case, the position of the sound box is as follows: The sound box is located in the left-side region of the television, and the sound box is located on a connection line between the two speakers of the television. The angle of the sound box relative to the television is 0°. In this case, the position of the sound box is as follows: The sound box is located in the front and rear-side region of the television, and the sound box is located on a perpendicular bisector of a connection line between the two speakers of the television.

Then, a position that is of the sound box and that corresponds to any angle between 90° and 0° and between 0° and −90° may be determined based on the reference angle. For example, the angle of the sound box relative to the television is 45°. In this case, the position of the sound box is as follows: The sound box is located in the right-side region of the television, and an included angle between a connection line, that is between the sound box and the television, and the connection line between the two speakers of the television is 45°. The position of the sound box is two positions shown in FIG. 16. For example, the angle of the sound box relative to the television is −45°. In this case, the position of the sound box is as follows: The sound box is located in the left-side region of the television, and an included angle between a connection line, that is between the sound box and the television, and the connection line between the two speakers of the television is 45°. The position of the sound box is two positions shown in FIG. 16.

For another example, the reference angle may be 0°, 90°, or 180°. Refer to FIG. 17. The angle of the sound box relative to the television is 0°. In this case, the position of the sound box is as follows: The sound box is located in the right-side region of the television, and the sound box is located on a connection line between the two speakers of the television. The angle of the sound box relative to the television is 180°. In this case, the position of the sound box is as follows: The sound box is located in the left-side region of the television, and the sound box is located on a connection line between the two speakers of the television. The angle of the sound box relative to the television is 90°. In this case, the position of the sound box is as follows: The sound box is located in the front and rear-side region of the television, and the sound box is located on a perpendicular bisector of a connection line between the two speakers of the television.

Then, a position that is of the sound box and that corresponds to any angle between 90° and 0° and between 90° and 180° may be determined based on the reference angle. For example, the angle of the sound box relative to the television is 45°. In this case, the position of the sound box is as follows: The sound box is located in the right-side region of the television, and an included angle between a connection line, that is between the sound box and the television, and the connection line between the two speakers of the television is 45°. The position of the sound box is two positions shown in FIG. 17. For example, the angle of the sound box relative to the television is 135°. In this case, the position of the sound box is as follows: The sound box is located in the left-side region of the television, and an included angle between a connection line, that is between the sound box and the television, and the connection line between the two speakers of the television is 45°. The position of the sound box is two positions shown in FIG. 17.

After the angles of the two sound boxes relative to the television are obtained, the orientation between the two sound boxes may be determined based on a size relationship between the two angles. For example, if both the sound box 1 and the sound box 2 are located in the left-side region of the television, an angle of the sound box 1 relative to the television is $\alpha 1$, an angle of the sound box 2 relative to the television is $\alpha 2$, and $\alpha 1$ is greater than $\alpha 2$, the television can determine, based on $\alpha 1$ and $\alpha 2$, that the sound box 1 is located on the right side of the sound box 2. Then, the television sends the right-channel audio information to the sound box 1, and sends the left-channel audio information to the sound box 2. If both the sound box 1 and the sound box 2 are located in the left-side region of the television, an angle of the sound box 1 relative to the television is $\alpha 1$, an angle of the sound box 2 relative to the television is $\alpha 2$, and $\alpha 1$ is less than $\alpha 2$, the television can determine, based on $\alpha 1$ and $\alpha 2$, that the sound box 1 is located on the left side of sound box 2. Then, the television sends the right-channel audio information to the sound box 2, and sends the left-channel audio information to the sound box 1.

In some embodiments, a boundary between the left-side region, the right-side region, and the front and rear-side region may be preset. For example, an angle corresponding to the boundary between the left-side region, the right-side region, and the front and rear-side region is preset to $\pm 20°$. To be specific, if the angle of the sound box relative to the television falls into a range of $[-20°,20°]$, the sound box is located in the front and rear-side region of the television. If the angle of the sound box relative to the television falls into a range of $(20°,90°]$, the sound box is located in the right-side region of the television. If the angle of the sound box relative to the television falls into a range of $[-90°,-20°)$, the sound box is located in the left-side region of the television.

In some embodiments, the boundary between the left-side region, the right-side region, and the front and rear-side region may be determined based on $T_7$, $T_8$, and a threshold $t_2$. For example, a curve meeting a condition that $T_7$ is earlier than $T_8$ and $|T_7-T_8|=t_2$ may be used as a boundary between the right-side region and the front and rear-side region. A curve meeting a condition that $T_7$ is later than $T_8$ and $|T_7-T_8|=t_2$ may be used as a boundary between the left-side region and the front and rear-side region.

The following uses an ultrasonic signal as an example to describe in detail a process of determining the relative position information between the electronic devices provided in embodiments of this application.

Embodiment 1

Figure 18:
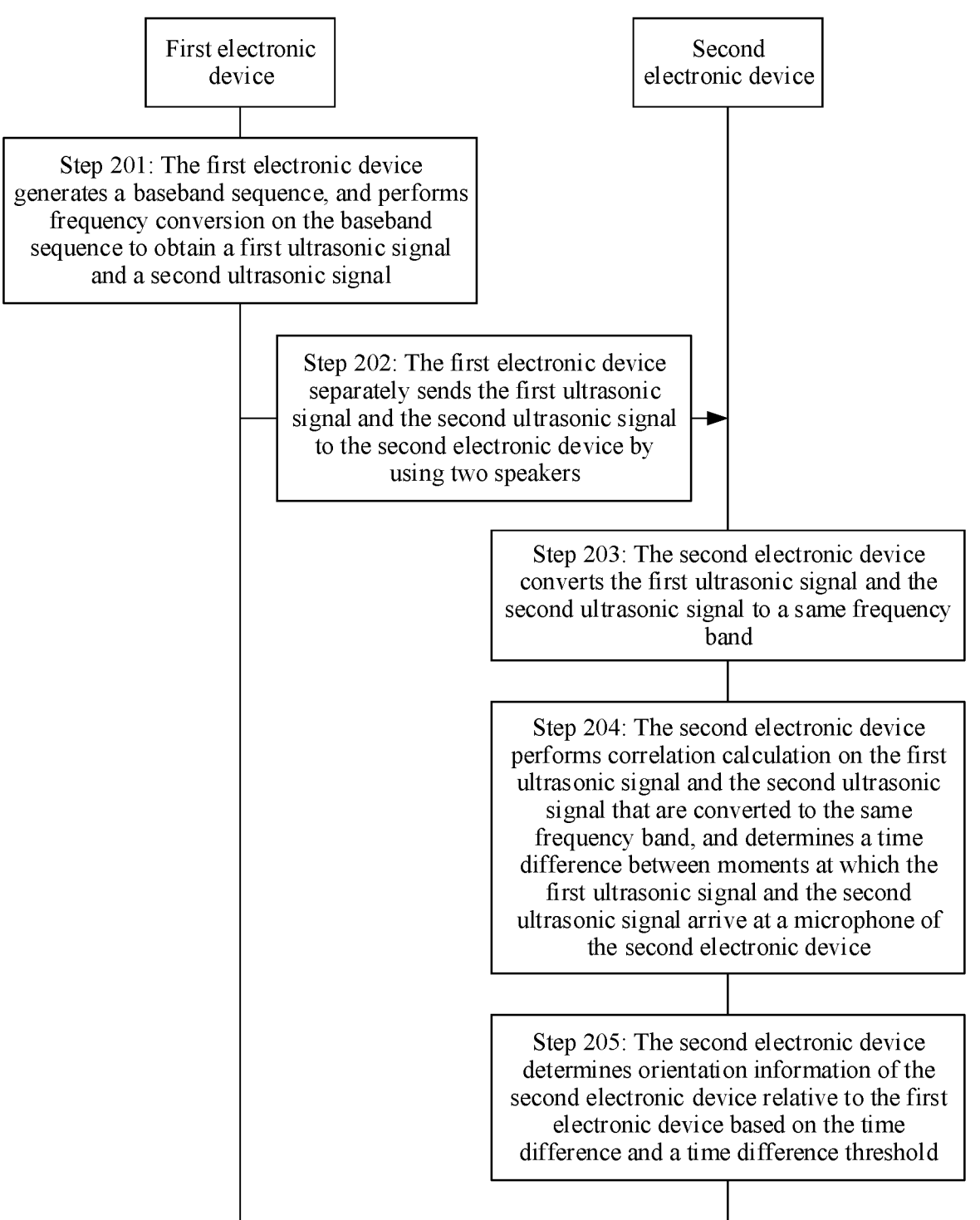
FIG. 18 is a schematic flowchart of determining relative position information according to an embodiment of this application.

FIG. 18 is a schematic flowchart of determining the relative position information between the second electronic device and the first electronic device according to an embodiment of this application. Refer to FIG. 18. A process of determining the relative position information between the second electronic device and the first electronic device includes step 201 to step 205.

Step 201: The first electronic device generates a baseband sequence, and performs frequency conversion on the baseband sequence to obtain a first ultrasonic signal and a second ultrasonic signal.

In a scenario, the first electronic device generates a baseband sequence s with bandwidth of B. The first electronic device performs up-conversion on the baseband sequence s to obtain a first ultrasonic signal $x_1(t)$ and a second ultrasonic signal $x_2(t)$. A frequency band of the first ultrasonic signal $x_1$ is $[f_1,f_2]$, and a frequency band of the second ultrasonic signal $x_2$ is $[f_3,f_4]$. In addition, the frequency band $[f_1, f_2]$ does not overlap the frequency band $[f_3,f_4]$. For example, $f_1$, $f_2$, $f_3$, and $f_4$ may satisfy the following relationship: $f_1<f_2<f_3<f_4$ or $f_3<f_4<f_1<f_2$.

In some embodiments, a process in which the first electronic device performs up-conversion on the baseband sequence s may be as follows: modulating the baseband sequence s onto a low-frequency carrier, performing frequency mixing on the low-frequency carrier and a high-frequency signal, and then obtaining two upper sideband signals obtained after frequency mixing, to obtain the first ultrasonic signal $x_1(t)$ and the second ultrasonic signal $x_2(t)$.

Step 202: The first electronic device separately sends the first ultrasonic signal and the second ultrasonic signal to the second electronic device by using the two speakers.

The two speakers may be respectively a left-channel speaker and a right-channel speaker of the first electronic device.

In a scenario, after obtaining the first ultrasonic signal $x_1(t)$ and the second ultrasonic signal $x_2(t)$, the first electronic device sends the first ultrasonic signal $x_1(t)$ to the second electronic device by using the left-channel speaker, and sends the second ultrasonic signal $x_2(t)$ to the second electronic device by using the right-channel speaker.

Step 203: The second electronic device converts the first ultrasonic signal and the second ultrasonic signal to a same frequency band.

After the microphone of the second electronic device receives the ultrasonic signals sent by the two speakers of the first electronic device, filtering is performed by using a filter whose filtering bandwidth is $[f_1,f_2]$ and a filter whose filtering bandwidth is $[f_3,f_4]$, to obtain the first ultrasonic signal and the second ultrasonic signal.

It should be noted that the first ultrasonic signal $x_1(t)$ and the second ultrasonic signal $x_2(t)$ are affected by channel information, a delay, or the like in a channel transmission process. As a result, after the second electronic device receives the two ultrasonic signals, the first ultrasonic signal $x_1(t)$ is converted into a first ultrasonic signal $y_1(t)$, and the second ultrasonic signal $x_2(t)$ is converted into a second ultrasonic signal $y_2(t)$. A frequency band of the first ultrasonic signal $y_1(t)$ is the same as the frequency band of the first ultrasonic signal $x_1(t)$, and is $[f_1,f_2]$. A frequency band of the first ultrasonic signal $y_1(t)$ is the same as the frequency band of the second ultrasonic signal $x_2(t)$, and is $[f_3,f_4]$.

After the second electronic device receives the first ultrasonic signal $y_1(t)$ and the second ultrasonic signal $y_2(t)$, the second electronic device converts the first ultrasonic signal $y_1(t)$ and the second ultrasonic signal $y_2(t)$ to a same frequency band, to perform correlation calculation in step 204.

For example, the second electronic device may perform frequency conversion processing on the first ultrasonic signal $y_1(t)$, to convert the first ultrasonic signal $y_1(t)$ and the second ultrasonic signal $y_2(t)$ to the same frequency band. Alternatively, the second electronic device may perform frequency conversion processing on the second ultrasonic signal $y_2(t)$, to convert the first ultrasonic signal $y_1(t)$ and the second ultrasonic signal $y_2(t)$ to the same frequency band. Alternatively, the second electronic device may perform frequency conversion processing on both the first ultrasonic signal $y_1(t)$ and the second ultrasonic signal $y_2(t)$, to convert the first ultrasonic signal $y_1(t)$ and the second ultrasonic signal $y_2(t)$ to the same frequency band.

The following uses an example in which $f_1<f_2<f_3<f_4$ to describe how the second electronic device converts the first ultrasonic signal $y_1(t)$ and the second ultrasonic signal $y_2(t)$ to the same frequency band.

In a scenario, after the second electronic device receives the first ultrasonic signal $y_1$ and the second ultrasonic signal $y_2(t)$, the second electronic device may up-convert the frequency band of the first ultrasonic signal $y_1(t)$ from $[f_1,f_2]$ to $[f_3,f_4]$, to obtain the first ultrasonic signal $y'_1(t)$. For example, the second electronic device may multiply the first ultrasonic signal $y_1(t)$ by $\cos(2\pi(f_3-f_1)t)$, and then perform filtering by using the filter whose bandwidth is $[f_3,f_4]$, to obtain the first ultrasonic signal $y'_1(t)$.

In another scenario, after the second electronic device receives the first ultrasonic signal $y_1(t)$ and the second ultrasonic signal $y_2(t)$, the second electronic device may down-convert the frequency band of the second ultrasonic signal $y_2(t)$ from $[f_3,f_4]$ to $[f_1,f_2]$, to obtain the second ultrasonic signal $y'_2(t)$. For example, the second electronic device may multiply the second ultrasonic signal $y_2(t)$ by $\cos(2\pi(f_3-f_1)t)$, and then perform filtering by using the filter whose bandwidth is $[f_1,f_2]$, to obtain the second ultrasonic signal $y'_2(t)$.

In still another scenario, after the second electronic device receives the first ultrasonic signal $y_1(t)$ and the second ultrasonic signal $y_2(t)$, the second electronic device may alternatively convert the frequency band of the first ultrasonic signal $y_1(t)$ and the frequent band of the second ultrasonic signal $y_2(t)$ to a first frequency band. The first frequency band is a frequency band different from the frequency band $[f_1,f_2]$ and the frequency band $[f_3,f_4]$.

Step 204: The second electronic device performs correlation calculation on the first ultrasonic signal and the second ultrasonic signal that are converted to the same frequency band, and determines a time difference between moments at which the first ultrasonic signal and the second ultrasonic signal arrive at the microphone of the second electronic device.

For example, the time difference between the moments at which the first ultrasonic signal and the second ultrasonic signal arrive at the microphone of the second electronic device may be represented as a difference between quantities of sampling points at which the microphone samples the first ultrasonic signal and the second ultrasonic signal. After the ultrasonic signal arrives at the microphone, the microphone samples the ultrasonic signal at a fixed sampling frequency $f_s$. For example, the sampling frequency $f_s$ is 48 kHz. As a result, within duration t, a quantity of sampling points that is collected by the microphone is $t \times f_s$.

For example, the first ultrasonic signal first arrives at the microphone, and then the second ultrasonic signal arrives at the microphone. In this case, the quantity of sampling points at which the microphone samples the first ultrasonic signal is greater than the quantity of sampling points at which the microphone samples the first ultrasonic signal. The difference between the two quantities of sampling points is a product $\Delta t \cdot f_s$ of the sampling frequency and the time difference, where $\Delta t$ is the time difference.

In a scenario, the second electronic device converts the frequency band of the second ultrasonic signal to the frequency band of the first ultrasonic signal, and the second electronic device performs correlation calculation on the first ultrasonic signal $y_1(t)$ and the second ultrasonic signal $y'_2(t)$.

For a case in which the first sound wave signal first arrives at the microphone, and then the second sound wave signal arrives at the microphone, a correlation calculation formula may be $$z(\tau) = \sum_t y_1(t) y'_2(t - \tau).$$

$y_1(t)$ represents a value of the first ultrasonic signal $y_1(t)$ at a sampling moment t. $y'_2(t-\tau)$ represents a value of the second ultrasonic signal $y'_2(t)$ at a sampling moment $t-\tau$. When a peak value of $y_1(t)$ overlaps a peak value of $y'_2(t-\tau)$, a peak value of $z(\tau)$ and a quantity of sampling points $\tau^*$ that corresponds to the time difference between the moments at which the first ultrasonic signal and the second ultrasonic signal arrive at the microphone of the second electronic device 200 may be obtained.

For a case in which the second ultrasonic signal first arrives at the microphone, and then the first ultrasonic signal arrives at the microphone, a correlation calculation formula may be $$z(\tau) = \sum_t y_1(t - \tau) y'_2(t).$$

$y_1(t-\tau)$ represents a value of the first ultrasonic signal $y_1(t)$ at a sampling moment $t-\tau$. $y'_2(t)$ represents a value of the second ultrasonic signal $y'_2(t)$ at a sampling moment t. When a peak value of $y_1(t-\tau)$ overlaps a peak value of $y'_2(t)$, a peak value of $z(\tau)$ and a quantity of sampling points $\tau^*$ that corresponds to the time difference between the moments at which the first ultrasonic signal and the second ultrasonic signal arrive at the microphone of the second electronic device 200 may be obtained.

Step 205: The second electronic device determines orientation information of the second electronic device relative to the first electronic device based on the time difference and a time difference threshold.

For example, the second electronic device may determine the orientation information of the second electronic device relative to the first electronic device based on the difference between the quantities of sampling points and a preset sampling point value.

The preset sampling point value Th is related to a first spacing D between the left-channel speaker and the right-channel speaker and/or the sampling frequency $f_s$ at which the microphone samples the received signal.

In some embodiments, the preset sampling point value Th may be positively correlated with the first spacing D and/or the sampling frequency $f_s$. For example, the preset sampling point value Th may be positively correlated with the first spacing D and the sampling frequency $f_s$. A larger first spacing D and sampling frequency $f_s$ indicate a larger preset sampling point value Th. For example, a relationship between the preset sampling point value Th, the first spacing D, and the sampling frequency $f_s$ may be $$Th = a\frac{D \cdot f_s}{v}.$$

A coefficient a is any value falling within $(-1, 1)$.

For example, a calculation formula $$Th = a\frac{D \cdot f_s}{v}$$

of the preset quantity of sampling points may be set before delivery of the second electronic device. The sampling frequency $f_s$, a propagation velocity $v$ of the ultrasonic signal, and the coefficient a may be set before delivery of the second electronic device. The first spacing D may be obtained from the first electronic device through requesting. Then, the second electronic device obtains the preset sampling point value Th through calculation according to the formula $$Th = a \frac{D \cdot f_s}{v}.$$

For example, the first spacing D is 30 centimeters, the sampling frequency $f_s$ is 48 kHz, the propagation velocity $v$ of the ultrasonic signal is 340 m/s, the coefficient a is ½, and the corresponding preset sampling point value Th is approximately 21.

Figure 19:
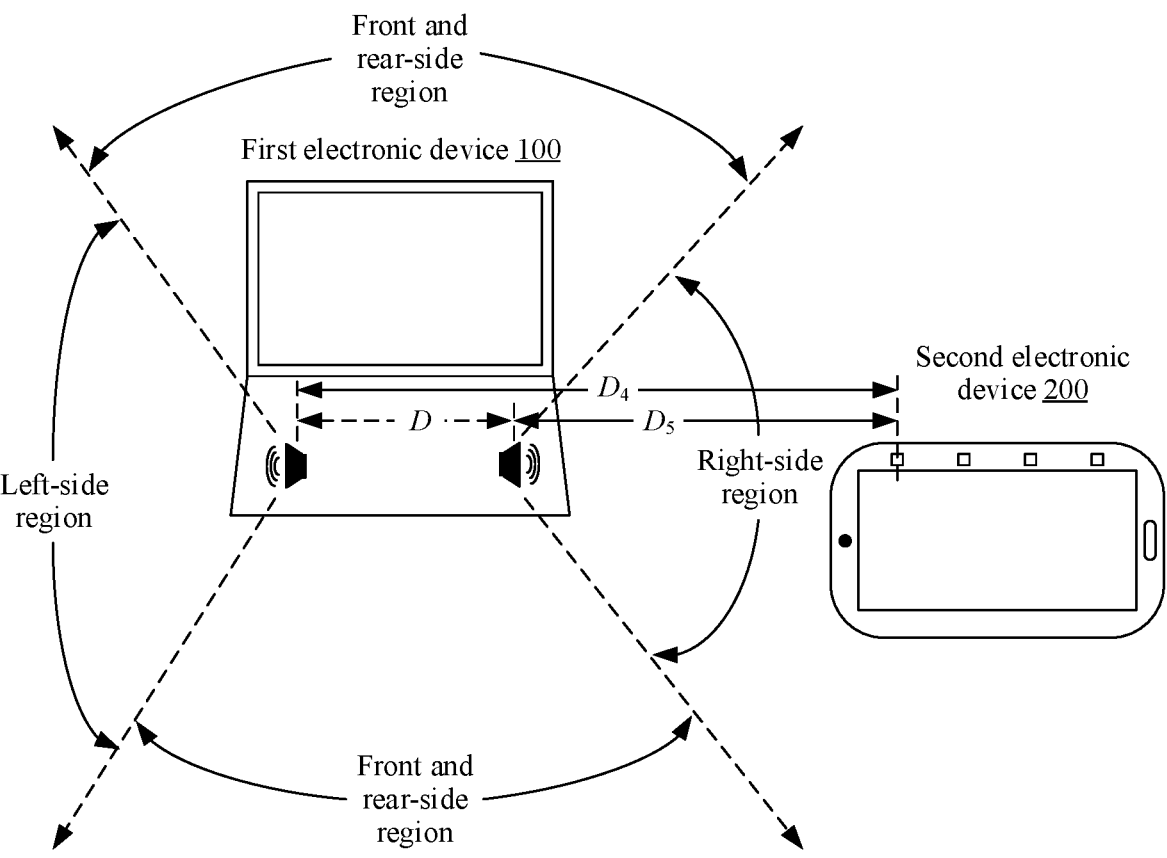
FIG. 19 is a schematic diagram of relative position information between a first electronic device and a second electronic device according to an embodiment of this application.

In a scenario, the first spacing D between the left-channel speaker and the right-channel speaker is shown in FIG. 19. The second electronic device 200 is located in the right-side region of the first electronic device 100, and the second electronic device 200 is located on a connection line between the left-channel speaker and the right-channel speaker. If a distance between the left-channel speaker of the first electronic device 100 and the microphone of the second electronic device 200 is $D_4$, and a distance between the right-channel speaker of the first electronic device 100 and the microphone of the second electronic device 200 is $D_5$, the first distance is that $D=D_4-D_5$. As a result, a time difference between moments at which the microphone of the second electronic device 200 receives the two ultrasonic signals is $\Delta t=D/v$. $v$ is the propagation velocity of the ultrasonic signal. However, the sampling frequency of the microphone of the second electronic device 200 is $f_s$. As a result, a quantity of sampling points that corresponds to the time difference between the moments at which the microphone of the second electronic device 200 receives the two ultrasonic signals is $$\Delta t \cdot f_s = \frac{D \cdot f_s}{v}.$$

A case in which the second electronic device 200 is located in the left-side region of the first electronic device 100 is not described again. Refer to the foregoing content.

It can be learned based on FIG. 19 and related content that, for a case in which the second electronic device 200 is located in the right-side region of the first electronic device 100, a value of the quantity of sampling points that corresponds to the time difference between the moments at which the microphone of the second electronic device 200 receives the two ultrasonic signals may be $$a \frac{D \cdot f_s}{v}.$$

a is the any value falling into (−1, 1). For example, a may be a value, for example, ±0.2, ±0.3, ±0.4, ±0.5, ±0.6 or ±0.7. The right-side region, the left-side region, and the front and rear-side region of the first electronic device 100 are shown in FIG. 13. Size ranges of the right-side region, the left-side region, and the front and rear-side region may be adjusted by adjusting the value of a.

If $\tau^*>Th$, it indicates that the second ultrasonic signal first arrives at the microphone of the second electronic device. In this case, the second electronic device is located in the right-side region of the first electronic device. If $\tau^*<-Th$, it indicates that the first ultrasonic signal first arrives at the microphone of the second electronic device. In this case, the second electronic device is located in the left-side region of the first electronic device. If $|\tau^*|\le Th$, it indicates that the first ultrasonic signal and the second ultrasonic signal arrive at the microphone of the second electronic device almost at the same time. In this case, the second electronic device is located in the front and rear-side region of the first electronic device.

In some embodiments, when the second electronic device has a plurality of microphones, the plurality of microphones may all collect the first ultrasonic signal and the second ultrasonic signal. Then, the second electronic device obtains the first ultrasonic signal and the second ultrasonic signal that are collected by one microphone, and performs step 203 to step 205.

In some embodiments, when the second electronic device has a plurality of microphones, a controller of the second electronic device may control a first microphone to collect the first ultrasonic signal and the second ultrasonic signal. The first microphone is any one of the plurality of microphones. For example, the controller of the second electronic device controls the first microphone to work and another microphone not to work temporarily. Then, the second electronic device obtains the first ultrasonic signal and the second ultrasonic signal that are collected by the first microphone, and performs step 203 to step 205.

In some embodiments, when the second electronic device has a plurality of microphones, the plurality of microphones may all collect the first ultrasonic signal and the second ultrasonic signal. Then, the second electronic device obtains the first ultrasonic signal and the second ultrasonic signal that are collected by each microphone, and separately performs step 203 and step 204. The second electronic device obtains an average time difference based on a plurality of time differences obtained in step 204, and then performs step 205 based on the average time difference.

Embodiment 2

Figure 20:
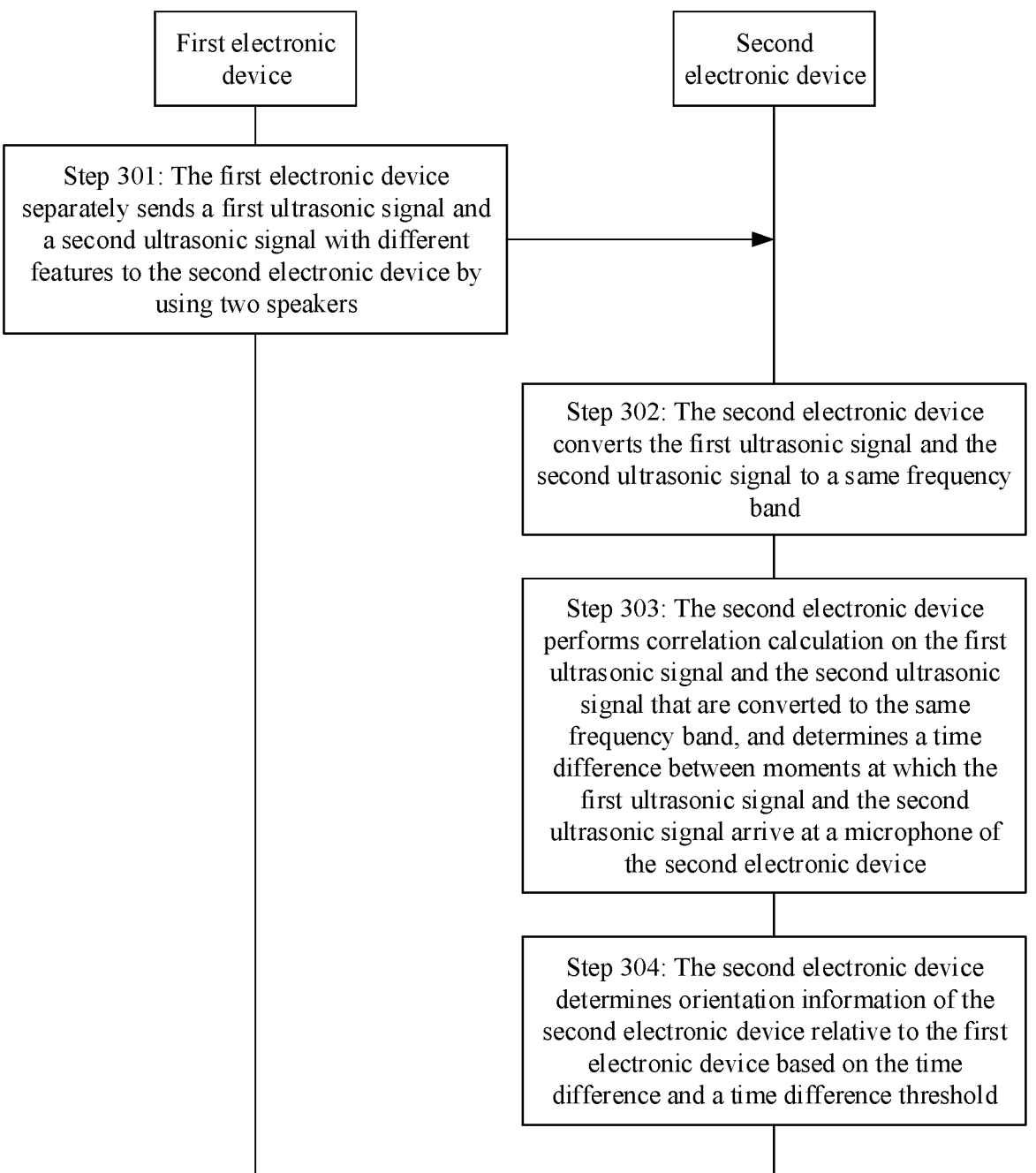
FIG. 20 is a schematic flowchart of determining relative position information according to an embodiment of this application.

FIG. 20 is a schematic flowchart of determining the relative position information between the second electronic device and the first electronic device according to an embodiment of this application. Refer to FIG. 20. A process of determining the relative position information between the second electronic device and the first electronic device includes step 301 to step 304.

Step 301: The first electronic device separately sends a first ultrasonic signal and a second ultrasonic signal with different features to the second electronic device by using the two speakers.

The first ultrasonic signal and the second ultrasonic signal may be ultrasonic signals on different frequency bands or ultrasonic signals of different orthogonal sequences.

Different from that in Embodiment 1, in this embodiment, the first ultrasonic signal and the second ultrasonic signal are directly generated by the first electronic device instead of being obtained by performing frequency conversion on a baseband sequence. For example, the first electronic device generates a first ultrasonic signal $x_1(t)$ whose frequency band is $[f_1,f_2]$ and a second ultrasonic signal $x_2(t)$ whose frequency band is $[f_3,f_4]$, and the frequency band $[f_1,f_2]$ does not overlap the frequency band $[f_3,f_4]$. For example, $f_1$, $f_2$, $f_3$, and $f_4$ may satisfy the following relationship: $f_1<f_2<f_3<f_4$ or $f_3<f_4<f_1<f_2$.

In some embodiments, the two speakers may be respectively a left-channel speaker and a right-channel speaker of the first electronic device. For example, after obtaining the first ultrasonic signal $x_1(t)$ and the second ultrasonic signal $x_2(t)$, the first electronic device sends the first ultrasonic signal $x_1(t)$ to the second electronic device by using the left-channel speaker, and sends the second ultrasonic signal $x_2(t)$ to the second electronic device by using the right-channel speaker.

For step 302 to step 304, refer to step 203 to step 205. Details are not described herein again.

Embodiment 3

FIG. 21 is a schematic flowchart of determining the relative position information between the second electronic device and the first electronic device according to an embodiment of this application. Refer to FIG. 21. A process of determining the relative position information between the second electronic device and the first electronic device includes step 401 to step 405.

For step 401 to step 404, refer to step 201 to step 204. Details are not described herein again.

Step 405: The second electronic device determines angle information of the second electronic device relative to the first electronic device based on a time difference, a first spacing between the left-channel speaker and the right-channel speaker, and a sampling frequency of the microphone.

In some embodiments, the time difference between moments at which a first ultrasonic signal and a second ultrasonic signal arrive at the microphone of the second electronic device may be represented as a difference between quantities of sampling points at which the microphone samples the first ultrasonic signal and the second ultrasonic signal. As a result, step 405 may be as follows: determining the angle information of the second electronic device relative to the first electronic device based on the difference between the quantities of sampling points, the first spacing between the left-channel speaker and the right-channel speaker, and the sampling frequency of the microphone.

Figure 22:
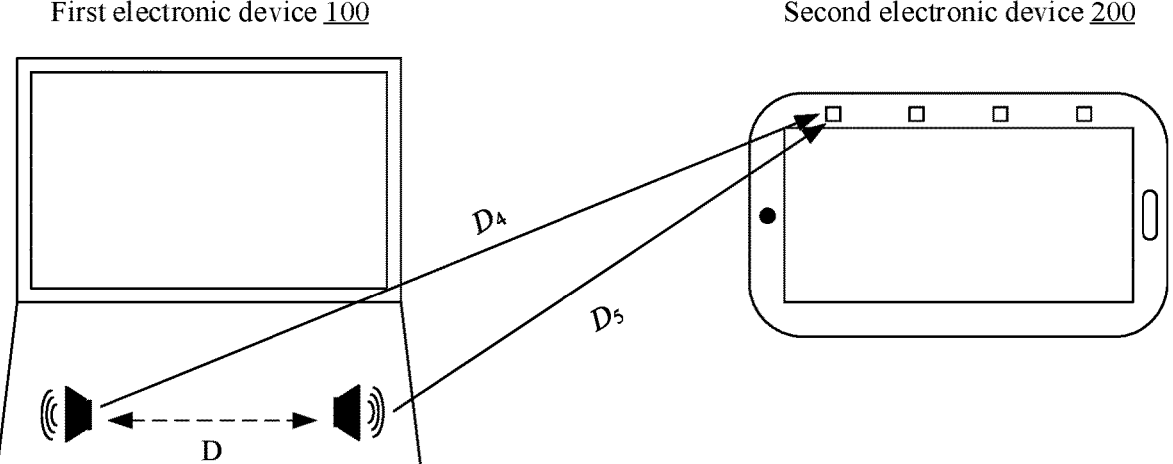
FIG. 22 is a schematic diagram of relative position information between a first electronic device and a second electronic device according to an embodiment of this application.

As shown in FIG. 22, the first spacing is D, a distance between the microphone and the left-channel speaker is $D_4$, and a distance between the microphone and the right-channel speaker is $D_5$. In this case, the difference between the quantities of sampling points is $$\tau^* = \frac{D_4 - D_5}{v} f_s.$$

is the sampling frequency of the microphone, and $v$ is a propagation velocity of the ultrasonic signal.

The following describes how to determine an angle $\theta$ of the second electronic device relative to the first electronic device.

First, a reference angle is set. Refer to the related descriptions in the secure projection application scenario. Details are not described herein again.

Then, the angle $\theta$ of the second electronic device relative to the first electronic device may be determined based on the reference angle and a relationship between $D_4$–$D_5$ and D.

For example, when the reference angle is 90°, 0°, or –90°, the angle $\theta$ of the second electronic device relative to the first electronic device may be approximately $$\theta \approx \frac{D_4 - D_5}{2D} \cdot 180°.$$

When $D_4$–$D_5$=D, the second electronic device is located in a right-side region of the first electronic device, the second electronic device is located on a connection line between the two speakers of the first electronic device, and an angle $\theta$ obtained through calculation is 90°. When $D_4$–$D_5$=–D, the second electronic device is located in a left-side region of the first electronic device, the second electronic device is located on a connection line between the two speakers of the first electronic device, and an angle $\theta$ obtained through calculation is –90°. When $D_4$–$D_5$=0, the second electronic device is located in a front and rear-side region of the first electronic device, the second electronic device is located on a perpendicular bisector of a connection line between the two speakers of the first electronic device, and an angle $\theta$ obtained through calculation is 0°.

It can be learned from the formula $$\tau^* = \frac{D_4 - D_5}{v} f_s$$

that $$D_4 - D_5 = \frac{\tau^* v}{f_s},$$

and therefore, the angle $\theta$ may be approximately $$\theta \approx \frac{D_4 - D_5}{2D} \cdot 180° = \frac{\tau^* v}{D f_s} \cdot 90°.$$

For another example, when the reference angle is 0°, 90°, or 180°, the angle $\theta$ of the second electronic device relative to the first electronic device may be approximately $$\theta \approx \frac{D - (D_4 - D_5)}{2D} \cdot 180°.$$

When $D_4$–$D_5$=D, the second electronic device is located in a right-side region of the first electronic device, the second electronic device is located on a connection line between the two speakers of the first electronic device, and an angle $\theta$ obtained through calculation is 0°. When $D_4$–$D_5$=–D, the second electronic device is located in a left-side region of the first electronic device, the second electronic device is located on a connection line between the two speakers of the first electronic device, and an angle $\theta$ obtained through calculation is 180°. When $D_4$–$D_5$=0, the second electronic device is located in a front and rear-side region of the first electronic device, the second electronic device is located on a perpendicular bisector of a connection line between the two speakers of the first electronic device, and an angle $\theta$ obtained through calculation is 90°.

It can be learned from the formula $$\tau^* = \frac{D_4 - D_5}{v} f_s$$

that $$D_4 - D_5 = \frac{\tau^* v}{f_s},$$

and therefore, the angle θ may be approximately $$\theta \approx \frac{D - (D_4 - D_5)}{2D} \cdot 180° = \left(1 - \frac{\tau^* v}{Df_s}\right) \cdot 90°.$$

After the angle θ of the second electronic device relative to the first electronic device is obtained, an orientation of the second electronic device relative to the first electronic device may be determined based on a preset boundary between the left-side region, the right-side region, and the front and rear-side region. For details, refer to the related descriptions of the boundary between the left-side region, the right-side region, and the front and rear-side region in the stereo application scenario. Details are not described herein again.

In another embodiment, the second electronic device may alternatively determine the angle of the second electronic device relative to the first electronic device according to a method, for example, a trigonometric function.

Embodiment 4

Figure 23:
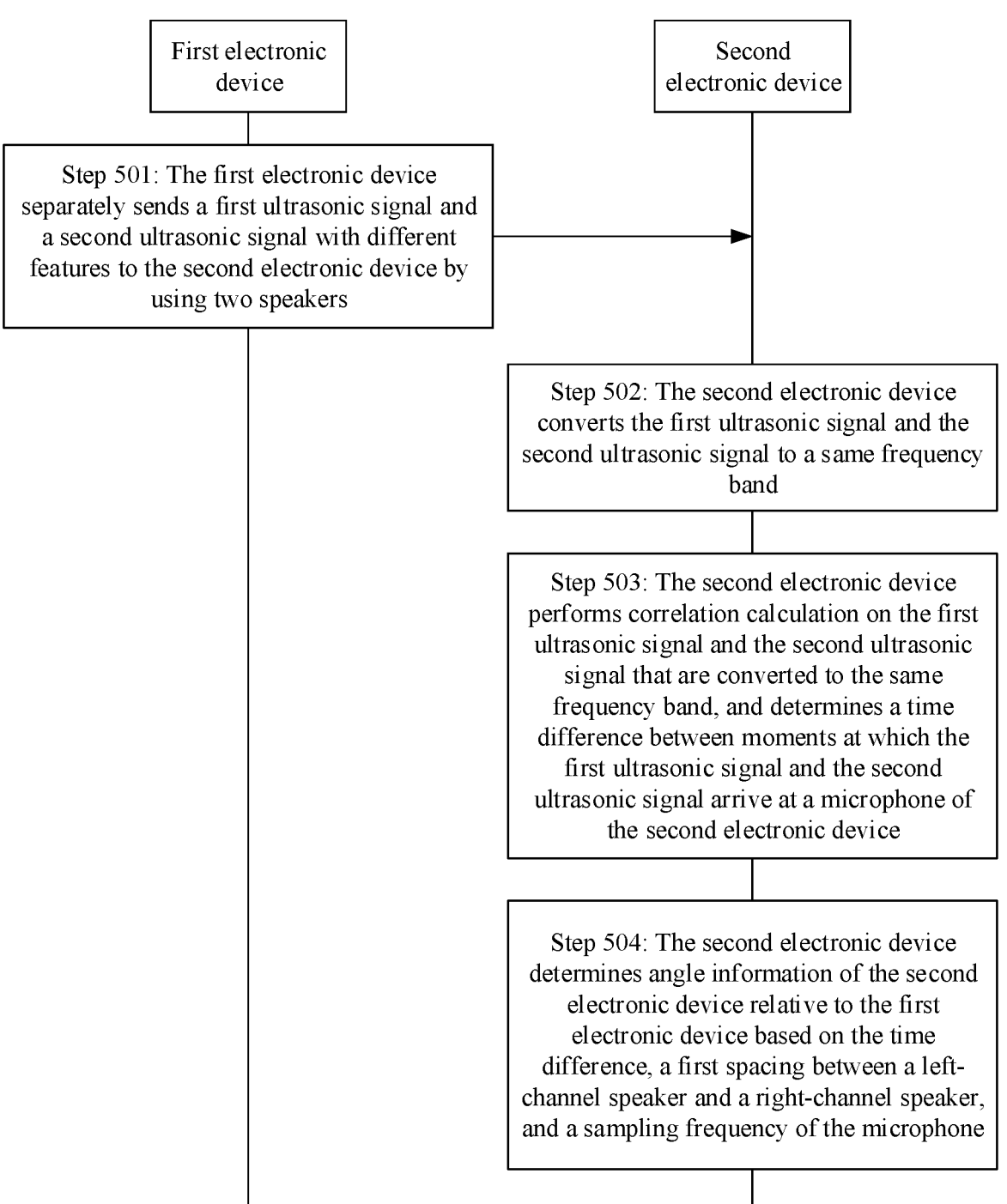
FIG. 23 is a schematic flowchart of determining relative position information according to an embodiment of this application.

FIG. 23 is a schematic flowchart of determining the relative position information between the second electronic device and the first electronic device according to an embodiment of this application. Refer to FIG. 23. A process of determining the relative position information between the second electronic device and the first electronic device includes step 501 to step 504.

Step 501: The first electronic device separately sends a first ultrasonic signal and a second ultrasonic signal with different features to the second electronic device by using the two speakers.

For specific content, refer to step 301. Details are not described herein again.

For step 502 and step 503, refer to step 203 and step 204. Details are not described herein again.

For step 504, refer to step 405. Details are not described herein again.

Embodiment 5

Figure 24:
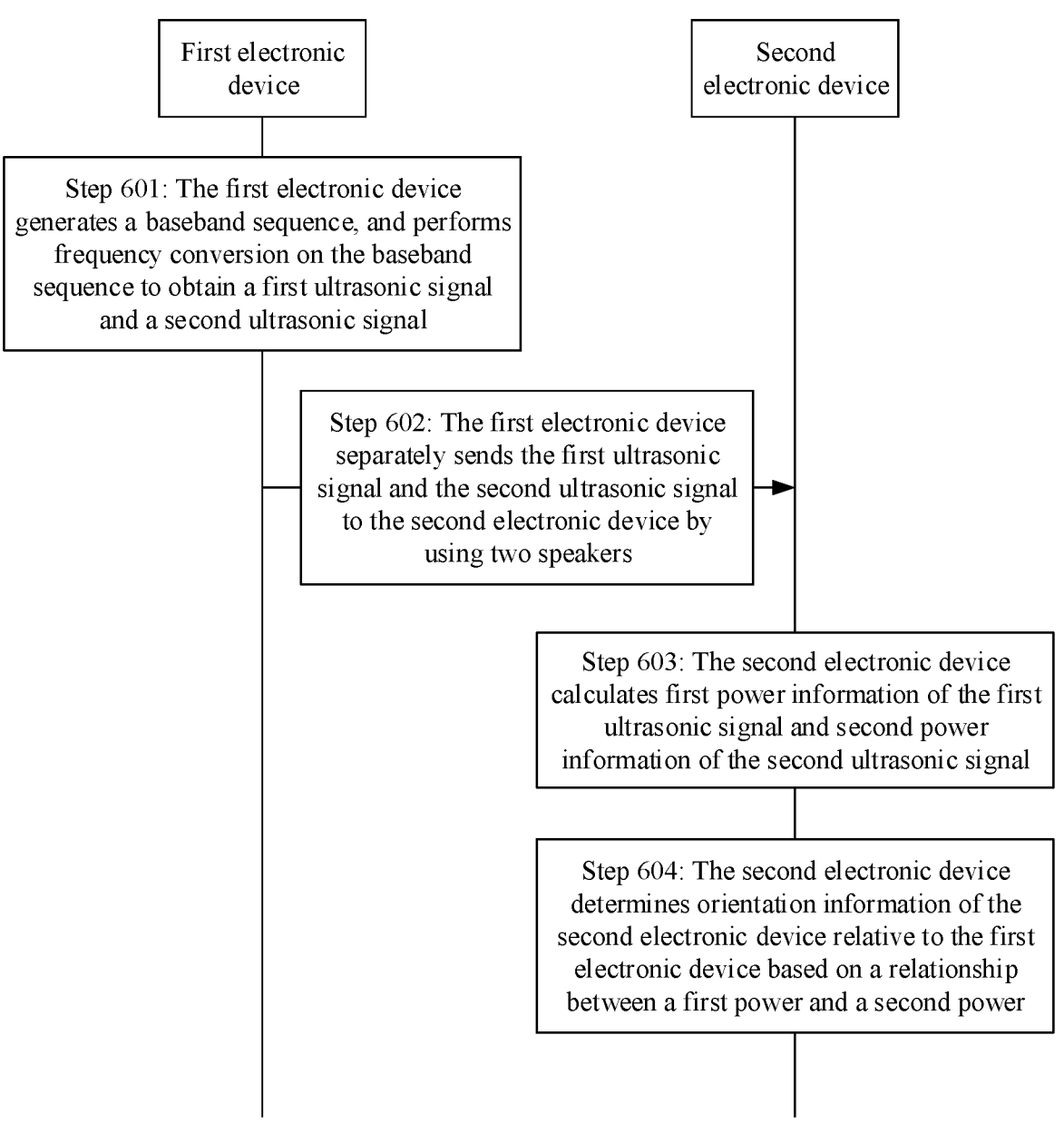
FIG. 24 is a schematic flowchart of determining relative position information according to an embodiment of this application.

FIG. 24 is a schematic flowchart of determining the relative position information between the second electronic device and the first electronic device according to an embodiment of this application. Refer to FIG. 24. A process of determining the relative position information between the second electronic device and the first electronic device includes step 601 to step 604.

Step 601: The first electronic device generates a baseband sequence, and performs frequency conversion on the baseband sequence to obtain a first ultrasonic signal and a second ultrasonic signal.

Different from that in step 201 in Embodiment 1, a power of the first ultrasonic signal $x_1(t)$ and a power of the second ultrasonic signal $x_2(t)$ in this embodiment are the same.

For step 602, refer to step 202. Details are not described herein again.

Step 603: The second electronic device calculates first power information of the first ultrasonic signal and second power information of the second ultrasonic signal.

After the microphone of the second electronic device receives the ultrasonic signals sent by the two speakers of the first electronic device, filtering is performed by using a filter whose filtering bandwidth is $[f_1,f_2]$ and a filter whose filtering bandwidth is $[f_3,f_4]$, to obtain the first ultrasonic signal and the second ultrasonic signal.

It should be noted that the first ultrasonic signal $x_1(t)$ and the second ultrasonic signal $x_2(t)$ are affected by channel information, a delay, or the like in a channel transmission process. As a result, after the second electronic device receives the two ultrasonic signals, the first ultrasonic signal $x_1(t)$ is converted into a first ultrasonic signal $y_1(t)$, and the second ultrasonic signal $x_2(t)$ is converted into a second ultrasonic signal $y_2(t)$. A frequency band of the first ultrasonic signal $y_1(t)$ is the same as the frequency band of the first ultrasonic signal $x_1(t)$, and is $[f_1,f_2]$. A frequency band of the first ultrasonic signal $y_1(t)$ is the same as the frequency band of the second ultrasonic signal $x_2(t)$, and is $[f_3,f_4]$.

After the second electronic device receives the first ultrasonic signal $y_1(t)$ and the second ultrasonic signal $y_2(t)$, the second electronic device calculates the first power information of the first ultrasonic signal $y_1(t)$ and the second power information of the second ultrasonic signal $y_2(t)$.

In some embodiments, the first power information may be a first average power of first ultrasonic signals $y_1(t)$ within a preset time period. The second power information may be a second average power of second ultrasonic signals $y_2(t)$ within the preset time period. For example, a time length of the first ultrasonic signal $y_1(t)$ is a first time length, and a time length of the second ultrasonic signal $y_2(t)$ is a second time length. In this case, the preset time period may be any value less than or equal to a smallest value between the first time length and the second time length.

The time length of the first ultrasonic signal $y_1(t)$ may be a time length corresponding to a start time point at which the first electronic device starts to send the first ultrasonic signal $y_1(t)$ and an end time point at which the first electronic device ends sending the first ultrasonic signal $y_1(t)$. The time length of the second ultrasonic signal $y_2(t)$ may be a time length corresponding to a start time point at which the first electronic device starts to send the first ultrasonic signal $y_2(t)$ and an end time point at which the first electronic device ends sending the first ultrasonic signal $y_2(t)$.

For example, the first average power may be an average value of a sum of powers of the first ultrasonic signals $y_1(t)$ within the preset time period. The second average power may be an average value of a sum of powers of the second ultrasonic signals $y_2(t)$ within the preset time period.

For example, the second electronic device may calculate the first average power by using $E(|y_1(t)|)$, and calculate the second average power by using $E(|y_2(t)|)$. Alternatively, the second electronic device may calculate the first average power by using $E(|y_1(t)|^2)$, and calculate the second average power by using $E(|y_2(t)|^2)$.

Step 604: The second electronic device determines orientation information of the second electronic device relative to the first electronic device based on a relationship between the first power and the second power.

In some embodiments, the second electronic device may calculate a ratio of the first power to the second power, and determine the orientation information of the second electronic device relative to the first electronic device based on the ratio. For example, a first threshold and a second threshold may be set, and the orientation information of the second electronic device relative to the first electronic device is determined based on a relationship between the ratio, the first threshold, and the second threshold.

For example, the first threshold a is greater than the second threshold b, the first threshold a is greater than 1, and the second threshold b is less than 1. The second electronic device calculates the ratio of the first average power to the second average power. If the ratio is greater than the first threshold a, it indicates that the first average power is greater than the second average power. In this case, the second electronic device is located in a left-side region of the first electronic device. If the ratio is less than the second threshold b, it indicates that the first average power is less than the second average power. In this case, the second electronic device is located in a right-side region of the first electronic device. If the ratio is less than or equal to the first threshold a and greater than or equal to the second threshold b, it indicates that the first average power is close to the second average power. In this case, the second electronic device is located in a front and rear-side region of the first electronic device.

For example, the second threshold b may be a reciprocal of the first threshold a, that is, b=1/a. If the ratio is greater than a, the second electronic device is located in the left-side region of the first electronic device. If the ratio is less than 1/a, the second electronic device is located in the right-side region of the first electronic device. If the ratio is less than or equal to a and greater than or equal to 1/a, the electronic device is located in the front and rear-side region of the first electronic device.

Embodiment 6

Figure 25:
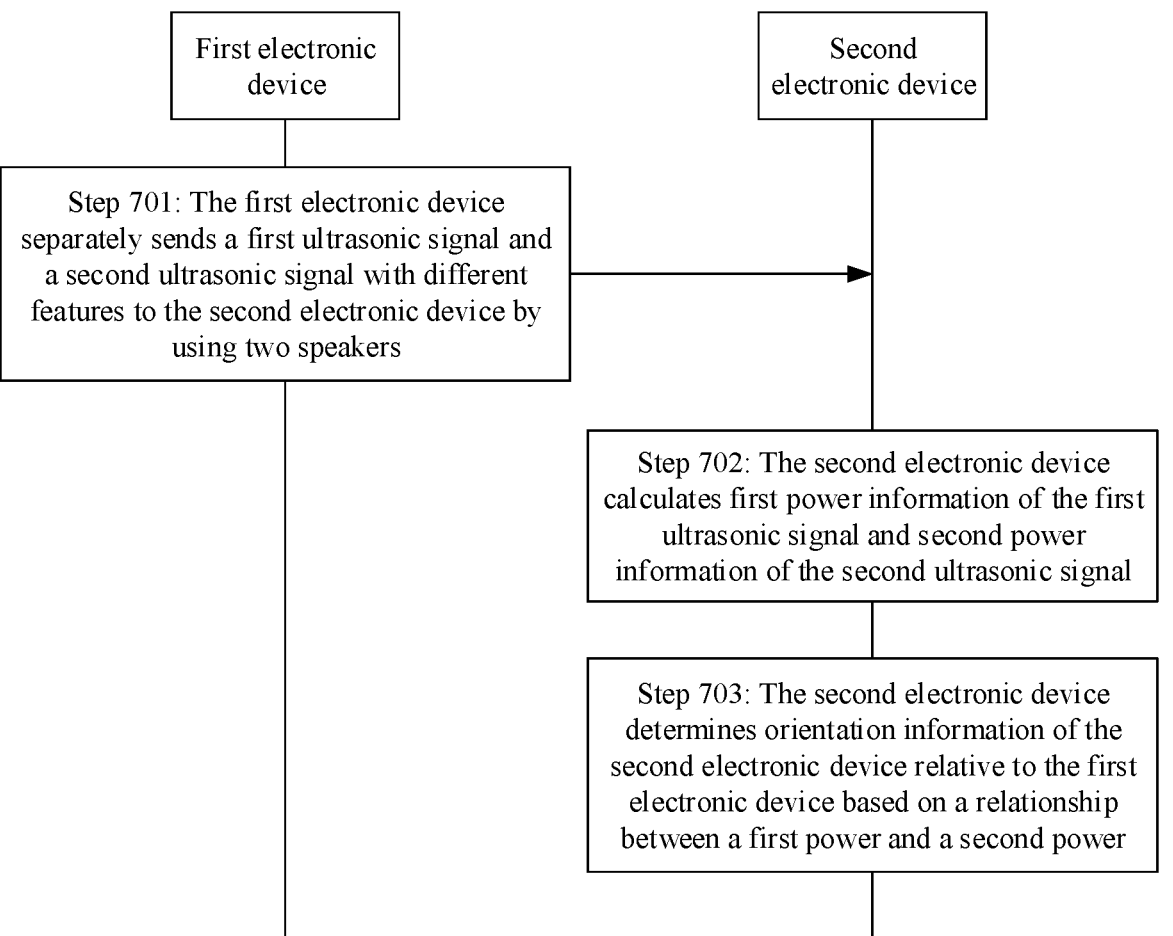
FIG. 25 is a schematic flowchart of determining relative position information according to an embodiment of this application.

FIG. 25 is a schematic flowchart of determining the relative position information between the second electronic device and the first electronic device according to an embodiment of this application. Refer to FIG. 25. A process of determining the relative position information between the second electronic device and the first electronic device includes step 701 to step 703.

Step 701: The first electronic device separately sends a first ultrasonic signal and a second ultrasonic signal with different features to the second electronic device by using the two speakers.

The first ultrasonic signal and the second ultrasonic signal are ultrasonic signals on different frequency bands or ultrasonic signals of different orthogonal sequences.

Different from that in Embodiment 5, in this embodiment, the first ultrasonic signal and the second ultrasonic signal are directly generated by the first electronic device instead of being obtained by performing frequency conversion on a baseband sequence s. For example, the first electronic device generates a first ultrasonic signal $x_1(t)$ whose frequency band is $[f_1,f_2]$ and a second ultrasonic signal $x_2(t)$ whose frequency band is $[f_3,f_4]$, the frequency band $[f_1,f_2]$ does not overlap the frequency band $[f_3,f_4]$, and a power of the first ultrasonic signal $x_1(t)$ is the same as a power of the second ultrasonic signal $x_2(t)$.

For step 702 and step 703, refer to step 603 and step 604. Details are not described herein again.

Embodiment 7

Figure 26:
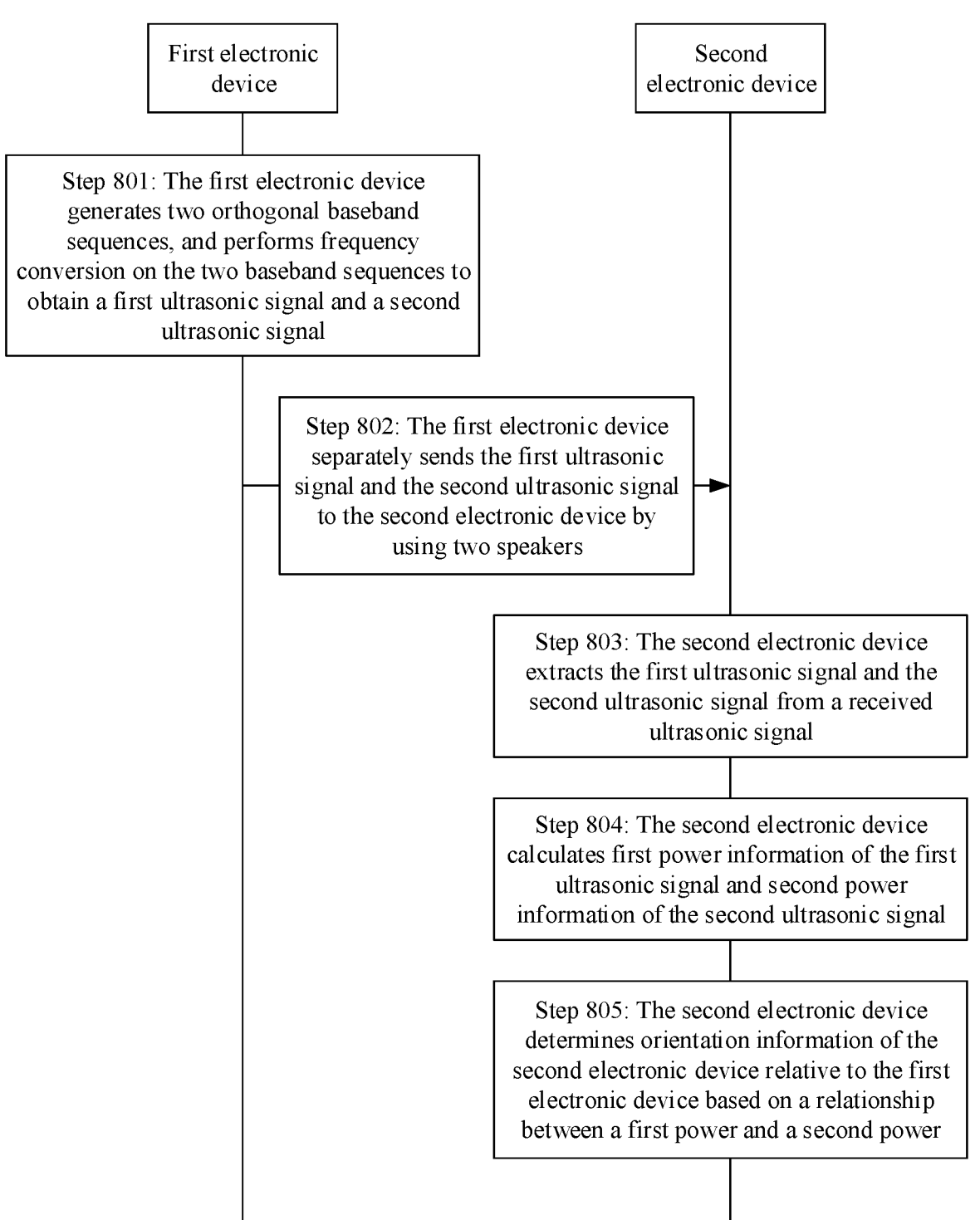
FIG. 26 is a schematic flowchart of determining relative position information according to an embodiment of this application.

FIG. 26 is a schematic flowchart of determining the relative position information between the second electronic device and the first electronic device according to an embodiment of this application. Refer to FIG. 26. A process of determining the relative position information between the second electronic device and the first electronic device includes step 801 to step 805.

Step 801: The first electronic device generates two orthogonal baseband sequences, and performs frequency conversion on the two baseband sequences to obtain a first ultrasonic signal and a second ultrasonic signal.

In a scenario, the first electronic device generates a first baseband sequence $s_1$ and a second baseband sequence $s_2$, and bandwidths are both B. The first electronic device up-converts the first baseband sequence $s_1$ and the second baseband sequence $s_2$ to a same frequency band $[f_c-B,f_c+B]$ to obtain a first ultrasonic signal $x_1(t)$ and a second ultrasonic signal $x_2(t)$. A power of the first ultrasonic signal $x_1(t)$ is the same as a power of the second ultrasonic signal $x_2(t)$.

For step 802, refer to step 202. Details are not described herein again.

Step 803: The second electronic device extracts the first ultrasonic signal and the second ultrasonic signal from a received ultrasonic signal.

The ultrasonic signal received by the second electronic device is a mixed ultrasonic signal of the first ultrasonic signal and the second ultrasonic signal, and a frequency band of the first ultrasonic signal is the same as a frequent band of the second ultrasonic signal. Therefore, the first ultrasonic signal and the second ultrasonic signal need to be extracted, and then a subsequent step is performed.

For example, the second electronic device may filter the received ultrasonic signal by using a filter whose filtering bandwidth is $[f_c-B,f_c+B]$. Then, an ultrasonic signal obtained through filtering is converted to a baseband frequency, and then convolution is performed on the ultrasonic signal that is converted to the baseband frequency and each of the first baseband sequence $s_1$ and the second baseband sequence $s_2$ to obtain the first ultrasonic signal and the second ultrasonic signal.

For step 804 and step 805, refer to step 603 and step 604. Details are not described herein again.

Embodiment 8

Figure 27:
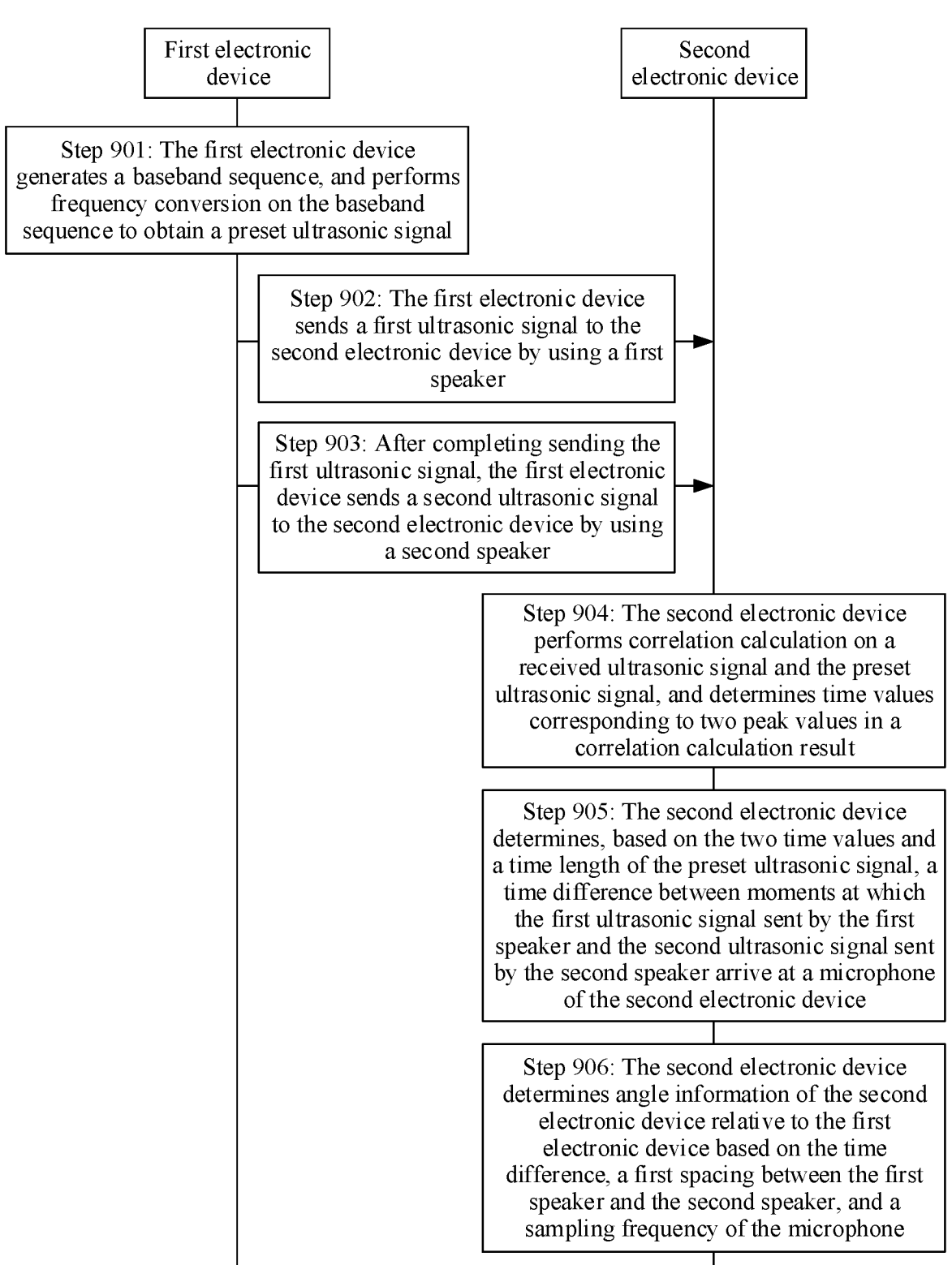
FIG. 27 is a schematic flowchart of determining relative position information according to an embodiment of this application.

FIG. 27 is a schematic flowchart of determining the relative position information between the second electronic device and the first electronic device according to an embodiment of this application. Refer to FIG. 27. A process of determining the relative position information between the second electronic device and the first electronic device includes step 901 to step 906.

Step 901: The first electronic device generates a baseband sequence, and performs frequency conversion on the baseband sequence to obtain a preset ultrasonic signal.

In a scenario, the first electronic device generates a baseband sequence s with bandwidth of B. The first electronic device performs up-conversion on the baseband sequence s to obtain a preset ultrasonic signal x(t). The preset ultrasonic signal x(t) has a frequency band that is $[f_1,f_2]$ and a time length that is $T_9$.

The first electronic device includes a first speaker and a second speaker. For example, the first speaker may be a left-channel speaker, and the second speaker may be a right-channel speaker. Alternatively, the first speaker may be a right-channel speaker, and the second speaker may be a left-channel speaker.

Step 902: The first electronic device sends a first ultrasonic signal to the second electronic device by using the first speaker.

The first ultrasonic signal $x_1(t)$ is the preset ultrasonic signal x(t), and a time sequence of $x_1(t)$ is the same as a time sequence of x(t).

Step 903: After completing sending the first ultrasonic signal, the first electronic device sends a second ultrasonic signal to the second electronic device by using the second speaker.

The second ultrasonic signal $x_2(t)$ is the preset ultrasonic signal $x(t)$, and a time sequence of $x_2(t)$ is the same as the time sequence of $x(t)$. When preset duration after completing sending the first ultrasonic signal elapses, the first electronic device may send the second sound wave signal to the second electronic device by using the second speaker. The preset duration may be any duration greater than or equal to 0.

For example, a length of the preset duration is $T_{10}$, and a moment at which the first electronic device completes sending the first ultrasonic signal to the second electronic device by using the first speaker is $T_{11}$. In this case, the first electronic device may send the second ultrasonic signal to the second electronic device at a moment $(T_{11}+T_{10})$ by using the second speaker.

The two speakers do not send ultrasonic signals at the same time. In this way, two ultrasonic signals sent by the two speakers are two ultrasonic signals of different orthogonal sequences.

Step 904: The second electronic device performs correlation calculation on a received ultrasonic signal and the preset ultrasonic signal, and determines time values corresponding to two peak values in a correlation calculation result.

The first electronic device may notify the second electronic device of sequence information of the preset ultrasonic signal in a manner, for example, Wi-Fi or Bluetooth. Alternatively, the preset ultrasonic signal may be an ultrasonic signal known to the second electronic device, and the first electronic device does not need to notify the second electronic device of time sequence information of the preset ultrasonic signal.

In some embodiments, an ultrasonic signal $y(t)$ received by the second electronic device may be an ultrasonic signal obtained after the first ultrasonic signal sent by the first electronic device by using the first speaker and the second ultrasonic signal sent by the first electronic device by using the second speaker are transmitted to the microphone of the second electronic device through a channel.

Step 905: The second electronic device determines, based on the two time values and the time length of the preset ultrasonic signal, a time difference between moments at which the first ultrasonic signal sent by the first speaker and the second ultrasonic signal sent by the second speaker arrive at the microphone of the second electronic device.

For example, the time difference between the moments at which the first ultrasonic signal sent by the first speaker and the second ultrasonic signal sent by the second speaker arrive at the microphone of the second electronic device may be represented as a difference between quantities of sampling points at which the microphone samples the first ultrasonic signal and the first ultrasonic signal.

Figure 28:
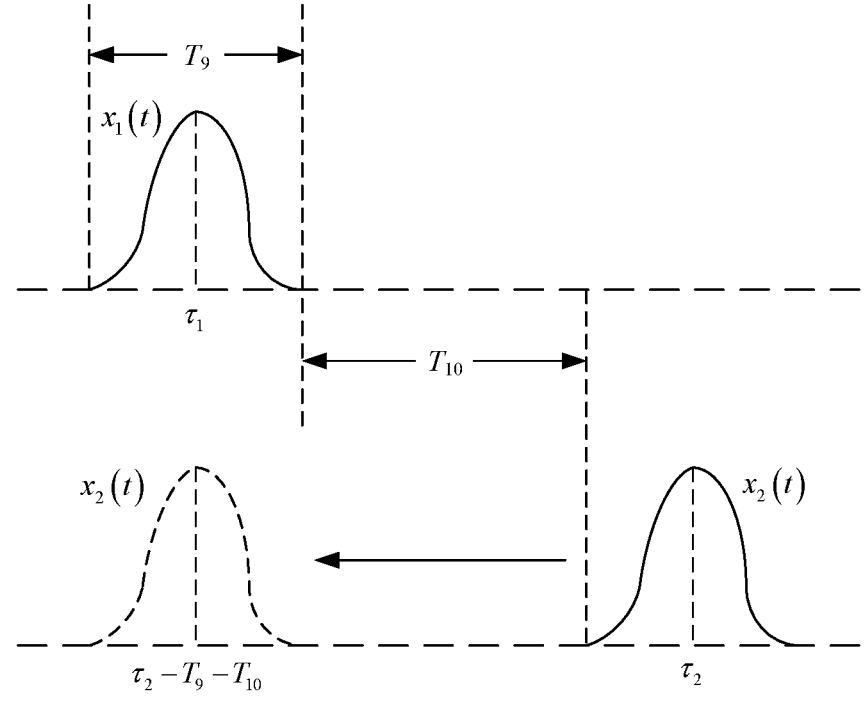
FIG. 28 is a schematic diagram of a time difference between moments at which ultrasonic signals arrive at a microphone of a second electronic device according to an embodiment of this application.

In a scenario, after the microphone of the second electronic device receives the signal $y_t$, correlation calculation $$z(\tau) = \sum_t y(t)x(t-\tau)$$

is performed on $y(t)$ and $x(t)$, to obtain two correlation peak values and corresponding time values $\tau_1$ and $\tau_2$ of $z(\tau)$. Waveforms of the ultrasonic signal $y(t)$ and the first ultrasonic signal $x_1(t)$ are shown in FIG. 28. The first ultrasonic signal $x_1(t)$ first arrives at the microphone, and then the second ultrasonic signal $x_2(t)$ arrives at the microphone. A time value corresponding to a peak value of the first ultrasonic signal $x_1(t)$ is $\tau_1$, and a time value corresponding to a peak value of the second ultrasonic signal $x_2(t)$ is $\tau_2$. Both time lengths of the first ultrasonic signal $x_1(t)$ and the second ultrasonic signal $x_2(t)$ are $T_9$, and the first electronic device sends the second ultrasonic signal to the second electronic device when the duration $T_{10}$ after the first electronic device completes sending the first ultrasonic signal elapses. In this case, the first electronic device may first move the second ultrasonic signal $x_2(t)$ leftward by duration corresponding to $T_9+T_{10}$, to eliminate time impact caused because the first electronic device does not send the two ultrasonic signals at the same time. A time value corresponding to the peak value of the second ultrasonic signal $x_2(t)$ that is moved leftward by the duration corresponding to $T_9+T10$ is $\tau_1-T_9-T_{10}$. Then, the time difference between the moments at which the first ultrasonic signal sent by the first speaker and the second ultrasonic signal sent by the second speaker arrive at the microphone of the second electronic device is calculated and is $\tau^*=\tau_1-(\tau_2-T_9-T_{10})$.

Step 906: The second electronic device determines angle information of the second electronic device relative to the first electronic device based on the time difference, a first spacing between the first speaker and the second speaker, and a sampling frequency of the microphone.

Refer to step 405. Details are not described herein again.

In another embodiment, the second electronic device may alternatively send the two time values to the first electronic device, and the first electronic device determines a time difference and determines angle information of the second electronic device relative to the first electronic device. Alternatively, the second electronic device may alternatively send the two time values to another electronic device other than the first electronic device and the second electronic device, and the another electronic device determines a time difference and angle information of the second electronic device relative to the first electronic device.

Embodiment 9

Figure 29:
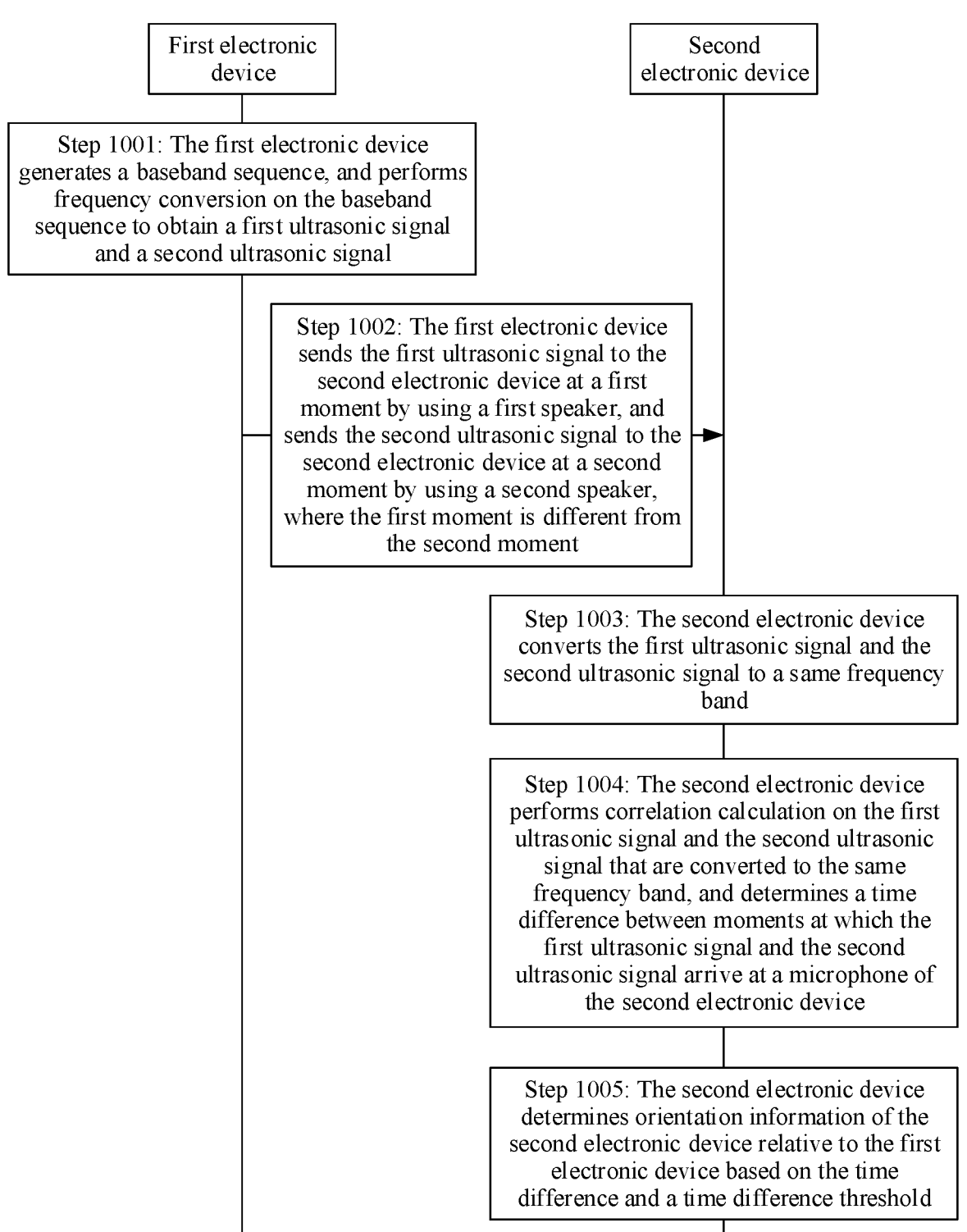
FIG. 29 is a schematic flowchart of determining relative position information according to an embodiment of this application.

FIG. 29 is a schematic flowchart of determining the relative position information between the second electronic device and the first electronic device according to an embodiment of this application. Refer to FIG. 29. A process of determining the relative position information between the second electronic device and the first electronic device includes step 1001 to step 1005.

For step 1001, refer to step 201. Details are not described herein again.

In this embodiment, time sequence information of a first ultrasonic signal is different from time sequence information of a second ultrasonic signal.

Step 1002: The first electronic device sends the first ultrasonic signal to the second electronic device at a first moment by using a first speaker, and sends the second ultrasonic signal to the second electronic device at a second moment by using a second speaker, where the first moment is different from the second moment.

When preset duration after the first electronic device completes sending the first ultrasonic signal by using the second speaker elapses, the first electronic device may send the second ultrasonic signal to the second electronic device by using the second speaker. The preset duration may be any duration greater than or equal to 0.

For step 1003 to step 1005, refer to step 203 to step 205. Details are not described herein again.

Optionally, an embodiment of this application further provides a method for interaction between devices, including: A first electronic device establishes a connection to a second electronic device. The first electronic device sends a first sound wave signal to the second electronic device by using a first speaker, and sends a second sound wave signal to the second electronic device by using a second speaker. The first speaker is different from the second speaker, and the first sound wave signal and the second sound wave signal are two sound wave signals with different features. The second electronic device receives the first sound wave signal and the second sound wave signal by using a first microphone. The second electronic device determines relative position information between the second electronic device and the first electronic device based on a time difference between moments at which the first microphone receives the first sound wave signal and the second sound wave signal or strength of the first sound wave signal and the second sound wave signal that are received by the first microphone. The relative position information includes that the second electronic device is located on the left side of the first electronic device, or the second electronic device is located on the right side of the first electronic device. The first electronic device and the second electronic device perform information exchange based on the relative position information.

Optionally, an embodiment of this application further provides an audio playing method, including: A first electronic device separately sends a first sound wave signal to a first audio playing device and a second audio playing device by using a first speaker, and separately sends a second sound wave signal to the second audio playing device and the second audio playing device by using a second speaker. The first speaker is different from the second speaker, and the first sound wave signal and the second sound wave signal are two sound wave signals with different features. The first electronic device receives first relative position information between the first audio playing device and the first electronic device sent by the first audio playing device and second relative position information between the second audio playing device and the first electronic device sent by the second audio playing device. The first relative position information is determined based on a receiving result of receiving the first sound wave signal and the second sound wave signal by a first microphone of the first audio playing device. The second relative position information is determined based on a receiving result of receiving the first sound wave signal and the second sound wave signal by a second microphone of the second audio playing device. Alternatively, the first electronic device receives a first receiving result sent by the first audio playing device and a second receiving result sent by the second audio playing device. The first receiving result is a receiving result of receiving the first sound wave signal and the second sound wave signal by a first microphone of the first audio playing device. The second receiving result is a receiving result of receiving the first sound wave signal and the second sound wave signal by a second microphone of the second audio playing device. The first electronic device determines first relative position information based on the first receiving result, and determines second relative position information based on the second receiving result. The first electronic device determines third relative position information between the first audio playing device and the second audio playing device based on the first relative position information and the second relative position information. The third relative position information includes that the first audio playing device is located on a third side of the second audio playing device, and the second audio playing device is located on a fourth side of the first audio playing device. The third side is a left side or a right side. The first electronic device sends left-channel audio information to an audio playing device that is located on the left side and that is in the first audio playing device and the second audio playing device, and sends right-channel audio information to an audio playing device that is located on the right side and that is in the first audio playing device and the second audio playing device.

Optionally, an embodiment of this application further provides an electronic device, including one or more processors, a memory, and two speakers. The memory and the two loudspeakers are coupled to the one or more processors. The memory is configured to store computer program code. The two loudspeakers are configured to send a sound wave signal, and the computer program code includes computer instructions. When the one or more processors execute the computer instructions, the electronic device is enabled to perform one or more steps in any one of the foregoing methods.

Optionally, an embodiment of this application further provides an electronic device, including one or more processors, a memory, and a microphone. The memory and the microphone are coupled to the one or more processors. The memory is configured to store computer program code. The microphone is configured to receive a sound wave signal, and the computer program code includes computer instructions. When the one or more processors execute the computer instructions, the electronic device is enabled to perform one or more steps in any one of the foregoing methods.

Optionally, an embodiment of this application further provides a computer-readable storage medium. The computer-readable storage medium stores instructions. When the instructions are run on a computer or a processor, the computer or the processor is enabled to perform one or more steps in any one of the foregoing methods.

Optionally, an embodiment of this application further provides a computer program product including instructions. When the computer program product runs on a computer or a processor, the computer or the processor is enabled to perform one or more steps in any one of the foregoing methods.

Optionally, an embodiment of this application further provides a chip system. The chip system may include a memory and a processor. The processor executes a computer program stored in the memory, to implement one or more steps in any one of the foregoing methods. The chip system may be a single chip or a chip module including a plurality of chips.

Optionally, an embodiment of this application further provides a chip system. The chip system may include a processor, and the processor is coupled to a memory. The processor executes a computer program stored in the memory, to implement one or more steps in any one of the foregoing methods. The chip system may be a single chip or a chip module including a plurality of chips.

All or some of the foregoing embodiments may be implemented by using software, hardware, firmware, or any combination thereof. When software is used to implement the foregoing embodiments, all or some of the embodiments may be implemented by form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (SSD)), or the like.

A person of ordinary skill in the art may understand that all or some of the procedures of the methods in the embodiments may be implemented by a computer program instructing related hardware. The program may be stored in a computer-readable storage medium. When the program is executed, the procedures in the method embodiments may be included. The foregoing storage medium includes any medium that can store program code, for example, a ROM, a random access memory RAM, a magnetic disk, or an optical disc.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for interaction between devices, comprising:
receiving, by a second electronic device, a first sound wave signal sent by a first electronic device by using a first speaker;
receiving, by the second electronic device, a second sound wave signal sent by the first electronic device by using a second speaker; and
determining, by the second electronic device, a relative position between the second electronic device and the first electronic device based on a time difference between first moment and a second moment, a distance between the first speaker and the second speaker, and a sampling frequency of a microphone of the second electronic device, wherein the first moment is a moment at which the second electronic device receives the first sound wave signal, the second moment is a moment at which the second electronic device receives the second sound wave signal, and wherein the time difference is determined based on a difference between quantities of sampling points at which the microphone of the second electronic device samples the first sound wave signal and the second sound wave signal, wherein the difference between quantities of sampling points is calculated by performing correlation calculation on the first sound wave signal and the second sound wave signal after converting the first sound wave signal and the second sound wave signal to a same frequency band, and wherein the relative position is determined by comparing the difference between quantities of sampling points with a preset sampling point value that is positively correlated with the distance between the first speaker and the second speaker and the sampling frequency of the microphone.

2. The method according to claim 1, wherein the first speaker is located on a first side of the second speaker, the second speaker is located on a second side of the first speaker, the first side is a left side or a right side, the second side is a side opposite to the first side, and the determining relative position between the second electronic device and the first electronic device based on the first moment and the second moment comprises:
determining that the second electronic device is located on a second side of the first electronic device when the difference between the first moment and the second moment is greater than or equal to a first threshold, wherein the first threshold is a positive number; or
determining that the second electronic device is located on a first side of the first electronic device when the difference between the first moment and the second moment is less than or equal to a second threshold, wherein the second threshold is a negative number; or
determining that the second electronic device is located on the front side or the rear side of the first electronic device when the difference between the first moment and the second moment is less than a first threshold and greater than a second threshold.

3. The method according to claim 1, wherein the first sound wave signal is sent by the first speaker at a third moment,
the second sound wave signal is sent by the second speaker at a fourth moment,
a difference between the third moment and the fourth moment is a first time difference, and
the second moment is determined after the second sound wave signal is moved leftward by the first time difference.

4. The method according to claim 1, wherein after the determining relative position between the second electronic device and the first electronic device, the method further comprises:
sending, by the second electronic device, information of the relative position to the first electronic device.

5. A method for interaction between devices comprising:
sending, by a first electronic device, a first sound wave signal by using a first speaker;
sending, by the first electronic device, a second sound wave signal by using a second speaker, wherein the first sound wave signal and the second sound wave signal are used to determine relative position information between second electronic devices and the first electronic device;
receiving, by the first electronic device, the relative position information between a second electronic device and the first electronic device sent by the second electronic device, wherein the relative position information is determined based on a time difference between first moment and a second moment, a distance between the first speaker and the second speaker, and a sampling frequency of a microphone of the second electronic device, wherein the first moment is a moment at which the second electronic device receives the first sound wave signal, the second moment is a moment at which the second electronic device receives the second sound wave signal, and wherein the time difference is determined based on a difference between quantities of sampling points at which the microphone of the second electronic device samples the first sound wave signal and the second sound wave signal, wherein the difference between quantities of sampling points is calculated by performing correlation calculation on the first sound wave signal and the second sound wave signal after converting the first sound wave signal and the second sound wave signal to a same frequency band, and wherein the relative position is determined by comparing the difference between quantities of sampling points with a preset sampling point value that is positively correlated with the distance between the first speaker and the second speaker and the sampling frequency of the microphone; and interacting, by the first electronic device with the second electronic device based on the relative position information.

6. The method according to claim 5, wherein the sending a first sound wave signal by using a first speaker comprises sending the first sound wave signal at a third moment by using the first speaker; and the sending a second sound wave signal by using a second speaker comprises: sending the second sound wave signal at a fourth moment by using the second speaker, wherein a time difference between the third moment and the fourth moment is a first time difference for determining a receiving moment at which the second electronic device receives the second sound wave signal.

7. The method according to claim 5, wherein the interacting with the second electronic device based on the relative position information comprises:

detecting, by the first electronic device, a first operation for first target content displayed by the first electronic device;

determining, by the first electronic device, whether the first operation corresponds to the relative position information; and sending, by the first electronic device, the first target content to a display interface of the second electronic device for display when the first operation corresponds to the relative position information.

8. The method according to claim 5, wherein the second electronic devices comprise a second electronic device located on the left side of the first electronic device and a second electronic device located on the right side of the first electronic device, and the interacting with the second electronic device based on the relative position information comprises:

detecting, by the first electronic device, a second operation for first target content displayed by the first electronic device; and sending, by the first electronic device, the first target content to a display interface of the second electronic device located on the left side of the first electronic device for display when the second operation is an operation of extending the first target content leftward; or sending, by the first electronic device, the first target content to a display interface of the second electronic device located on the right side of the first electronic device for display when the second operation is an operation of extending the first target content rightward.

9. The method according to claim 5, wherein the method further comprises:

after a position of the first electronic device changes or a position of the second electronic device changes, re-determining the relative position information between the first electronic device and the second electronic device.

10. The method according to claim 5, wherein the first sound wave signal and the second sound wave signal are sound wave signals on different frequency bands; or the first sound wave signal and the second sound wave signal are sound wave signals of different orthogonal sequences.

11. The method according to claim 5, wherein the distance between the first speaker and the second speaker is greater than 20 cm.

12. An electronic device, comprising one or more processors, a memory, and a display, wherein the memory and the display are coupled to the one or more processors, the memory stores computer program code for execution by the one or more processors to perform operations comprising:

receiving a first sound wave signal sent by a first electronic device by using a first speaker;

receiving a second sound wave signal sent by the first electronic device by using a second speaker, wherein the first speaker is different from the second speaker; and determining a relative position between the second electronic device and the first electronic device based on a time difference between first moment and a second moment, a distance between the first speaker and the second speaker, and a sampling frequency of a microphone of the second electronic device, wherein the first moment is a moment at which the second electronic device receives the first sound wave signal, the second moment is a moment at which the second electronic device receives the second sound wave signal, and wherein the time difference is determined based on a difference between quantities of sampling points at which the microphone of the second electronic device samples the first sound wave signal and the second sound wave signal, wherein the difference between quantities of sampling points is calculated by performing correlation calculation on the first sound wave signal and the second sound wave signal after converting the first sound wave signal and the second sound wave signal to a same frequency band, and wherein the relative position is determined by comparing the difference between quantities of sampling points with a preset sampling point value that is positively correlated with the distance between the first speaker and the second speaker and the sampling frequency of the microphone.

13. The electronic device according to claim 12, wherein the first speaker is located on a first side of the second speaker, the second speaker is located on a second side of the first speaker, the first side is a left side or a right side, the second side is a side opposite to the first side, and the determining relative position between the second electronic device and the first electronic device based on the first moment and the second moment comprises:

determining that the second electronic device is located on a second side of the first electronic device when the difference between the first moment and the second moment is greater than or equal to a first threshold, wherein the first threshold is a positive number; or determining that the second electronic device is located on a first side of the first electronic device when the difference between the first moment and the second moment is less than or equal to a second threshold, wherein the second threshold is a negative number; or determining that the second electronic device is located on the front side or the rear side of the first electronic device when the difference between the first moment and the second moment is less than a first threshold and greater than a second threshold.

14. The electronic device according to claim 12, wherein the first sound wave signal is sent by the first speaker at a third moment, the second sound wave signal is sent by the second speaker at a fourth moment, a difference between the third moment and the fourth moment is a first time difference, and the second moment is determined after the second sound wave signal is moved leftward by the first time difference.

15. The electronic device according to claim 12, wherein after the determining relative position between the second electronic device and the first electronic device, the electronic device is further enabled to perform:

sending information of the relative position to the first electronic device.

16. The method according to claim 2, wherein after the determining relative position between the second electronic device and the first electronic device, the method further comprises:

sending information of the relative position to the first electronic device.

17. The method according to claim 5, wherein the method further comprises:

after a position of the first electronic device changes and a position of the second electronic device changes, re-determining the relative position information between the first electronic device and the second electronic device.

18. The method according to claim 6, wherein the first sound wave signal and the second sound wave signal are sound wave signals on different frequency bands; or the first sound wave signal and the second sound wave signal are sound wave signals of different orthogonal sequences.

19. The method according to claim 7, wherein the first sound wave signal and the second sound wave signal are sound wave signals on different frequency bands; or the first sound wave signal and the second sound wave signal are sound wave signals of different orthogonal sequences.

20. The method according to claim 6, wherein the distance between the first speaker and the second speaker is greater than 20 cm.

* * * * *